(12) United States Patent
Sandhu et al.

(10) Patent No.: US 11,350,226 B2
(45) Date of Patent: *May 31, 2022

(54) CHARGING PROTOCOL FOR RECHARGEABLE HEARING SYSTEMS

(71) Applicant: Earlens Corporation, Menlo Park, CA (US)

(72) Inventors: Kulbir Sandhu, Fremont, CA (US); Cem Shaquer, Saratoga, CA (US); Kyu-Hwa Jeong, Los Gatos, CA (US)

(73) Assignee: Earlens Corporation, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,346

(22) Filed: Apr. 9, 2019

(65) Prior Publication Data

US 2019/0239005 A1 Aug. 1, 2019

Related U.S. Application Data

(63) Continuation of application No. 15/384,013, filed on Dec. 19, 2016, now Pat. No. 10,306,381.

(Continued)

(51) Int. Cl.
*H04R 25/00* (2006.01)
*H02J 7/02* (2016.01)
*H02J 7/00* (2006.01)

(52) U.S. Cl.
CPC ............ *H04R 25/603* (2019.05); *H02J 7/007* (2013.01); *H02J 7/025* (2013.01); *H04R 25/554* (2013.01);
(Continued)

(58) Field of Classification Search
CPC .. H04R 25/603; H04R 25/554; H04R 25/602; H04R 2225/31; H02J 7/007; H02J 7/025; H02J 2007/0001
See application file for complete search history.

(56) References Cited

U.S. PATENT DOCUMENTS 2,763,334 A 9/1956 Starkey
3,209,082 A 9/1965 McCarrell et al.
(Continued)

FOREIGN PATENT DOCUMENTS

AU 2004301961 A1 2/2005
CA 2242545 C 9/2009
(Continued)

OTHER PUBLICATIONS

Dictionary.com's (via American Heritage Medical Dictionary) online dictionary definition of 'percutaneous'. Accessed on Jun. 3, 2013. 2 pages.

(Continued)

*Primary Examiner* — Sunita Joshi
(74) *Attorney, Agent, or Firm* — Wilson Sonsini Goodrich & Rosati, P.C.

(57) ABSTRACT

Embodiments of the invention include a method of charging a rechargeable battery, the method comprising the steps of: detecting the presence of a rechargeable hearing aid in a hearing aid recharger; generating a unique random ID in the charger; transmitting the unique random ID to the hearing aid using an extremely low power protocol; demodulating the unique ID in the hearing aid; using the demodulated unique ID in a low power protocol to advertise the hearing aid on a network which includes the charger; associating the hearing aid to the charger when the charger which broadcast the unique ID receives that unique ID from a hearing aid using a wireless protocol; using the wireless protocol to communicate between the associated charging station and hearing aid; radiating power from the charger to the hearing aid; and ending the association when the hearing aid is removed from the charger.

24 Claims, 29 Drawing Sheets

Related U.S. Application Data

(60) Provisional application No. 62/433,195, filed on Dec. 12, 2016, provisional application No. 62/273,002, filed on Dec. 30, 2015.

(52) U.S. Cl.
CPC ........ H04R 25/602 (2013.01); H02J 7/00045 (2020.01); H04R 2225/31 (2013.01)

(56) References Cited

U.S. PATENT DOCUMENTS

| | | |
|---|---|---|
| 3,229,049 A | 1/1966 | Goldberg |
| 3,440,314 A | 4/1969 | Eldon |
| 3,449,768 A | 6/1969 | James |
| 3,526,949 A | 9/1970 | Frank |
| 3,549,818 A | 12/1970 | Justin |
| 3,585,416 A | 6/1971 | Howard |
| 3,594,514 A | 7/1971 | Robert |
| 3,710,399 A | 1/1973 | Hurst |
| 3,712,962 A | 1/1973 | Epley |
| 3,764,748 A | 10/1973 | Branch et al. |
| 3,808,179 A | 4/1974 | Gaylord |
| 3,870,832 A | 3/1975 | Fredrickson |
| 3,882,285 A | 5/1975 | Nunley et al. |
| 3,965,430 A | 6/1976 | Brandt |
| 3,985,977 A | 10/1976 | Beaty et al. |
| 4,002,897 A | 1/1977 | Kleinman et al. |
| 4,031,318 A | 6/1977 | Pitre |
| 4,061,972 A | 12/1977 | Burgess |
| 4,075,042 A | 2/1978 | Das |
| 4,098,277 A | 7/1978 | Mendell |
| 4,109,116 A | 8/1978 | Victoreen |
| 4,120,570 A | 10/1978 | Gaylord |
| 4,207,441 A | 6/1980 | Chouard et al. |
| 4,248,899 A | 2/1981 | Lyon et al. |
| 4,252,440 A | 2/1981 | Frosch et al. |
| 4,281,419 A | 8/1981 | Treace |
| 4,303,772 A | 12/1981 | Novicky |
| 4,319,359 A | 3/1982 | Wolf |
| 4,334,315 A | 6/1982 | Ono et al. |
| 4,334,321 A | 6/1982 | Edelman |
| 4,338,929 A | 7/1982 | Lundin et al. |
| 4,339,954 A | 7/1982 | Anson et al. |
| 4,357,497 A | 11/1982 | Hochmair et al. |
| 4,375,016 A | 2/1983 | Harada |
| 4,380,689 A | 4/1983 | Giannetti |
| 4,428,377 A | 1/1984 | Zollner et al. |
| 4,524,294 A | 6/1985 | Brody |
| 4,540,761 A | 9/1985 | Kawamura et al. |
| 4,556,122 A | 12/1985 | Goode |
| 4,592,087 A | 5/1986 | Killion |
| 4,606,329 A | 8/1986 | Hough |
| 4,611,598 A | 9/1986 | Hortmann et al. |
| 4,628,907 A | 12/1986 | Epley |
| 4,641,377 A | 2/1987 | Rush et al. |
| 4,652,414 A | 3/1987 | Schlaegel |
| 4,654,554 A | 3/1987 | Kishi |
| 4,689,819 A | 8/1987 | Killion |
| 4,696,287 A | 9/1987 | Hortmann et al. |
| 4,729,366 A | 3/1988 | Schaefer |
| 4,741,339 A | 5/1988 | Harrison et al. |
| 4,742,499 A | 5/1988 | Butler |
| 4,756,312 A | 7/1988 | Epley |
| 4,759,070 A | 7/1988 | Voroba et al. |
| 4,766,607 A | 8/1988 | Feldman |
| 4,774,933 A | 10/1988 | Hough et al. |
| 4,776,322 A | 10/1988 | Hough et al. |
| 4,782,818 A | 11/1988 | Mori |
| 4,800,884 A | 1/1989 | Heide et al. |
| 4,800,982 A | 1/1989 | Carlson |
| 4,817,607 A | 4/1989 | Tatge |
| 4,840,178 A | 6/1989 | Heide et al. |
| 4,845,755 A | 7/1989 | Busch et al. |
| 4,865,035 A | 9/1989 | Mori |
| 4,870,688 A | 9/1989 | Voroba et al. |
| 4,918,745 A | 4/1990 | Hutchison |
| 4,932,405 A | 6/1990 | Peeters et al. |
| 4,936,305 A | 6/1990 | Ashtiani et al. |
| 4,944,301 A | 7/1990 | Widin et al. |
| 4,948,855 A | 8/1990 | Novicky |
| 4,957,478 A | 9/1990 | Maniglia et al. |
| 4,963,963 A | 10/1990 | Dorman |
| 4,982,434 A | 1/1991 | Lenhardt et al. |
| 4,999,819 A | 3/1991 | Newnham et al. |
| 5,003,608 A | 3/1991 | Carlson |
| 5,012,520 A | 4/1991 | Steeger |
| 5,015,224 A | 5/1991 | Maniglia |
| 5,015,225 A | 5/1991 | Hough et al. |
| 5,031,219 A | 7/1991 | Ward et al. |
| 5,061,282 A | 10/1991 | Jacobs |
| 5,066,091 A | 11/1991 | Stoy et al. |
| 5,068,902 A | 11/1991 | Ward |
| 5,094,108 A | 3/1992 | Kim et al. |
| 5,117,461 A | 5/1992 | Moseley |
| 5,142,186 A | 8/1992 | Cross et al. |
| 5,163,957 A | 11/1992 | Sade et al. |
| 5,167,235 A | 12/1992 | Seacord et al. |
| 5,201,007 A | 4/1993 | Ward et al. |
| 5,220,612 A | 6/1993 | Tibbetts et al. |
| 5,259,032 A | 11/1993 | Perkins et al. |
| 5,272,757 A | 12/1993 | Scofield et al. |
| 5,276,910 A | 1/1994 | Buchele |
| 5,277,694 A | 1/1994 | Leysieffer et al. |
| 5,282,858 A | 2/1994 | Bisch et al. |
| 5,296,797 A * | 3/1994 | Bartlett ............... H02J 7/0085 320/145 |
| 5,298,692 A | 3/1994 | Ikeda et al. |
| 5,338,287 A | 8/1994 | Miller et al. |
| 5,360,388 A | 11/1994 | Spindel et al. |
| 5,378,933 A | 1/1995 | Pfannenmueller et al. |
| 5,402,496 A | 3/1995 | Soli et al. |
| 5,411,467 A | 5/1995 | Hortmann et al. |
| 5,424,698 A | 6/1995 | Dydyk et al. |
| 5,425,104 A | 6/1995 | Shennib et al. |
| 5,440,082 A | 8/1995 | Claes |
| 5,440,237 A | 8/1995 | Brown et al. |
| 5,455,994 A | 10/1995 | Termeer et al. |
| 5,456,654 A | 10/1995 | Ball |
| 5,531,787 A | 7/1996 | Lesinski et al. |
| 5,531,954 A | 7/1996 | Heide et al. |
| 5,535,282 A | 7/1996 | Luca |
| 5,554,096 A | 9/1996 | Ball |
| 5,558,618 A | 9/1996 | Maniglia |
| 5,571,148 A | 11/1996 | Loeb et al. |
| 5,572,594 A | 11/1996 | Devoe et al. |
| 5,606,621 A | 2/1997 | Reiter et al. |
| 5,624,376 A | 4/1997 | Ball et al. |
| 5,654,530 A | 8/1997 | Sauer et al. |
| 5,692,059 A | 11/1997 | Kruger |
| 5,699,809 A | 12/1997 | Combs et al. |
| 5,701,348 A | 12/1997 | Shennib et al. |
| 5,707,338 A | 1/1998 | Adams et al. |
| 5,715,321 A | 2/1998 | Andrea et al. |
| 5,721,783 A | 2/1998 | Anderson |
| 5,722,411 A | 3/1998 | Suzuki et al. |
| 5,729,077 A | 3/1998 | Newnham et al. |
| 5,740,258 A | 4/1998 | Goodwin-Johansson |
| 5,742,692 A | 4/1998 | Garcia et al. |
| 5,749,912 A | 5/1998 | Zhang et al. |
| 5,762,583 A | 6/1998 | Adams et al. |
| 5,772,575 A | 6/1998 | Lesinski et al. |
| 5,774,259 A | 6/1998 | Saitoh et al. |
| 5,782,744 A | 7/1998 | Money |
| 5,788,711 A | 8/1998 | Lehner et al. |
| 5,795,287 A | 8/1998 | Ball et al. |
| 5,797,834 A | 8/1998 | Goode |
| 5,800,336 A | 9/1998 | Ball et al. |
| 5,804,109 A | 9/1998 | Perkins |
| 5,804,907 A | 9/1998 | Park et al. |
| 5,814,095 A | 9/1998 | Mueller et al. |
| 5,824,022 A | 10/1998 | Zilberman et al. |
| 5,825,122 A | 10/1998 | Givargizov et al. |
| 5,836,863 A | 11/1998 | Bushek et al. |

(56) References Cited

U.S. PATENT DOCUMENTS

| | | |
|---|---|---|
| 5,842,967 A | 12/1998 | Kroll |
| 5,851,199 A | 12/1998 | Peerless et al. |
| 5,857,958 A | 1/1999 | Ball et al. |
| 5,859,916 A | 1/1999 | Ball et al. |
| 5,868,682 A | 2/1999 | Combs et al. |
| 5,879,283 A | 3/1999 | Adams et al. |
| 5,888,187 A | 3/1999 | Jaeger et al. |
| 5,897,486 A | 4/1999 | Ball et al. |
| 5,899,847 A | 5/1999 | Adams et al. |
| 5,900,274 A | 5/1999 | Chatterjee et al. |
| 5,906,635 A | 5/1999 | Maniglia |
| 5,913,815 A | 6/1999 | Ball et al. |
| 5,922,017 A | 7/1999 | Bredberg et al. |
| 5,922,077 A | 7/1999 | Espy et al. |
| 5,935,170 A | 8/1999 | Haakansson et al. |
| 5,940,519 A | 8/1999 | Kuo |
| 5,949,895 A | 9/1999 | Ball et al. |
| 5,951,601 A | 9/1999 | Lesinski et al. |
| 5,984,859 A | 11/1999 | Lesinski |
| 5,987,146 A | 11/1999 | Pluvinage et al. |
| 6,001,129 A | 12/1999 | Bushek et al. |
| 6,005,955 A | 12/1999 | Kroll et al. |
| 6,011,984 A | 1/2000 | Van Antwerp et al. |
| 6,024,717 A | 2/2000 | Ball et al. |
| 6,038,480 A | 3/2000 | Hrdlicka et al. |
| 6,045,528 A | 4/2000 | Arenberg et al. |
| 6,050,933 A | 4/2000 | Bushek et al. |
| 6,067,474 A | 5/2000 | Schulman et al. |
| 6,068,589 A | 5/2000 | Neukermans |
| 6,068,590 A | 5/2000 | Brisken |
| 6,072,884 A | 6/2000 | Kates |
| 6,084,975 A | 7/2000 | Perkins |
| 6,093,144 A | 7/2000 | Jaeger et al. |
| 6,135,612 A | 10/2000 | Clore |
| 6,137,889 A | 10/2000 | Shennib et al. |
| 6,139,488 A | 10/2000 | Ball |
| 6,153,966 A | 11/2000 | Neukermans |
| 6,168,948 B1 | 1/2001 | Anderson et al. |
| 6,174,278 B1 | 1/2001 | Jaeger et al. |
| 6,175,637 B1 | 1/2001 | Fujihira et al. |
| 6,181,801 B1 | 1/2001 | Puthuff et al. |
| 6,190,305 B1 | 2/2001 | Ball et al. |
| 6,190,306 B1 | 2/2001 | Kennedy |
| 6,208,445 B1 | 3/2001 | Reime |
| 6,216,040 B1 | 4/2001 | Harrison |
| 6,217,508 B1 | 4/2001 | Ball et al. |
| 6,219,427 B1 | 4/2001 | Kates et al. |
| 6,222,302 B1 | 4/2001 | Imada et al. |
| 6,222,927 B1 | 4/2001 | Feng et al. |
| 6,240,192 B1 | 5/2001 | Brennan et al. |
| 6,241,767 B1 | 6/2001 | Stennert et al. |
| 6,259,951 B1 | 7/2001 | Kuzma et al. |
| 6,261,224 B1 | 7/2001 | Adams et al. |
| 6,264,603 B1 | 7/2001 | Kennedy |
| 6,277,148 B1 | 8/2001 | Dormer |
| 6,312,959 B1 | 11/2001 | Datskos |
| 6,339,648 B1 | 1/2002 | McIntosh et al. |
| 6,342,035 B1 | 1/2002 | Kroll et al. |
| 6,354,990 B1 | 3/2002 | Juneau et al. |
| 6,359,993 B2 | 3/2002 | Brimhall |
| 6,366,863 B1 | 4/2002 | Bye et al. |
| 6,374,143 B1 | 4/2002 | Berrang et al. |
| 6,385,363 B1 | 5/2002 | Rajic et al. |
| 6,387,039 B1 | 5/2002 | Moses |
| 6,390,971 B1 | 5/2002 | Adams et al. |
| 6,393,130 B1 | 5/2002 | Stonikas et al. |
| 6,422,991 B1 | 7/2002 | Jaeger |
| 6,432,248 B1 | 8/2002 | Popp et al. |
| 6,434,246 B1 | 8/2002 | Kates et al. |
| 6,434,247 B1 | 8/2002 | Kates et al. |
| 6,436,028 B1 | 8/2002 | Dormer |
| 6,438,244 B1 | 8/2002 | Juneau et al. |
| 6,445,799 B1 | 9/2002 | Taenzer et al. |
| 6,473,512 B1 | 10/2002 | Juneau et al. |
| 6,475,134 B1 | 11/2002 | Ball et al. |
| 6,491,622 B1 | 12/2002 | Kasic, II et al. |
| 6,491,644 B1 | 12/2002 | Vujanic et al. |
| 6,491,722 B1 | 12/2002 | Kroll et al. |
| 6,493,453 B1 | 12/2002 | Glendon |
| 6,493,454 B1 | 12/2002 | Loi et al. |
| 6,498,858 B2 | 12/2002 | Kates |
| 6,507,758 B1 | 1/2003 | Greenberg et al. |
| 6,519,376 B2 | 2/2003 | Biagi et al. |
| 6,523,985 B2 | 2/2003 | Hamanaka et al. |
| 6,536,530 B2 | 3/2003 | Schultz et al. |
| 6,537,200 B2 | 3/2003 | Leysieffer et al. |
| 6,547,715 B1 | 4/2003 | Mueller et al. |
| 6,549,633 B1 | 4/2003 | Westermann |
| 6,549,635 B1 | 4/2003 | Gebert |
| 6,554,761 B1 | 4/2003 | Puria et al. |
| 6,575,894 B2 | 6/2003 | Leysieffer et al. |
| 6,592,513 B1 | 7/2003 | Kroll et al. |
| 6,603,860 B1 | 8/2003 | Taenzer et al. |
| 6,620,110 B2 | 9/2003 | Schmid |
| 6,626,822 B1 | 9/2003 | Jaeger et al. |
| 6,629,922 B1 | 10/2003 | Puria et al. |
| 6,631,196 B1 | 10/2003 | Taenzer et al. |
| 6,643,378 B2 | 11/2003 | Schumaier |
| 6,663,575 B2 | 12/2003 | Leysieffer |
| 6,668,062 B1 | 12/2003 | Luo et al. |
| 6,676,592 B2 | 1/2004 | Ball et al. |
| 6,681,022 B1 | 1/2004 | Puthuff et al. |
| 6,695,943 B2 | 2/2004 | Juneau et al. |
| 6,697,674 B2 | 2/2004 | Leysieffer |
| 6,724,902 B1 | 4/2004 | Shennib et al. |
| 6,726,618 B2 | 4/2004 | Miller |
| 6,726,718 B1 | 4/2004 | Carlyle et al. |
| 6,727,789 B2 | 4/2004 | Tibbetts et al. |
| 6,728,024 B2 | 4/2004 | Ribak |
| 6,735,318 B2 | 5/2004 | Cho |
| 6,754,358 B1 | 6/2004 | Boesen et al. |
| 6,754,359 B1 | 6/2004 | Svean et al. |
| 6,754,537 B1 | 6/2004 | Harrison et al. |
| 6,785,394 B1 | 8/2004 | Olsen et al. |
| 6,792,114 B1 | 9/2004 | Kates et al. |
| 6,801,629 B2 | 10/2004 | Brimhall et al. |
| 6,829,363 B2 | 12/2004 | Sacha |
| 6,831,986 B2 | 12/2004 | Kates |
| 6,837,857 B2 | 1/2005 | Stirnemann |
| 6,842,647 B1 | 1/2005 | Griffith et al. |
| 6,888,949 B1 | 5/2005 | Vanden Berghe et al. |
| 6,900,926 B2 | 5/2005 | Ribak |
| 6,912,289 B2 | 6/2005 | Vonlanthen et al. |
| 6,920,340 B2 | 7/2005 | Laderman |
| 6,931,231 B1 | 8/2005 | Griffin |
| 6,940,988 B1 | 9/2005 | Shennib et al. |
| 6,940,989 B1 | 9/2005 | Shennib et al. |
| D512,979 S | 12/2005 | Corcoran et al. |
| 6,975,402 B2 | 12/2005 | Bisson et al. |
| 6,978,159 B2 | 12/2005 | Feng et al. |
| 7,020,297 B2 | 3/2006 | Fang et al. |
| 7,024,010 B2 | 4/2006 | Saunders et al. |
| 7,043,037 B2 | 5/2006 | Lichtblau et al. |
| 7,050,675 B2 | 5/2006 | Zhou et al. |
| 7,050,876 B1 | 5/2006 | Fu et al. |
| 7,057,256 B2 | 6/2006 | Mazur et al. |
| 7,058,182 B2 | 6/2006 | Kates |
| 7,058,188 B1 | 6/2006 | Allred |
| 7,072,475 B1 | 7/2006 | Denap et al. |
| 7,076,076 B2 | 7/2006 | Bauman |
| 7,095,981 B1 | 8/2006 | Voroba et al. |
| 7,167,572 B1 | 1/2007 | Harrison et al. |
| 7,174,026 B2 | 2/2007 | Niederdrank et al. |
| 7,179,238 B2 | 2/2007 | Hissong |
| 7,181,034 B2 | 2/2007 | Armstrong |
| 7,203,331 B2 | 4/2007 | Boesen |
| 7,239,069 B2 | 7/2007 | Cho |
| 7,245,732 B2 | 7/2007 | Jorgensen et al. |
| 7,255,457 B2 | 8/2007 | Ducharme et al. |
| 7,266,208 B2 | 9/2007 | Charvin et al. |
| 7,289,639 B2 | 10/2007 | Abel et al. |
| 7,313,245 B1 | 12/2007 | Shennib |
| 7,315,211 B1 | 1/2008 | Lee et al. |
| 7,322,930 B2 | 1/2008 | Jaeger et al. |

(56) References Cited

U.S. PATENT DOCUMENTS

| | | |
|---|---|---|
| 7,349,741 B2 | 3/2008 | Maltan et al. |
| 7,354,792 B2 | 4/2008 | Mazur et al. |
| 7,376,563 B2 | 5/2008 | Leysieffer et al. |
| 7,390,689 B2 | 6/2008 | Mazur et al. |
| 7,394,909 B1 | 7/2008 | Widmer et al. |
| 7,421,087 B2 | 9/2008 | Perkins et al. |
| 7,424,122 B2 | 9/2008 | Ryan |
| 7,444,877 B2 | 11/2008 | Li et al. |
| 7,547,275 B2 | 6/2009 | Cho et al. |
| 7,630,646 B2 | 12/2009 | Anderson et al. |
| 7,645,877 B2 | 1/2010 | Gmeiner et al. |
| 7,668,325 B2 | 2/2010 | Puria et al. |
| 7,747,295 B2 | 6/2010 | Choi |
| 7,778,434 B2 | 8/2010 | Juneau et al. |
| 7,809,150 B2 | 10/2010 | Natarajan et al. |
| 7,822,215 B2 | 10/2010 | Carazo et al. |
| 7,826,632 B2 | 11/2010 | Von Buol et al. |
| 7,853,033 B2 | 12/2010 | Maltan et al. |
| 7,867,160 B2 | 1/2011 | Pluvinage et al. |
| 7,883,535 B2 | 2/2011 | Cantin et al. |
| 7,885,359 B2 | 2/2011 | Meltzer |
| 7,983,435 B2 | 7/2011 | Moses |
| 8,090,134 B2 | 1/2012 | Takigawa et al. |
| 8,099,169 B1 * | 1/2012 | Karunasiri ......... A61N 1/36038 607/55 |
| 8,116,494 B2 | 2/2012 | Rass |
| 8,128,551 B2 | 3/2012 | Jolly |
| 8,157,730 B2 | 4/2012 | Leboeuf et al. |
| 8,197,461 B1 | 6/2012 | Arenberg et al. |
| 8,204,786 B2 | 6/2012 | Leboeuf et al. |
| 8,233,651 B1 | 7/2012 | Haller |
| 8,251,903 B2 | 8/2012 | Leboeuf et al. |
| 8,284,970 B2 | 10/2012 | Sacha |
| 8,295,505 B2 | 10/2012 | Weinans et al. |
| 8,295,523 B2 | 10/2012 | Fay et al. |
| 8,320,601 B2 | 11/2012 | Takigawa et al. |
| 8,320,982 B2 | 11/2012 | Leboeuf et al. |
| 8,340,310 B2 | 12/2012 | Ambrose et al. |
| 8,340,335 B1 | 12/2012 | Shennib |
| 8,391,527 B2 | 3/2013 | Feucht et al. |
| 8,396,235 B2 | 3/2013 | Gebhardt et al. |
| 8,396,239 B2 | 3/2013 | Fay et al. |
| 8,401,212 B2 | 3/2013 | Puria et al. |
| 8,401,214 B2 | 3/2013 | Perkins et al. |
| 8,506,473 B2 | 8/2013 | Puria |
| 8,512,242 B2 | 8/2013 | Leboeuf et al. |
| 8,526,651 B2 | 9/2013 | Van Hal et al. |
| 8,526,652 B2 | 9/2013 | Ambrose et al. |
| 8,526,971 B2 | 9/2013 | Giniger et al. |
| 8,545,383 B2 | 10/2013 | Wenzel et al. |
| 8,600,089 B2 | 12/2013 | Wenzel et al. |
| 8,647,270 B2 | 2/2014 | Leboeuf et al. |
| 8,652,040 B2 | 2/2014 | Leboeuf et al. |
| 8,684,922 B2 | 4/2014 | Tran |
| 8,696,054 B2 | 4/2014 | Crum |
| 8,696,541 B2 | 4/2014 | Pluvinage et al. |
| 8,700,111 B2 | 4/2014 | Leboeuf et al. |
| 8,702,607 B2 | 4/2014 | Leboeuf et al. |
| 8,715,152 B2 | 5/2014 | Puria et al. |
| 8,715,153 B2 | 5/2014 | Puria et al. |
| 8,715,154 B2 | 5/2014 | Perkins et al. |
| 8,761,423 B2 | 6/2014 | Wagner et al. |
| 8,787,609 B2 | 7/2014 | Perkins et al. |
| 8,788,002 B2 | 7/2014 | Leboeuf et al. |
| 8,817,998 B2 | 8/2014 | Inoue |
| 8,824,715 B2 | 9/2014 | Fay et al. |
| 8,837,758 B2 | 9/2014 | Knudsen |
| 8,845,705 B2 | 9/2014 | Perkins et al. |
| 8,855,323 B2 | 10/2014 | Kroman |
| 8,858,419 B2 | 10/2014 | Puria et al. |
| 8,885,860 B2 | 11/2014 | Djalilian et al. |
| 8,886,269 B2 | 11/2014 | Leboeuf et al. |
| 8,888,701 B2 | 11/2014 | Leboeuf et al. |
| 8,923,941 B2 | 12/2014 | Leboeuf et al. |
| 8,929,965 B2 | 1/2015 | Leboeuf et al. |
| 8,929,966 B2 | 1/2015 | Leboeuf et al. |
| 8,934,952 B2 | 1/2015 | Leboeuf et al. |
| 8,942,776 B2 | 1/2015 | Leboeuf et al. |
| 8,961,415 B2 | 2/2015 | Leboeuf et al. |
| 8,986,187 B2 | 3/2015 | Perkins et al. |
| 8,989,830 B2 | 3/2015 | Leboeuf et al. |
| 9,044,180 B2 | 6/2015 | Leboeuf et al. |
| 9,049,528 B2 | 6/2015 | Fay et al. |
| 9,055,379 B2 | 6/2015 | Puria et al. |
| 9,131,312 B2 | 9/2015 | Leboeuf et al. |
| 9,154,891 B2 | 10/2015 | Puria et al. |
| 9,211,069 B2 | 12/2015 | Larsen et al. |
| 9,226,083 B2 | 12/2015 | Puria et al. |
| 9,277,335 B2 | 3/2016 | Perkins et al. |
| 9,289,135 B2 | 3/2016 | Leboeuf et al. |
| 9,289,175 B2 | 3/2016 | Leboeuf et al. |
| 9,301,696 B2 | 4/2016 | Leboeuf et al. |
| 9,314,167 B2 | 4/2016 | Leboeuf et al. |
| 9,392,377 B2 | 7/2016 | Olsen et al. |
| 9,427,191 B2 | 8/2016 | Leboeuf et al. |
| 9,497,556 B2 | 11/2016 | Kaltenbacher et al. |
| 9,521,962 B2 | 12/2016 | Leboeuf |
| 9,524,092 B2 | 12/2016 | Ren et al. |
| 9,538,921 B2 | 1/2017 | Leboeuf et al. |
| 9,544,700 B2 | 1/2017 | Puria et al. |
| 9,564,862 B2 | 2/2017 | Hoyerby |
| 9,591,409 B2 | 3/2017 | Puria et al. |
| 9,749,758 B2 | 8/2017 | Puria et al. |
| 9,750,462 B2 | 9/2017 | Leboeuf et al. |
| 9,788,785 B2 | 10/2017 | Leboeuf |
| 9,788,794 B2 | 10/2017 | Leboeuf et al. |
| 9,794,653 B2 | 10/2017 | Aumer et al. |
| 9,794,688 B2 | 10/2017 | You |
| 9,801,552 B2 | 10/2017 | Romesburg et al. |
| 9,808,204 B2 | 11/2017 | Leboeuf et al. |
| 9,924,276 B2 | 3/2018 | Wenzel |
| 9,930,458 B2 | 3/2018 | Freed et al. |
| 9,949,035 B2 | 4/2018 | Rucker et al. |
| 9,949,039 B2 | 4/2018 | Puria et al. |
| 9,949,045 B2 | 4/2018 | Kure et al. |
| 9,961,454 B2 | 5/2018 | Puria et al. |
| 9,964,672 B2 | 5/2018 | Phair et al. |
| 10,003,888 B2 | 6/2018 | Stephanou et al. |
| 1,003,410 A1 | 7/2018 | Puria et al. |
| 1,015,435 A1 | 12/2018 | Perkins et al. |
| 10,178,483 B2 | 1/2019 | Teran et al. |
| 10,206,045 B2 | 2/2019 | Kaltenbacher et al. |
| 10,237,663 B2 | 3/2019 | Puria et al. |
| 10,284,964 B2 | 5/2019 | Olsen et al. |
| 10,286,215 B2 | 5/2019 | Perkins et al. |
| 10,292,601 B2 | 5/2019 | Faceteau et al. |
| 10,306,381 B2 | 5/2019 | Sandhu et al. |
| 10,492,010 B2 | 11/2019 | Rucker et al. |
| 10,511,913 B2 | 12/2019 | Puria et al. |
| 10,516,946 B2 | 12/2019 | Puria et al. |
| 10,516,949 B2 | 12/2019 | Puria et al. |
| 10,516,950 B2 | 12/2019 | Perkins et al. |
| 10,516,951 B2 | 12/2019 | Wenzel |
| 10,531,206 B2 | 1/2020 | Freed et al. |
| 10,609,492 B2 | 3/2020 | Olsen et al. |
| 10,743,110 B2 | 8/2020 | Puria et al. |
| 10,779,094 B2 | 9/2020 | Rucker et al. |
| 10,863,286 B2 | 12/2020 | Perkins et al. |
| 11,057,714 B2 | 7/2021 | Puria et al. |
| 11,058,305 B2 | 7/2021 | Perkins et al. |
| 11,070,927 B2 | 7/2021 | Rucker et al. |
| 11,102,594 B2 | 8/2021 | Shaquer et al. |
| 11,153,697 B2 | 10/2021 | Olsen et al. |
| 11,166,114 B2 | 11/2021 | Perkins et al. |
| 2001/0003788 A1 | 6/2001 | Ball et al. |
| 2001/0007050 A1 | 7/2001 | Adelman |
| 2001/0024507 A1 | 9/2001 | Boesen |
| 2001/0027342 A1 | 10/2001 | Dormer |
| 2001/0029313 A1 | 10/2001 | Kennedy |
| 2001/0043708 A1 | 11/2001 | Brimhall |
| 2001/0053871 A1 | 12/2001 | Zilberman et al. |
| 2001/0055405 A1 | 12/2001 | Cho |
| 2002/0012438 A1 | 1/2002 | Leysieffer et al. |
| 2002/0025055 A1 | 2/2002 | Stonikas et al. |

(56) References Cited

U.S. PATENT DOCUMENTS

| | | |
|---|---|---|
| 2002/0029070 A1 | 3/2002 | Leysieffer et al. |
| 2002/0030871 A1 | 3/2002 | Anderson et al. |
| 2002/0035309 A1 | 3/2002 | Leysieffer |
| 2002/0048374 A1 | 4/2002 | Soli et al. |
| 2002/0085728 A1 | 7/2002 | Shennib et al. |
| 2002/0086715 A1 | 7/2002 | Sahagen |
| 2002/0172350 A1 | 11/2002 | Edwards et al. |
| 2002/0183587 A1 | 12/2002 | Dormer |
| 2003/0021903 A1 | 1/2003 | Shlenker et al. |
| 2003/0055311 A1 | 3/2003 | Neukermans et al. |
| 2003/0064746 A1 | 4/2003 | Rader et al. |
| 2003/0081803 A1 | 5/2003 | Petilli et al. |
| 2003/0097178 A1 | 5/2003 | Roberson et al. |
| 2003/0125602 A1 | 7/2003 | Sokolich et al. |
| 2003/0142841 A1 | 7/2003 | Wiegand |
| 2003/0208099 A1 | 11/2003 | Ball |
| 2003/0208888 A1 | 11/2003 | Fearing et al. |
| 2003/0220536 A1 | 11/2003 | Hissong |
| 2004/0019294 A1 | 1/2004 | Stirnemann |
| 2004/0093040 A1 | 5/2004 | Boylston et al. |
| 2004/0121291 A1 | 6/2004 | Knapp et al. |
| 2004/0158157 A1 | 8/2004 | Jensen et al. |
| 2004/0165742 A1 | 8/2004 | Shennib et al. |
| 2004/0166495 A1 | 8/2004 | Greinwald et al. |
| 2004/0167377 A1 | 8/2004 | Schafer et al. |
| 2004/0184732 A1 | 9/2004 | Zhou et al. |
| 2004/0190734 A1 | 9/2004 | Kates |
| 2004/0202339 A1 | 10/2004 | O'Brien et al. |
| 2004/0202340 A1 | 10/2004 | Armstrong et al. |
| 2004/0208333 A1 | 10/2004 | Cheung et al. |
| 2004/0234089 A1 | 11/2004 | Rembrand et al. |
| 2004/0234092 A1 | 11/2004 | Wada et al. |
| 2004/0236416 A1 | 11/2004 | Falotico |
| 2004/0240691 A1 | 12/2004 | Grafenberg |
| 2005/0018859 A1 | 1/2005 | Buchholz |
| 2005/0020873 A1 | 1/2005 | Berrang et al. |
| 2005/0036639 A1 | 2/2005 | Bachler et al. |
| 2005/0038498 A1 | 2/2005 | Dubrow et al. |
| 2005/0088435 A1 | 4/2005 | Geng |
| 2005/0101830 A1 | 5/2005 | Easter et al. |
| 2005/0111683 A1 | 5/2005 | Chabries et al. |
| 2005/0117765 A1 | 6/2005 | Meyer et al. |
| 2005/0163333 A1 | 7/2005 | Abel et al. |
| 2005/0190939 A1 | 9/2005 | Fretz et al. |
| 2005/0196005 A1 | 9/2005 | Shennib et al. |
| 2005/0222823 A1 | 10/2005 | Brumback et al. |
| 2005/0226446 A1 | 10/2005 | Luo et al. |
| 2005/0267549 A1 | 12/2005 | Della Santina et al. |
| 2005/0271870 A1 | 12/2005 | Jackson |
| 2005/0288739 A1 | 12/2005 | Hassler, Jr. et al. |
| 2006/0015155 A1 | 1/2006 | Charvin et al. |
| 2006/0023908 A1 | 2/2006 | Perkins et al. |
| 2006/0058573 A1 | 3/2006 | Neisz et al. |
| 2006/0062420 A1 | 3/2006 | Araki |
| 2006/0074159 A1 | 4/2006 | Lu et al. |
| 2006/0075175 A1 | 4/2006 | Jensen et al. |
| 2006/0107744 A1 | 5/2006 | Li et al. |
| 2006/0129210 A1 | 6/2006 | Cantin et al. |
| 2006/0161227 A1 | 7/2006 | Walsh et al. |
| 2006/0161255 A1 | 7/2006 | Zarowski et al. |
| 2006/0177079 A1 | 8/2006 | Baekgaard Jensen et al. |
| 2006/0177082 A1 | 8/2006 | Solomito et al. |
| 2006/0183965 A1 | 8/2006 | Kasic et al. |
| 2006/0189841 A1 | 8/2006 | Pluvinage et al. |
| 2006/0231914 A1 | 10/2006 | Carey, III |
| 2006/0233398 A1 | 10/2006 | Husung |
| 2006/0237126 A1 | 10/2006 | Guffrey et al. |
| 2006/0247735 A1 | 11/2006 | Honert et al. |
| 2006/0251278 A1 | 11/2006 | Puria et al. |
| 2006/0256989 A1 | 11/2006 | Olsen et al. |
| 2006/0278245 A1 | 12/2006 | Gan |
| 2007/0030990 A1 | 2/2007 | Fischer |
| 2007/0036377 A1 | 2/2007 | Stirnemann |
| 2007/0076913 A1 | 4/2007 | Schanz |
| 2007/0083078 A1 | 4/2007 | Easter et al. |
| 2007/0100197 A1 | 5/2007 | Perkins et al. |
| 2007/0127748 A1 | 6/2007 | Carlile et al. |
| 2007/0127752 A1 | 6/2007 | Armstrong |
| 2007/0127766 A1 | 6/2007 | Combest |
| 2007/0135870 A1 | 6/2007 | Shanks et al. |
| 2007/0161848 A1 | 7/2007 | Dalton et al. |
| 2007/0191673 A1 | 8/2007 | Ball et al. |
| 2007/0201713 A1 | 8/2007 | Fang et al. |
| 2007/0206825 A1 | 9/2007 | Thomasson |
| 2007/0223755 A1 | 9/2007 | Salvetti et al. |
| 2007/0225776 A1 | 9/2007 | Fritsch et al. |
| 2007/0236704 A1 | 10/2007 | Carr et al. |
| 2007/0250119 A1 | 10/2007 | Tyler et al. |
| 2007/0251082 A1 | 11/2007 | Milojevic et al. |
| 2007/0258507 A1* | 11/2007 | Lee .................. H04B 1/71632 375/138 |
| 2007/0286429 A1 | 12/2007 | Grafenberg et al. |
| 2008/0021518 A1 | 1/2008 | Hochmair et al. |
| 2008/0051623 A1 | 2/2008 | Schneider et al. |
| 2008/0054509 A1 | 3/2008 | Berman et al. |
| 2008/0063228 A1 | 3/2008 | Mejia et al. |
| 2008/0063231 A1 | 3/2008 | Juneau et al. |
| 2008/0064918 A1 | 3/2008 | Jolly |
| 2008/0077198 A1 | 3/2008 | Webb et al. |
| 2008/0089292 A1 | 4/2008 | Kitazoe et al. |
| 2008/0107292 A1 | 5/2008 | Kornagel |
| 2008/0123866 A1 | 5/2008 | Rule et al. |
| 2008/0130927 A1 | 6/2008 | Theverapperuma et al. |
| 2008/0188707 A1 | 8/2008 | Bernard et al. |
| 2008/0298600 A1 | 12/2008 | Poe et al. |
| 2008/0300703 A1 | 12/2008 | Widmer et al. |
| 2009/0016553 A1 | 1/2009 | Ho et al. |
| 2009/0023976 A1 | 1/2009 | Cho et al. |
| 2009/0043149 A1 | 2/2009 | Abel et al. |
| 2009/0076581 A1 | 3/2009 | Gibson |
| 2009/0092271 A1 | 4/2009 | Fay et al. |
| 2009/0097681 A1 | 4/2009 | Puria et al. |
| 2009/0131742 A1 | 5/2009 | Cho et al. |
| 2009/0141919 A1 | 6/2009 | Spitaels et al. |
| 2009/0149697 A1 | 6/2009 | Steinhardt et al. |
| 2009/0157143 A1 | 6/2009 | Edler et al. |
| 2009/0175474 A1 | 7/2009 | Salvetti et al. |
| 2009/0246627 A1 | 10/2009 | Park |
| 2009/0253951 A1 | 10/2009 | Ball et al. |
| 2009/0262966 A1 | 10/2009 | Vestergaard et al. |
| 2009/0281367 A1 | 11/2009 | Cho et al. |
| 2009/0310805 A1 | 12/2009 | Petroff |
| 2009/0316922 A1 | 12/2009 | Merks et al. |
| 2010/0034409 A1 | 2/2010 | Fay et al. |
| 2010/0036488 A1 | 2/2010 | De Juan, Jr. et al. |
| 2010/0048982 A1 | 2/2010 | Puria et al. |
| 2010/0085176 A1 | 4/2010 | Flick |
| 2010/0103404 A1 | 4/2010 | Remke et al. |
| 2010/0111315 A1 | 5/2010 | Kroman |
| 2010/0114190 A1 | 5/2010 | Bendett et al. |
| 2010/0145135 A1 | 6/2010 | Ball et al. |
| 2010/0152527 A1 | 6/2010 | Puria |
| 2010/0171369 A1 | 7/2010 | Baarman et al. |
| 2010/0172507 A1 | 7/2010 | Merks |
| 2010/0177918 A1 | 7/2010 | Keady et al. |
| 2010/0202645 A1 | 8/2010 | Puria et al. |
| 2010/0222639 A1 | 9/2010 | Purcell et al. |
| 2010/0260364 A1 | 10/2010 | Merks |
| 2010/0272299 A1 | 10/2010 | Van Schuylenbergh et al. |
| 2010/0290653 A1 | 11/2010 | Wiggins et al. |
| 2010/0312040 A1 | 12/2010 | Puria et al. |
| 2011/0062793 A1 | 3/2011 | Azancot et al. |
| 2011/0069852 A1 | 3/2011 | Arndt et al. |
| 2011/0077453 A1 | 3/2011 | Pluvinage et al. |
| 2011/0084654 A1 | 4/2011 | Julstrom et al. |
| 2011/0112462 A1 | 5/2011 | Parker et al. |
| 2011/0116666 A1 | 5/2011 | Dittberner et al. |
| 2011/0125222 A1 | 5/2011 | Perkins et al. |
| 2011/0130622 A1 | 6/2011 | Ilberg et al. |
| 2011/0142274 A1 | 6/2011 | Perkins et al. |
| 2011/0144414 A1 | 6/2011 | Spearman et al. |
| 2011/0152601 A1 | 6/2011 | Puria et al. |
| 2011/0152602 A1 | 6/2011 | Perkins et al. |
| 2011/0152603 A1 | 6/2011 | Perkins et al. |

(56) References Cited

U.S. PATENT DOCUMENTS

| | | |
|---|---|---|
| 2011/0152976 A1 | 6/2011 | Perkins et al. |
| 2011/0164771 A1 | 7/2011 | Jensen et al. |
| 2011/0182453 A1 | 7/2011 | Van Hal et al. |
| 2011/0196460 A1 | 8/2011 | Weiss |
| 2011/0221391 A1* | 9/2011 | Won .................... H01M 10/44 320/108 |
| 2011/0249845 A1 | 10/2011 | Kates |
| 2011/0249847 A1 | 10/2011 | Salvetti et al. |
| 2011/0257290 A1 | 10/2011 | Zeller et al. |
| 2011/0258839 A1 | 10/2011 | Probst |
| 2011/0271965 A1 | 11/2011 | Parkins et al. |
| 2012/0008807 A1 | 1/2012 | Gran |
| 2012/0014546 A1 | 1/2012 | Puria et al. |
| 2012/0038881 A1 | 2/2012 | Amirparviz et al. |
| 2012/0039493 A1 | 2/2012 | Rucker et al. |
| 2012/0092461 A1 | 4/2012 | Fisker et al. |
| 2012/0114157 A1 | 5/2012 | Arndt et al. |
| 2012/0140967 A1 | 6/2012 | Aubert et al. |
| 2012/0217087 A1 | 8/2012 | Ambrose et al. |
| 2012/0236524 A1 | 9/2012 | Pugh et al. |
| 2012/0263339 A1 | 10/2012 | Funahashi |
| 2013/0004004 A1 | 1/2013 | Zhao et al. |
| 2013/0034258 A1 | 2/2013 | Lin |
| 2013/0083938 A1 | 4/2013 | Bakalos et al. |
| 2013/0089227 A1 | 4/2013 | Kates |
| 2013/0195300 A1 | 8/2013 | Larsen et al. |
| 2013/0230204 A1 | 9/2013 | Monahan et al. |
| 2013/0287239 A1 | 10/2013 | Fay et al. |
| 2013/0303835 A1 | 11/2013 | Koskowich |
| 2013/0308782 A1 | 11/2013 | Dittberner et al. |
| 2013/0308807 A1 | 11/2013 | Burns |
| 2013/0315428 A1 | 11/2013 | Perkins et al. |
| 2013/0343584 A1 | 12/2013 | Bennett et al. |
| 2013/0343585 A1* | 12/2013 | Bennett ................ H04R 25/554 381/315 |
| 2013/0343587 A1 | 12/2013 | Naylor et al. |
| 2014/0003640 A1 | 1/2014 | Puria et al. |
| 2014/0056453 A1 | 2/2014 | Olsen et al. |
| 2014/0084698 A1 | 3/2014 | Asanuma et al. |
| 2014/0107423 A1 | 4/2014 | Yaacobi |
| 2014/0153761 A1 | 6/2014 | Shennib et al. |
| 2014/0169603 A1 | 6/2014 | Sacha et al. |
| 2014/0177863 A1 | 6/2014 | Parkins |
| 2014/0194891 A1 | 7/2014 | Shahoian |
| 2014/0254856 A1 | 9/2014 | Blick et al. |
| 2014/0275734 A1 | 9/2014 | Perkins et al. |
| 2014/0286514 A1 | 9/2014 | Pluvinage et al. |
| 2014/0288356 A1 | 9/2014 | Van Vlem |
| 2014/0288358 A1 | 9/2014 | Puria et al. |
| 2014/0296620 A1 | 10/2014 | Puria et al. |
| 2014/0321657 A1 | 10/2014 | Stirnemann |
| 2014/0379874 A1 | 12/2014 | Starr et al. |
| 2015/0021568 A1 | 1/2015 | Gong et al. |
| 2015/0023540 A1 | 1/2015 | Fay et al. |
| 2015/0031941 A1 | 1/2015 | Perkins et al. |
| 2015/0049889 A1 | 2/2015 | Bern |
| 2015/0117689 A1 | 4/2015 | Bergs et al. |
| 2015/0124985 A1 | 5/2015 | Kim et al. |
| 2015/0201269 A1 | 7/2015 | Dahl et al. |
| 2015/0222978 A1 | 8/2015 | Murozaki et al. |
| 2015/0245131 A1 | 8/2015 | Facteau et al. |
| 2015/0358743 A1 | 12/2015 | Killion |
| 2016/0008176 A1 | 1/2016 | Goldstein |
| 2016/0029132 A1 | 1/2016 | Freed et al. |
| 2016/0064814 A1 | 3/2016 | Jang et al. |
| 2016/0087687 A1 | 3/2016 | Kesler et al. |
| 2016/0094043 A1 | 3/2016 | Hao et al. |
| 2016/0150331 A1 | 5/2016 | Wenzel |
| 2016/0277854 A1 | 9/2016 | Puria et al. |
| 2016/0309265 A1 | 10/2016 | Pluvinage et al. |
| 2016/0309266 A1 | 10/2016 | Olsen et al. |
| 2016/0330555 A1 | 11/2016 | Vonlanthen et al. |
| 2017/0040012 A1 | 2/2017 | Goldstein |
| 2017/0095202 A1 | 4/2017 | Facteau et al. |
| 2017/0150275 A1 | 5/2017 | Puria et al. |
| 2017/0195801 A1 | 7/2017 | Rucker et al. |
| 2017/0195806 A1 | 7/2017 | Atamaniuk et al. |
| 2017/0195809 A1 | 7/2017 | Teran et al. |
| 2017/0257710 A1 | 9/2017 | Parker |
| 2018/0014128 A1 | 1/2018 | Puria et al. |
| 2018/0020291 A1 | 1/2018 | Puria et al. |
| 2018/0020296 A1 | 1/2018 | Wenzel |
| 2018/0077503 A1 | 3/2018 | Shaquer et al. |
| 2018/0077504 A1 | 3/2018 | Shaquer et al. |
| 2018/0167750 A1 | 6/2018 | Freed et al. |
| 2018/0213331 A1 | 7/2018 | Rucker et al. |
| 2018/0213335 A1 | 7/2018 | Puria et al. |
| 2018/0262846 A1 | 9/2018 | Perkins et al. |
| 2018/0317026 A1 | 11/2018 | Puria |
| 2018/0376255 A1 | 12/2018 | Parker |
| 2019/0069097 A1 | 2/2019 | Perkins et al. |
| 2019/0158961 A1 | 5/2019 | Puria et al. |
| 2019/0166438 A1 | 5/2019 | Perkins et al. |
| 2019/0230449 A1 | 7/2019 | Puria |
| 2019/0253811 A1 | 8/2019 | Unno et al. |
| 2019/0253815 A1 | 8/2019 | Atamaniuk et al. |
| 2019/0269336 A1 | 9/2019 | Perkins et al. |
| 2020/0007998 A1 | 1/2020 | Rucker et al. |
| 2020/0037082 A1 | 1/2020 | Perkins et al. |
| 2020/0068323 A1 | 2/2020 | Perkins et al. |
| 2020/0084551 A1 | 3/2020 | Puria et al. |
| 2020/0084553 A1 | 3/2020 | Perkins et al. |
| 2020/0092662 A1 | 3/2020 | Wenzel |
| 2020/0092664 A1 | 3/2020 | Freed et al. |
| 2020/0128338 A1 | 4/2020 | Shaquer et al. |
| 2020/0186941 A1 | 6/2020 | Olsen et al. |
| 2020/0186942 A1 | 6/2020 | Flaherty et al. |
| 2020/0304927 A1 | 9/2020 | Shaquer et al. |
| 2020/0396551 A1 | 12/2020 | Dy et al. |
| 2021/0029451 A1 | 1/2021 | Fitz et al. |
| 2021/0029474 A1 | 1/2021 | Larkin et al. |
| 2021/0186343 A1 | 6/2021 | Perkins et al. |
| 2021/0266686 A1 | 8/2021 | Puria et al. |
| 2021/0274293 A1 | 9/2021 | Perkins et al. |
| 2021/0289301 A1 | 9/2021 | Atamaniuk et al. |
| 2021/0306777 A1 | 9/2021 | Rucker et al. |
| 2021/0314712 A1 | 10/2021 | Shaquer et al. |
| 2021/0392449 A1 | 12/2021 | Flaherty et al. |
| 2021/0400405 A1 | 12/2021 | Perkins et al. |

FOREIGN PATENT DOCUMENTS

| | | |
|---|---|---|
| CN | 1176731 A | 3/1998 |
| CN | 101459868 A | 6/2009 |
| CN | 101489171 A | 7/2009 |
| CN | 102301747 A | 12/2011 |
| CN | 105491496 A | 4/2016 |
| DE | 2044870 A1 | 3/1972 |
| DE | 3243850 A1 | 5/1984 |
| DE | 3508830 A1 | 9/1986 |
| DE | 102013114771 A1 | 6/2015 |
| EP | 0092822 A2 | 11/1983 |
| EP | 0242038 A2 | 10/1987 |
| EP | 0291325 A2 | 11/1988 |
| EP | 0296092 A2 | 12/1988 |
| EP | 0242038 A3 | 5/1989 |
| EP | 0296092 A3 | 8/1989 |
| EP | 0352954 A2 | 1/1990 |
| EP | 0291325 A3 | 6/1990 |
| EP | 0352954 A3 | 8/1991 |
| EP | 1035753 A1 | 9/2000 |
| EP | 1435757 A1 | 7/2004 |
| EP | 1845919 A1 | 10/2007 |
| EP | 1955407 A1 | 8/2008 |
| EP | 1845919 B1 | 9/2010 |
| EP | 2272520 A1 | 1/2011 |
| EP | 2301262 A1 | 3/2011 |
| EP | 2752030 A1 | 7/2014 |
| EP | 3101519 A1 | 12/2016 |
| EP | 2425502 B1 | 1/2017 |
| EP | 2907294 B1 | 5/2017 |
| EP | 3183814 A1 | 6/2017 |
| EP | 3094067 B1 | 10/2017 |
| EP | 3006079 B1 | 3/2019 |

(56) References Cited

FOREIGN PATENT DOCUMENTS

| | | |
|---|---|---|
| FR | 2455820 A1 | 11/1980 |
| GB | 2085694 A | 4/1982 |
| JP | S60154800 A | 8/1985 |
| JP | S621726 B2 | 1/1987 |
| JP | S63252174 A | 10/1988 |
| JP | S6443252 A | 2/1989 |
| JP | H09327098 A | 12/1997 |
| JP | 2000504913 A | 4/2000 |
| JP | 2004187953 A | 7/2004 |
| JP | 2004193908 A | 7/2004 |
| JP | 2005516505 A | 6/2005 |
| JP | 2006060833 A | 3/2006 |
| KR | 100624445 B1 | 9/2006 |
| WO | WO-9209181 A1 | 5/1992 |
| WO | WO-9501678 A1 | 1/1995 |
| WO | WO-9621334 A1 | 7/1996 |
| WO | WO-9736457 A1 | 10/1997 |
| WO | WO-9745074 A1 | 12/1997 |
| WO | WO-9806236 A1 | 2/1998 |
| WO | WO-9903146 A1 | 1/1999 |
| WO | WO-9915111 A1 | 4/1999 |
| WO | WO-0022875 A2 | 4/2000 |
| WO | WO-0022875 A3 | 7/2000 |
| WO | WO-0150815 A1 | 7/2001 |
| WO | WO-0158206 A2 | 8/2001 |
| WO | WO-0176059 A2 | 10/2001 |
| WO | WO-0158206 A3 | 2/2002 |
| WO | WO-0239874 A2 | 5/2002 |
| WO | WO-0239874 A3 | 2/2003 |
| WO | WO-03030772 A2 | 4/2003 |
| WO | WO-03063542 A2 | 7/2003 |
| WO | WO-03063542 A3 | 1/2004 |
| WO | WO-2004010733 A1 | 1/2004 |
| WO | WO-2005015952 A1 | 2/2005 |
| WO | WO-2005107320 A1 | 11/2005 |
| WO | WO-2006014915 A2 | 2/2006 |
| WO | WO-2006037156 A1 | 4/2006 |
| WO | WO-2006039146 A2 | 4/2006 |
| WO | WO-2006042298 A2 | 4/2006 |
| WO | WO-2006071210 A1 | 7/2006 |
| WO | WO-2006075169 A1 | 7/2006 |
| WO | WO-2006075175 A1 | 7/2006 |
| WO | WO-2006118819 A2 | 11/2006 |
| WO | WO-2006042298 A3 | 12/2006 |
| WO | WO-2007023164 A1 | 3/2007 |
| WO | WO-2009046329 A1 | 4/2009 |
| WO | WO-2009047370 A2 | 4/2009 |
| WO | WO-2009049320 A1 | 4/2009 |
| WO | WO-2009056167 A1 | 5/2009 |
| WO | WO-2009062142 A1 | 5/2009 |
| WO | WO-2009047370 A3 | 7/2009 |
| WO | WO-2009125903 A1 | 10/2009 |
| WO | WO-2009145842 A2 | 12/2009 |
| WO | WO-2009146151 A2 | 12/2009 |
| WO | WO-2009155358 A1 | 12/2009 |
| WO | WO-2009155361 A1 | 12/2009 |
| WO | WO-2009155385 A1 | 12/2009 |
| WO | WO-2010033932 A1 | 3/2010 |
| WO | WO-2010033933 A1 | 3/2010 |
| WO | WO-2010077781 A2 | 7/2010 |
| WO | WO-2010147935 A1 | 12/2010 |
| WO | WO-2010148345 A2 | 12/2010 |
| WO | WO-2011005500 A2 | 1/2011 |
| WO | WO-2012088187 A2 | 6/2012 |
| WO | WO-2012149970 A1 | 11/2012 |
| WO | WO-2013016336 A2 | 1/2013 |
| WO | WO-2016011044 A1 | 1/2016 |
| WO | WO-2016045709 A1 | 3/2016 |
| WO | WO-2016146487 A1 | 9/2016 |
| WO | WO-2017045700 A1 | 3/2017 |
| WO | WO-2017059218 A1 | 4/2017 |
| WO | WO-2017059240 A1 | 4/2017 |
| WO | WO-2017116791 A1 | 7/2017 |
| WO | WO-2017116865 A1 | 7/2017 |
| WO | WO-2018048794 A1 | 3/2018 |
| WO | WO-2018081121 A1 | 5/2018 |
| WO | WO-2018093733 A1 | 5/2018 |
| WO | WO-2019055308 A1 | 3/2019 |
| WO | WO-2019173470 A1 | 9/2019 |
| WO | WO-2019199680 A1 | 10/2019 |
| WO | WO-2019199683 A1 | 10/2019 |
| WO | WO-2020028082 A1 | 2/2020 |
| WO | WO-2020028083 A1 | 2/2020 |
| WO | WO-2020028084 A1 | 2/2020 |
| WO | WO-2020028085 A1 | 2/2020 |
| WO | WO-2020028086 A1 | 2/2020 |
| WO | WO-2020028087 A1 | 2/2020 |
| WO | WO-2020028088 A1 | 2/2020 |
| WO | WO-2020176086 A1 | 9/2020 |
| WO | WO-2021003087 A1 | 1/2021 |

OTHER PUBLICATIONS

Merriam-Webster's online dictionary definition of 'percutaneous'. Accessed on Jun. 3, 2013. 3 pages.
Edinger, J.R. High-Quality Audio Amplifier With Automatic Bias Control. Audio Engineering; Jun. 1947; pp. 7-9.
Hakansson, et al. Percutaneous vs. transcutaneous transducers for hearing by direct bone conduction (Abstract). Otolaryngol Head Neck Surg. Apr. 1990;102(4):339-44.
Mah. Fundamentals of photovoltaic materials. National Solar Power Research Institute. Dec. 21, 1998, 3-9.
Office Action dated Dec. 28, 2017 for U.S. Appl. No. 15/384,013.
PCT/US2019/019877 International Search Report and Written Opinion dated May 14, 2019.
PCT/US2019/020942 International Search Report and Written Opinion dated May 31, 2019.
Robles, et al. Mechanics of the mammalian cochlea. Physiol Rev. Jul. 2001;81(3):1305-52.
U.S. Appl. No. 15/384,013 Notice of Allowance dated Jan. 9, 2019.
U.S. Appl. No. 15/384,013 Notice of Allowance dated Oct. 10, 2018.
U.S. Appl. No. 15/384,013 Notice of Allowance dated Oct. 31, 2018.
U.S. Appl. No. 15/695,566 Office Action dated Feb. 19, 2019.
Web Books Publishing, "The Ear," accessed online Jan. 22, 2013, available online Nov. 2, 2007 at http://www.web-books.com/eLibrary/Medicine/Physiology/Ear/Ear.htm.
Wiki. Sliding Bias Variant 1, Dynamic Hearing (2015).
Asbeck, et al. Scaling Hard Vertical Surfaces with Compliant Microspine Arrays, The International Journal of Robotics Research 2006; 25; 1165-79.
Atasoy [Paper] Opto-acoustic Imaging. for BYM504E Biomedical Imaging Systems class at ITU, downloaded from the Internet www2.itu.edu.td-cilesiz/courses/BYM504-2005-OA504041413.pdf, 14 pages.
Athanassiou, et al. Laser controlled photomechanical actuation of photochromic polymers Microsystems. Rev. Adv. Mater. Sci. 2003; 5:245-251.
Autumn, et al. Dynamics of geckos running vertically, The Journal of Experimental Biology 209, 260-272, (2006).
Autumn, et al., Evidence for van der Waals adhesion in gecko setae, www.pnas.orgycgiydoiy10.1073ypnas.192252799 (2002).
Ayatollahi, et al. Design and Modeling of Micromachined Condenser MEMS Loudspeaker using Permanent Magnet Neodymium-Iron-Boron (Nd—Fe—B). IEEE International Conference on Semiconductor Electronics, 2006. ICSE '06, Oct. 29, 2006-Dec. 1, 2006; 160-166.
Baer, et al. Effects of Low Pass Filtering on the Intelligibility of Speech in Noise for People With and Without Dead Regions at High Frequencies. J. Acost. Soc. Am 112 (3), pt. 1, (Sep. 2002), pp. 1133-1144.
Best, et al. The influence of high frequencies on speech localization. Abstract 981 (Feb. 24, 2003) from www.aro.org/abstracts/abstracts.html.
Birch, et al. Microengineered systems for the hearing impaired. IEE Colloquium on Medical Applications of Microengineering, Jan. 31, 1996; pp. 2/1-2/5.

(56) References Cited

OTHER PUBLICATIONS

Boedts. Tympanic epithelial migration, Clinical Otolaryngology 1978, 3, 249-253.
Burkhard, et al. Anthropometric Manikin for Acoustic Research. J. Acoust. Soc. Am., vol. 58, No. 1, (Jul. 1975), pp. 214-222.
Camacho-Lopez, et al. Fast Liquid Crystal Elastomer Swims Into the Dark, Electronic Liquid Crystal Communications. Nov. 26, 2003; 9 pages total.
Carlile, et al. Frequency bandwidth and multi-talker environments. Audio Engineering Society Convention 120. Audio Engineering Society, May 20-23, 2006. Paris, France. 118:8 pages.
Carlile, et al. Spatialisation of talkers and the segregation of concurrent speech. Abstract 1264 (Feb. 24, 2004) from www.aro.org/abstracts/abstracts.html.
Cheng; et al., "A silicon microspeaker for hearing instruments. Journal of Micromechanics and Microengineering 14, No. 7 (2004): 859-866."
Cheng, et al. A Silicon Microspeaker for Hearing Instruments. Journal of Micromechanics and Microengineering 2004; 14(7):859-866.
Datskos, et al. Photoinduced and thermal stress in silicon microcantilevers. Applied Physics Letters. Oct. 19, 1998; 73(16):2319-2321.
Decraemer, et al. A method for determining three-dimensional vibration in the ear. Hearing Res., 77:19-37 (1994).
Dundas et al. The Earlens Light-Driven Hearing Aid: Top 10 questions and answers. Hearing Review. 2018;25(2):36-39.
Ear. Downloaded from the Internet. Accessed Jun. 17, 2008. 4 pages. URL:<http://wwwmgs.bionet.nsc.ru/mgs/gnw/trrd/thesaurus/Se/ear.html>.
Fay. Cat eardrum mechanics. Ph.D. thesis. Disseration submitted to Department of Aeronautics and Astronautics. Standford University. May 2001; 210 pages total.
Fay, et al. Cat eardrum response mechanics. Mechanics and Computation Division. Department of Mechanical Engineering. Standford University. 2002; 10 pages total.
Fay, et al. Preliminary evaluation of a light-based contact hearing device for the hearing impaired. Otol Neurotol. Jul. 2013;34(5):912-21. doi: 10.1097/MAO.0b013e31827de4b1.
Fay, et al. The discordant eardrum, PNAS, Dec. 26, 2006, vol. 103, No. 52, p. 19743-19748.
Fletcher. Effects of Distortion on the Individual Speech Sounds. Chapter 18, ASA Edition of Speech and Hearing in Communication, Acoust Soc.of Am. (republished in 1995) pp. 415-423.
Freyman, et al. Spatial Release from Informational Masking in Speech Recognition. J. Acost. Soc. Am., vol. 109, No. 5, pt. 1, (May 2001); 2112-2122.
Freyman, et al. The Role of Perceived Spatial Separation in the Unmasking of Speech. J. Acoust. Soc. Am., vol. 106, No. 6, (Dec. 1999); 3578-3588.
Fritsch, et al. EarLens transducer behavior in high-field strength MRI scanners. Otolaryngol Head Neck Surg. Mar. 2009;140(3):426-8. doi: 10.1016/j.otohns.2008.10.016.
Galbraith et al. A wide-band efficient inductive transdermal power and data link with coupling insensitive gain IEEE Trans Biomed Eng. Apr. 1987;34(4):265-75.
Gantz, et al. Broad Spectrum Amplification with a Light Driven Hearing System. Combined Otolaryngology Spring Meetings, 2016 (Chicago).
Gantz, et al. Light Driven Hearing Aid: A Multi-Center Clinical Study. Association for Research in Otolaryngology Annual Meeting, 2016 (San Diego).
Gantz, et al. Light-Driven Contact Hearing Aid for Broad Spectrum Amplification: Safety and Effectiveness Pivotal Study. Otology & Neurotology Journal, 2016 (in review).
Gantz, et al. Light-Driven Contact Hearing Aid for Broad-Spectrum Amplification: Safety and Effectiveness Pivotal Study. Otology & Neurotology. Copyright 2016. 7 pages.
Ge, et al., Carbon nanotube-based synthetic gecko tapes, p. 10792-10795, PNAS, Jun. 26, 2007, vol. 104, No. 26.

Gennum, GA3280 Preliminary Data Sheet: Voyageur TD Open Platform DSP System for Ultra Low Audio Processing, downloaded from the Internet:<<http://www.sounddesigntechnologies.com/products/pdf/37601DOC.pdf>>, Oct. 2006; 17 pages.
Gobin, et al. Comments on the physical basis of the active materials concept. Proc. SPIE 2003; 4512:84-92.
Gorb, et al. Structural Design and Biomechanics of Friction-Based Releasable Attachment Devices in Insects, Integr. Comp. Biol., 42:1127-1139 (2002).
Hato, et al. Three-dimensional stapes footplate motion in human temporal bones. Audiol. Neurootol., 8:140-152 (Jan. 30, 2003).
Headphones. Wikipedia Entry. Downloaded from the Internet. Accessed Oct. 27, 2008. 7 pages. URL: http://en.wikipedia.org/wiki/Headphones>.
Hofman, et al. Relearning Sound Localization With New Ears. Nature Neuroscience, vol. 1, No. 5, (Sep. 1998); 417-421.
International Search Report and Written Opinion dated Jan. 10, 2017 for International PCT Patent Application No. PCT/US2016/054757.
International Search Report and Written Opinion dated Feb. 28, 2017 for International PCT Patent Application No. PCT/US2016/067859.
International Search Report and Written Opinion dated Mar. 3, 2017 for International PCT Patent Application No. PCT/US2016/067464.
Izzo, et al. Laser Stimulation of Auditory Neurons: Effect of Shorter Pulse Duration and Penetration Depth. Biophys J. Apr. 15, 2008;94(8):3159-3166.
Izzo, et al. Laser Stimulation of the Auditory Nerve. Lasers Surg Med. Sep. 2006;38(8):745-753.
Izzo, et al. Selectivity of Neural Stimulation in the Auditory System: A Comparison of Optic and Electric Stimuli. J Biomed Opt. Mar.-Apr. 2007;12(2):021008.
Jian, et al. A 0.6 V, 1.66 mW energy harvester and audio driver for tympanic membrane transducer with wirelessly optical signal and power transfer. InCircuits and Systems (ISCAS), 2014 IEEE International Symposium on Jun. 1, 2014. 874-7. IEEE.
Jin, et al. Speech Localization. J. Audio Eng. Soc. convention paper, presented at the AES 112th Convention, Munich, Germany, May 10-13, 2002, 13 pages total.
Khaleghi, et al. Attenuating the ear canal feedback pressure of a laser-driven hearing aid. J Acoust Soc Am. Mar. 2017;141(3):1683.
Khaleghi et al. Attenuating the feedback pressure of a light-activated hearing device to allows microphone placement at the ear canal entrance. IHCON 2016, International Hearing Aid Research Conference, Tahoe City, CA, Aug. 2016.
Khaleghi, et al. Characterization of Ear-Canal Feedback Pressure due to Umbo-Drive Forces: Finite-Element vs. Circuit Models. ARO Midwinter Meeting 2016, (San Diego).
Khaleghi et al. Mechano-Electro-Magnetic Finite Element Model of a Balanced Armature Transducer for a Contact Hearing Aid. Proc. MoH 2017, Mechanics of Hearing workshop, Brock University, Jun. 2017.
Khaleghi et al. Multiphysics Finite Element Model of a Balanced Armature Transducer used in a Contact Hearing Device. ARO 2017, 40th ARO MidWinter Meeting, Baltimore, MD, Feb. 2017.
Kiessling, et al. Occlusion Effect of Earmolds with Different Venting Systems. J Am Acad Audiol. Apr. 2005;16(4):237-49.
Killion, et al. The case of the missing dots: AI and SNR loss. The Hearing Journal, 1998. 51(5), 32-47.
Killion. Myths About Hearing Noise and Directional Microphones. The Hearing Review. Feb. 2004; 11(2):14, 16, 18, 19, 72 & 73.
Killion. SNR loss: I can hear what people say but I can't understand them. The Hearing Review, 1997; 4(12):8-14.
Lee, et al. A Novel Opto-Electromagnetic Actuator Coupled to the tympanic Membrane. J Biomech. Dec. 5, 2008;41(16):3515-8. Epub Nov. 7, 2008.
Lee, et al. The optimal magnetic force for a novel actuator coupled to the tympanic membrane: a finite element analysis. Biomedical engineering: applications, basis and communications. 2007; 19(3):171-177.
Levy, et al. Characterization of the available feedback gain margin at two device microphone locations, in the fossa triangularis and

(56) References Cited

OTHER PUBLICATIONS

Behind the Ear, for the light-based contact hearing device. Acoustical Society of America (ASA) meeting, 2013 (San Francisco).
Levy, et al. Extended High-Frequency Bandwidth Improves Speech Reception in the Presence of Spatially Separated Masking Speech. Ear Hear. Sep.-Oct. 2015;36(5):e214-24. doi: 10.1097/AUD.0000000000000161.
Levy et al. Light-driven contact hearing aid: a removable direct-drive hearing device option for mild to severe sensorineural hearing impairment. Conference on Implantable Auditory Prostheses, Tahoe City, CA, Jul. 2017. 4 pages.
Lezal. Chalcogenide glasses—survey and progress. Journal of Optoelectronics and Advanced Materials. Mar. 2003; 5(1):23-34.
Makino, et al. Epithelial migration in the healing process of tympanic membrane perforations. Eur Arch Otorhinolaryngol. 1990; 247: 352-355.
Makino, et al., Epithelial migration on the tympanic membrane and external canal, Arch Otorhinolaryngol (1986) 243:39-42.
Markoff. Intuition + Money: An Aha Moment. New York Times Oct. 11, 2008, p. BU4, 3 pages total.
Martin, et al. Utility of Monaural Spectral Cues is Enhanced in the Presence of Cues to Sound-Source Lateral Angle. JARO. 2004; 5:80-89.
McElveen et al. Overcoming High-Frequency Limitations of Air Conduction Hearing Devices Using a Light-Driven Contact Hearing Aid. Poster presentation at The Triological Society, 120th Annual Meeting at COSM, Apr. 28, 2017; San Diego, CA.
Michaels, et al., Auditory Epithelial Migration on the Human Tympanic Membrane: II. The Existence of Two Discrete Migratory Pathways and Their Embryologic Correlates, The American Journal of Anatomy 189:189-200 (1990).
Moore, et al. Perceived naturalness of spectrally distorted speech and music. J Acoust Soc Am. Jul. 2003;114(1):408-19.
Moore, et al. Spectro-temporal characteristics of speech at high frequencies, and the potential for restoration of audibility to people with mild-to-moderate hearing loss. Ear Hear. Dec. 2008;29(6):907-22. doi: 10.1097/AUD.0B013E31818246F6.
Moore. Loudness perception and intensity resolution. Cochlear Hearing Loss, Chapter 4, pp. 90-115, Whurr Publishers Ltd., London (1998).
Murphy M, Aksak B, Sitti M. Adhesion and anisotropic friction enhancements of angled heterogeneous micro-fiber arrays with spherical and spatula tips. J Adhesion Sci Technol, vol. 21, No. 12-13, p. 1281-1296, 2007.
Murugasu, et al. Malleus-to-footplate versus malleus-to-stapes-head ossicular reconstruction prostheses: temporal bone pressure gain measurements and clinical audiological data. Otol Neurotol. Jul. 2005; 2694):572-582.
Musicant, et al. Direction-Dependent Spectral Properties of Cat External Ear: New Data and Cross-Species Comparisons. J. Acostic. Soc. Am, May 10-13, 2002, vol. 87, No. 2, (Feb. 1990), pp. 757-781.
National Semiconductor, LM4673 Boomer: Filterless, 2.65W, Mono, Class D Audio Power Amplifier, [Data Sheet] downloaded from the Internet:<<http://www.national.com/ds/LM/LM4673.pdf>>; Nov. 1, 2007; 24 pages.
Nishihara, et al. Effect of changes in mass on middle ear function. Otolaryngol Head Neck Surg. Nov. 1993;109(5):889-910.
O'Connor, et al. Middle ear Cavity and Ear Canal Pressure-Driven Stapes Velocity Responses in Human Cadaveric Temporal Bones. J Acoust Soc Am. Sep. 2006;120(3):1517-28.
Office Action dated Jan. 8, 2018 for U.S. Appl. No. 15/282,809.
Office Action dated Jan. 12, 2018 for U.S. Appl. No. 15/383,626.
Office Action dated Jan. 24, 2018 for U.S. Appl. No. 15/384,071.
"Office action dated Apr. 4, 2018 for U.S. Appl. No. 15/385,395."
Park, et al. Design and analysis of a microelectromagnetic vibration transducer used as an implantable middle ear hearing aid. J. Micromech. Microeng. vol. 12 (2002), pp. 505-511.
Perkins, et al. Light-based Contact Hearing Device: Characterization of available Feedback Gain Margin at two device microphone locations. Presented at AAO-HNSF Annual Meeting, 2013 (Vancouver).
Perkins, et al. The EarLens Photonic Transducer: Extended bandwidth. Presented at AAO-HNSF Annual Meeting, 2011 (San Francisco).
Perkins, et al. The EarLens System: New sound transduction methods. Hear Res. Feb. 2, 2010; 10 pages total.
Perkins, R. Earlens tympanic contact transducer: a new method of sound transduction to the human ear. Otolaryngol Head Neck Surg. Jun. 1996;114(6):720-8.
Poosanaas, et al. Influence of sample thickness on the performance of photostrictive ceramics, J. App. Phys. Aug. 1, 1998; 84(3):1508-1512.
Puria et al. A gear in the middle ear. ARO Denver CO, 2007b.
Puria, et al. Cues above 4 kilohertz can improve spatially separated speech recognition. The Journal of the Acoustical Society of America, 2011, 129, 2384.
Puria, et al. Extending bandwidth above 4 kHz improves speech understanding in the presence of masking speech. Association for Research in Otolaryngology Annual Meeting, 2012 (San Diego).
Puria, et al. Extending bandwidth provides the brain what it needs to improve hearing in noise. First international conference on cognitive hearing science for communication, 2011 (Linkoping, Sweden).
Puria, et al. Hearing Restoration: Improved Multi-talker Speech Understanding. 5th International Symposium on Middle Ear Mechanics in Research and Otology (MEMRO), Jun. 2009 (Stanford University).
Puria, et al. Imaging, Physiology and Biomechanics of the middle ear: Towards understating the functional consequences of anatomy. Stanford Mechanics and Computation Symposium, 2005, ed Fong J.
Puria, et al. Malleus-to-footplate ossicular reconstruction prosthesis positioning: cochleovestibular pressure optimization. Otol Nerotol. May 2005; 2693):368-379.
Puria, et al. Measurements and model of the cat middle ear: Evidence of tympanic membrane acoustic delay. J. Acoust. Soc. Am., 104(6):3463-3481 (Dec. 1998).
Puria, et al., Mechano-Acoustical Transformations in A. Basbaum et al., eds., The Senses: A Comprehensive Reference, v3, p. 165-202, Academic Press (2008).
Puria, et al. Middle Ear Morphometry From Cadaveric Temporal Bone MicroCT Imaging. Proceedings of the 4th International Symposium, Zurich, Switzerland, Jul. 27-30, 2006, Middle Ear Mechanics in Research and Otology, pp. 259-268.
Puria, et al. Sound-Pressure Measurements in The Cochlear Vestibule of Human-Cadaver Ears. Journal of the Acoustical Society of America. 1997; 101 (5-1): 2754-2770.
Puria, et al. Temporal-Bone Measurements of the Maximum Equivalent Pressure Output and Maximum Stable Gain of a Light-Driven Hearing System That Mechanically Stimulates the Umbo. Otol Neurotol. Feb. 2016;37(2):160-6. doi: 10.1097/MAO.0000000000000941.
Puria, et al. The EarLens Photonic Hearing Aid. Association for Research in Otolaryngology Annual Meeting, 2012 (San Diego).
Puria, et al. The Effects of bandwidth and microphone location on understanding of masked speech by normal-hearing and hearing-impaired listeners. International Conference for Hearing Aid Research (IHCON) meeting, 2012 (Tahoe City).
Puria, et al. Tympanic-membrane and malleus-incus-complex co-adaptations for high-frequency hearing in mammals. Hear Res. May 2010;263(1-2):183-90. doi: 10.1016/j.heares.2009.10.013. Epub Oct. 28, 2009.
Puria. Measurements of human middle ear forward and reverse acoustics: implications for otoacoustic emissions. J Acoust Soc Am. May 2003;113(5):2773-89.
Puria, S. Middle Ear Hearing Devices. Chapter 10. Part of the series Springer Handbook of Auditory Research pp. 273-308. Date: Feb. 9, 2013.

(56) References Cited

OTHER PUBLICATIONS

Qu, et al. Carbon Nanotube Arrays with Strong Shear Binding-On and Easy Normal Lifting-Off, Oct. 10, 2008 vol. 322 Science. 238-242.
Roush. SiOnyx Brings "Black Silicon" into the Light; Material Could Upend Solar, Imaging Industries. Xconomy, Oct. 12, 2008, retrieved from the Internet: www.xconomy.com/boston/2008/10/12/sionyx-brings-black-silicon-into-the-light¬material-could-upend-solar-imaging-industries> 4 pages total.
R.P. Jackson, C. Chlebicki, T.B. Krasieva, R. Zalpuri, W.J. Triffo, S. Puria, "Multiphoton and Transmission Electron Microscopy of Collagen in Ex Vivo Tympanic Membranes," Biomedcal Computation at STandford, Oct. 2008.
Rubinstein. How Cochlear Implants Encode Speech, Curr Opin Otolaryngol Head Neck Surg. Oct. 2004;12(5):444-8; retrieved from the Internet: www.ohsu.edu/nod/documents/week3/Rubenstein.pdf.
School of Physics Sydney, Australia. Acoustic Compliance, Inertance and Impedance. 1-6. (2018). http://www.animations.physics.unsw.edu.au/w/compliance-inertance-impedance.htm.
Sekaric, et al. Nanomechanical resonant structures as tunable passive modulators. App. Phys. Lett. Nov. 2003; 80(19):3617-3619.
Shaw. Transformation of Sound Pressure Level From the Free Field to the Eardrum in the Horizontal Plane. J. Acoust. Soc. Am., vol. 56, No. 6, (Dec. 1974), 1848-1861.
Shih. Shape and displacement control of beams with various boundary conditions via photostrictive optical actuators. Proc. IMECE. Nov. 2003; 1-10.
Song, et al. The development of a non-surgical direct drive hearing device with a wireless actuator coupled to the tympanic membrane. Applied Acoustics. Dec. 31, 2013;74(12):1511-8.
Sound Design Technologies,—Voyager TDTM Open Platform DSP System for Ultra Low Power Audio Processing—GA3280 Data Sheet. Oct. 2007; retrieved from the Internet:<<http://www.sounddes.com/pdf/37601DOC.pdf>>, 15 page total.
Wikipedia. Inductive Coupling. 1-2 (Jan. 11, 2018). https://en.wikipedia.org/wiki/Inductive_coupling.
Wikipedia. Pulse-density Coupling. 1-4 (Apr. 6, 2017). https://en.wikipedia.org/wiki/Pulse-density_modulation.
Spolenak, et al. Effects of contact shape on the scaling of biological attachments. Proc. R. Soc. A. 2005; 461:305-319.
Stenfelt, et al. Bone-Conducted Sound: Physiological and Clinical Aspects. Otology & Neurotology, Nov. 2005; 26 (6):1245-1261.
Struck, et al. Comparison of Real-world Bandwidth in Hearing Aids vs Earlens Light-driven Hearing Aid System. The Hearing Review. TechTopic: EarLens. Hearingreview.com. Mar. 14, 2017. pp. 24-28.
Stuchlik, et al. Micro-Nano Actuators Driven by Polarized Light. IEEE Proc. Sci. Meas. Techn. Mar. 2004; 151(2):131-136.
Suski, et al. Optically activated ZnO/Si02/Si cantilever beams. Sensors and Actuators A (Physical), 0 (nr: 24). 2003; 221-225.
Takagi, et al. Mechanochemical Synthesis of Piezoelectric PLZT Powder. KONA. 2003; 51(21):234-241.
Thakoor, et al. Optical microactuation in piezoceramics. Proc. SPIE. Jul. 1998; 3328:376-391.
The Scientist and Engineers Guide to Digital Signal Processing, copyright 01997-1998 by Steven W. Smith, available online at www.DSPguide.com.
Thompson. Tutorial on microphone technologies for directional hearing aids. Hearing Journal. Nov. 2003; 56(11):14-16, 18, 20-21.
Tzou, et al. Smart Materials, Precision Sensors/Actuators, Smart Structures, and Structronic Systems. Mechanics of Advanced Materials and Structures. 2004; 11:367-393.
Uchino, et al. Photostricitve actuators. Ferroelectrics. 2001; 258:147-158.
U.S. Appl. No. 15/282,809 Office Action dated Nov. 8, 2018.
U.S. Appl. No. 15/384,071 Office Action dated Oct. 30, 2018.
Vickers, et al. Effects of Low-Pass Filtering on the Intelligibility of Speech in Quiet for People With and Without Dead Regions at High Frequencies. J. Acoust. Soc. Am. Aug. 2001; 110(2):1164-1175.
Vinge. Wireless Energy Transfer by Resonant Inductive Coupling. Master of Science Thesis. Chalmers University of Technology. 1-83 (2015).
Vinikman-Pinhasi, et al. Piezoelectric and Piezooptic Effects in Porous Silicon. Applied Physics Letters, Mar. 2006; 88(11): 11905-111906.
Wang, et al. Preliminary Assessment of Remote Photoelectric Excitation of an Actuator for a Hearing Implant. Proceeding of the 2005 IEEE, Engineering in Medicine and Biology 27th nnual Conference, Shanghai, China. Sep. 1-4, 2005; 6233-6234.
Wiener, et al. On the Sound Pressure Transformation by the Head and Auditory Meatus of the Cat. Acta Otolaryngol. Mar. 1966; 61(3):255-269.
Wightman, et al. Monaural Sound Localization Revisited. J Acoust Soc Am. Feb. 1997;101(2):1050-1063.
Wikipedia. Resonant Inductive Coupling. 1-11 (Jan. 12, 2018). https://en.wikipedia.org/wiki/Resonant_inductive_coupling#cite_note-13.
Yao, et al. Adhesion and sliding response of a biologically inspired fibrillar surface: experimental observations, J. R. Soc. Interface (2008) 5, 723-733 doi:10.1098/rsif.2007.1225 Published online Oct. 30, 2007.
Yao, et al. Maximum strength for intermolecular adhesion of nanospheres at an optimal size. J.R. Soc. Interface doi:10.10981rsif.2008.0066 Published online 2008.
Yi, et al. Piezoelectric Microspeaker with Compressive Nitride Diaphragm. The Fifteenth IEEE International Conference on Micro Electro Mechanical Systems, 2002; 260-263.
Yu, et al. Photomechanics: Directed bending of a polymer film by light. Nature. Sep. 2003; 425:145.
Knight, D. Diode detectors for RF measurement. Paper. Jan. 1, 2016. [Retrieved from Jan. 2016 online] (retrieved Feb. 11, 2020) abstract, p. 1; section 1, p. 6; section 1.3, p. 9; section 3 voltage-double rectifier, p. 21; section 5, p. 27. URL: g3ynh.info/circuits/Diode_det.pdf.
Co-pending U.S. Appl. No. 17/007,800, filed Aug. 31, 2020.
Co-pending U.S. Appl. No. 17/066,341, inventors Larkin; Brendan et al., filed Oct. 8, 2020.
Co-pending U.S. Appl. No. 17/066,345, inventors Fitz; Kelly et al., filed Oct. 8, 2020.
Co-pending U.S. Appl. No. 17/356,217, inventors Imatani; Kyle et al., filed Jun. 23, 2021.
Folkeard, et al. Detection, Speech Recognition, Loudness, and Preference Outcomes With a Direct Drive Hearing Aid: Effects of Bandwidth. Trends Hear. Jan.-Dec. 2021; 25: 1-17. doi: 10.1177/2331216521999139.
Co-pending U.S. Appl. No. 17/412,850, inventors Flaherty; Bryan et al., filed Aug. 26, 2021.
Co-pending U.S. Appl. No. 17/549,722, inventor Rucker; Paul, filed Dec. 13, 2021.

* cited by examiner

Packet structure

CHARGING PROTOCOL FOR RECHARGEABLE HEARING SYSTEMS

CROSS REFERENCE TO RELATED APPLICATIONS

This application is a continuation of U.S. patent application Ser. No. 15/384,013, filed Dec. 19, 2016, now U.S. Pat. No. 10,306,381; which claims the benefit of U.S. Provisional Applications Nos. 62/273,002, filed Dec. 30, 2015; and 62/433,195, filed Dec. 12, 2016; the entirety of which are incorporated herein by reference.

The subject matter of this application is related to the subject matter of U.S. patent application Ser. No. 15/383,626, filed Dec. 19, 2016, Ser. No. 15/385,395, filed Dec. 19, 2016, and Ser. No. 15/384,071, filed Dec. 19, 2016 and PCT Applications Serial Nos. PCT/US2016/067464, filed Dec. 19, 2016 and PCT/US2016/067859, filed Dec. 19, 2016, which applications are incorporated herein by reference.

BACKGROUND OF THE INVENTION

Field of the Invention

The present invention is directed to methods and apparatus used in the charging of rechargeable batteries used in hearing aids and, more particularly to methods and apparatus used in the charging of rechargeable batteries for use in light driven hearing aids.

Background

Contact Hearing Systems, such as those described herein, generally include a contact hearing device, an ear tip and an audio processor. Contact hearing systems may also include additional components, such as an external communication device. An example of such system is a light driven hearing-aid system that transmits audio signal by laser to tympanic membrane transducer (TMT) which is placed on an ear drum.

Contact hearing devices for use in contact hearing systems may comprise a tiny actuator connected to a customized ring-shaped support platform that floats on tissue in the ear canal on or around the eardrum, and resides in the ear much like a contact lens resides on the surface of the eye. In such contact hearing devices, the actuator directly vibrates the eardrum, causing energy to be transmitted through the middle and inner ears to stimulate the brain and produce the perception of sound. In some contact hearing systems, the contact hearing device may comprise a photodetector, a microactuator connected to the photodetector and a support structure supporting the photodetector and microactuator.

Contact hearing systems may further include an Audio Processor (which may also be referred to as a BTE). The audio processor serves as a system for receiving and processing audio signals. Such audio processors may include one or more microphones adapted to receive sound which reaches the user's ear along with one or more components for processing the received sound and digital signal processing electronics and software which are adapted to process the received sound, including amplification of the received sound.

Contact hearing systems may also include ear tips which are adapted to fit into the ear of a user and transmit sound to the contact hearing device positioned at the distal end of the user's ear canal. Ear tips are designed to be placed into and reside in the ear canal of a user, where the structure is adapted to receive signals intended to be transmitted to the user's tympanic membrane or to a device positioned on or near the user's tympanic membrane (such as, for example, a contact hearing device). In light driven hearing aids, the signals may be transmitted by light, using, for example, a laser positioned in the ear tip. In such light driven contact hearing systems, the ear tip may be referred to as a light tip.

In hearing aid systems which utilize rechargeable batteries, it is important to ensure that the recharging process does not create problems. Problems in the recharging process may include overheating. In addition, because the charging process relies on the transmission of information between the charger and the BTE/processor being charged, including charge status. It is, therefore, important that the charger be communicating with the BTE/processor that it is actually charging. It would, therefor be advantageous to develop a charging protocol for use in charging a rechargeable battery in a hearing aid system.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same or like elements. The drawings are not necessarily to scale, emphasis instead being placed upon illustrating the principles of the preferred embodiments.

DETAILED DESCRIPTION OF THE INVENTION

Figure 1:
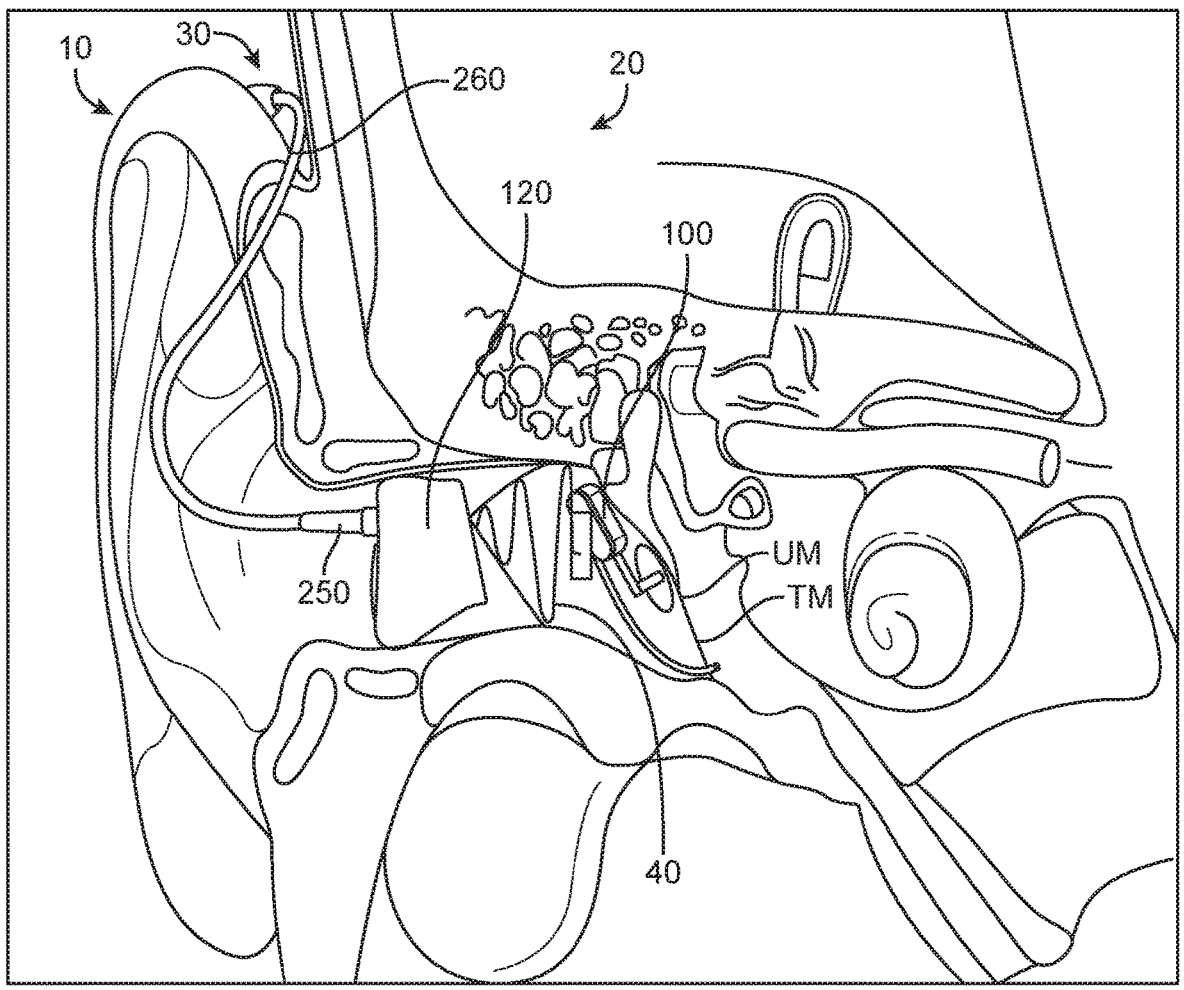
FIG. 1 is a schematic illustration of a hearing aid system including a contact hearing device according to the present invention.

FIG. 1 is a schematic illustration of a hearing aid system 10, including a contact hearing device 20 according to the present invention. In FIG. 1, audio processor 30 is connected to light tip 120 by cable 260, which includes taper tube 250. Light tip 120 is adapted to radiate light pulses 40 to tympanic lens 100 which is positioned on a user's tympanic membrane TM in a manner which allows it to drive the user's umbo UM directly.

Figure 2:
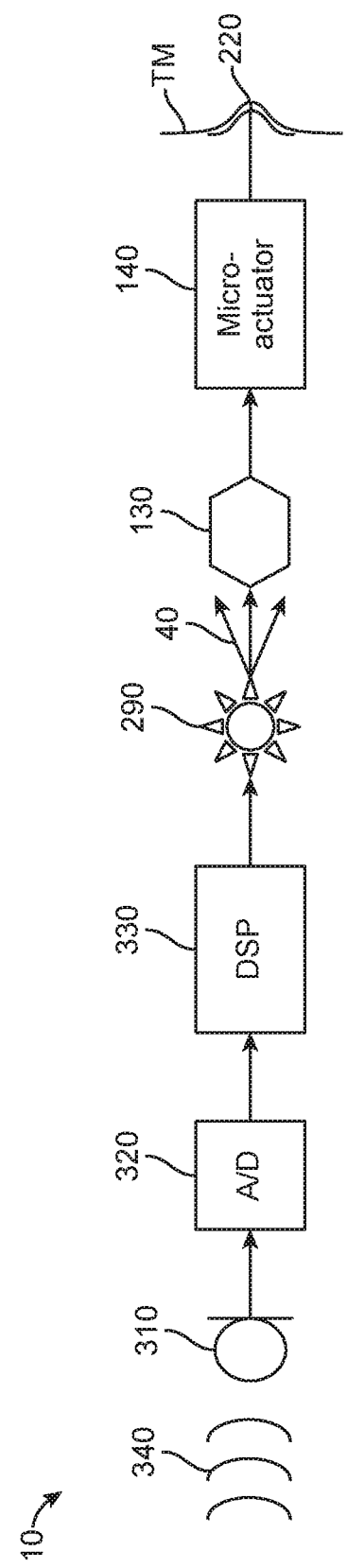
FIG. 2 is a block diagram of a hearing aid system according to the present invention.

FIG. 2 is a block diagram of a hearing aid system 10 according to the present invention. In FIG. 2, sound 340 is detected by microphone 310, which is connected to analog to digital converter 320. Sound signals processed by analog to digital converter 320 are transmitted to digital signal processor 330. Digital signal processor 330 is, in turn, connected to emitter 290, which radiates light 40 to photodetector 130. The output of photodetector 130 drives microactuator 140, which includes umbo lens 220. Umbo lens 220 is positioned on a user's tympanic membrane TM in a manner which allows it to move the user's tympanic membrane directly.

Figure 3:
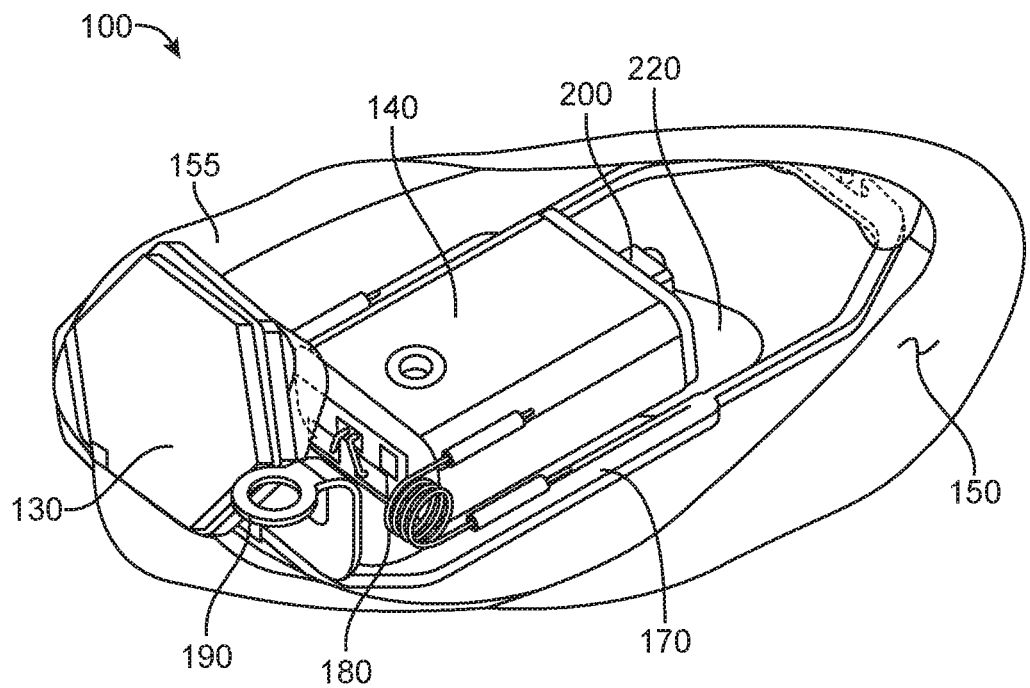
FIG. 3 is a top view of a tympanic lens according to the present invention.
Figure 4:
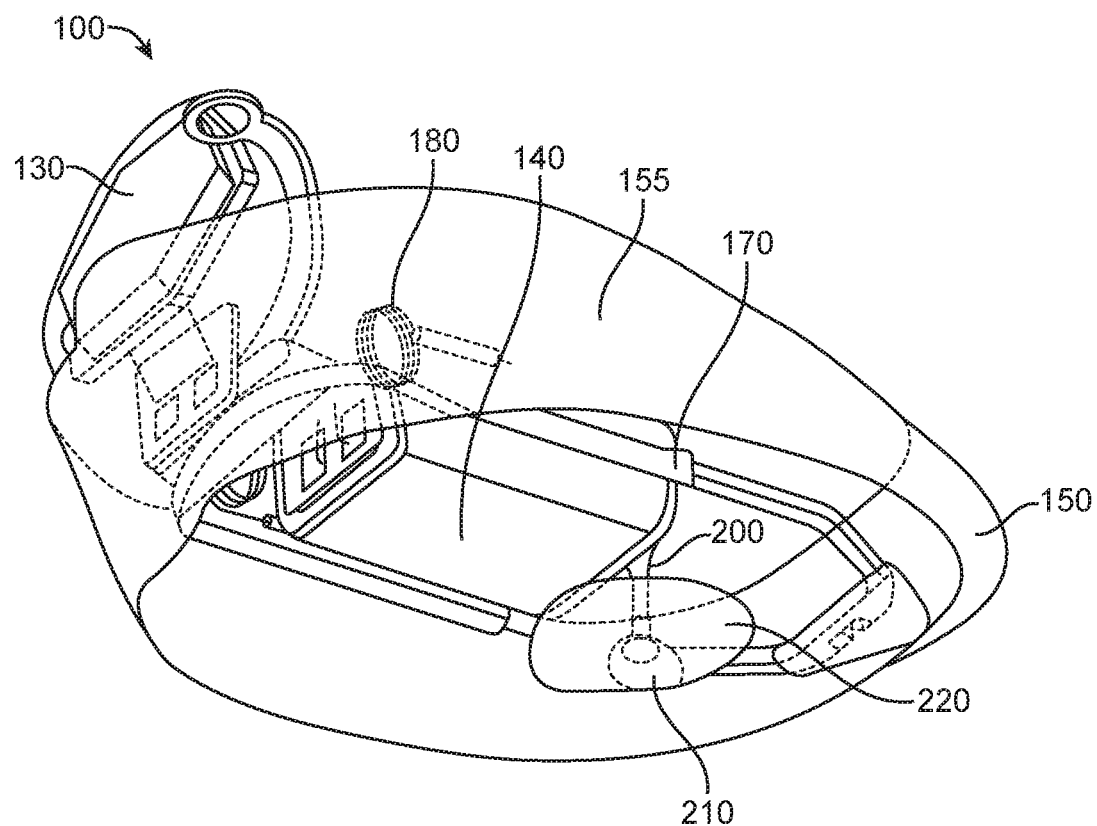
FIG. 4 is a bottom view of a tympanic lens according to the present invention.
Figure 4A:
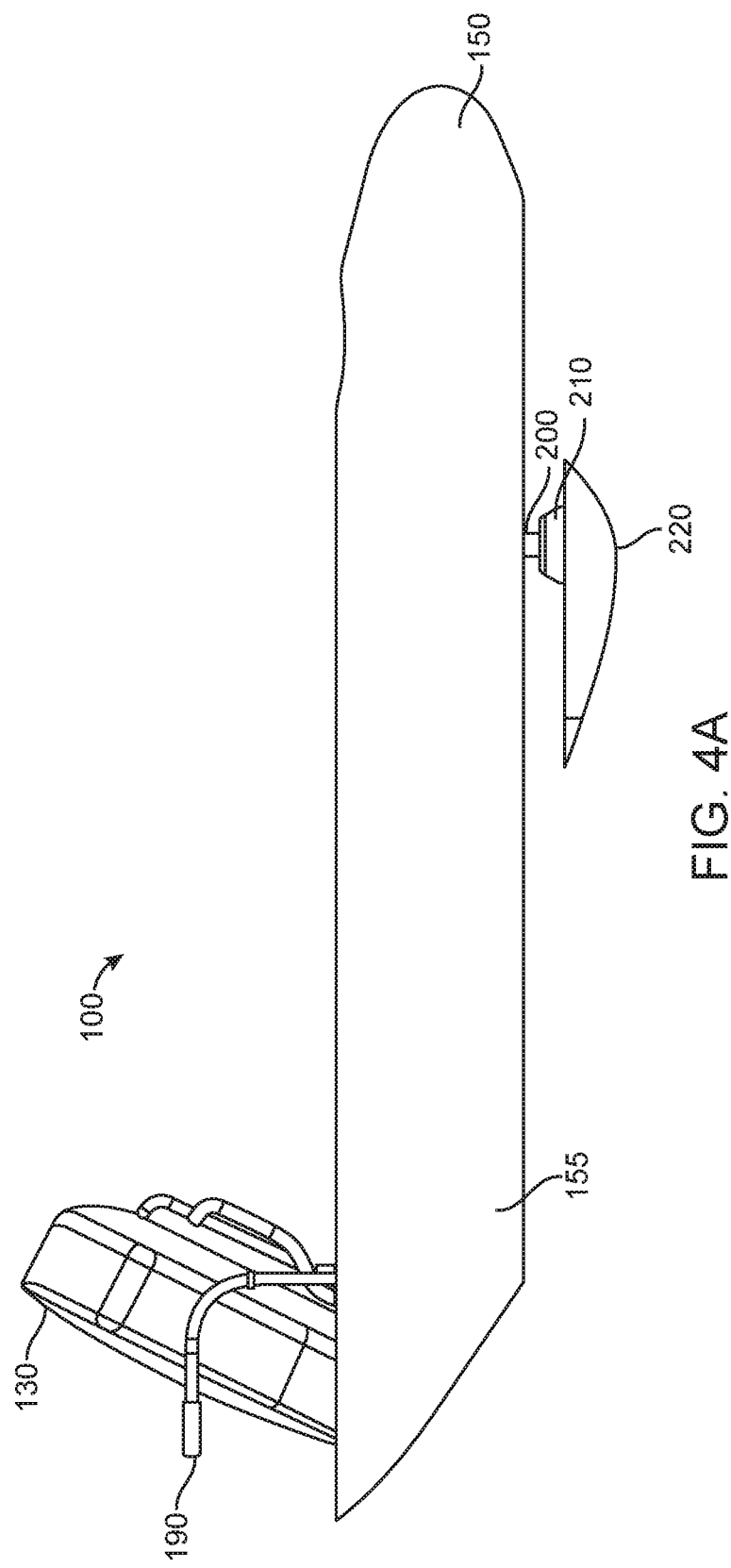
FIG. 4A is a side view of a tympanic lens according to the present invention.
Figure 5:
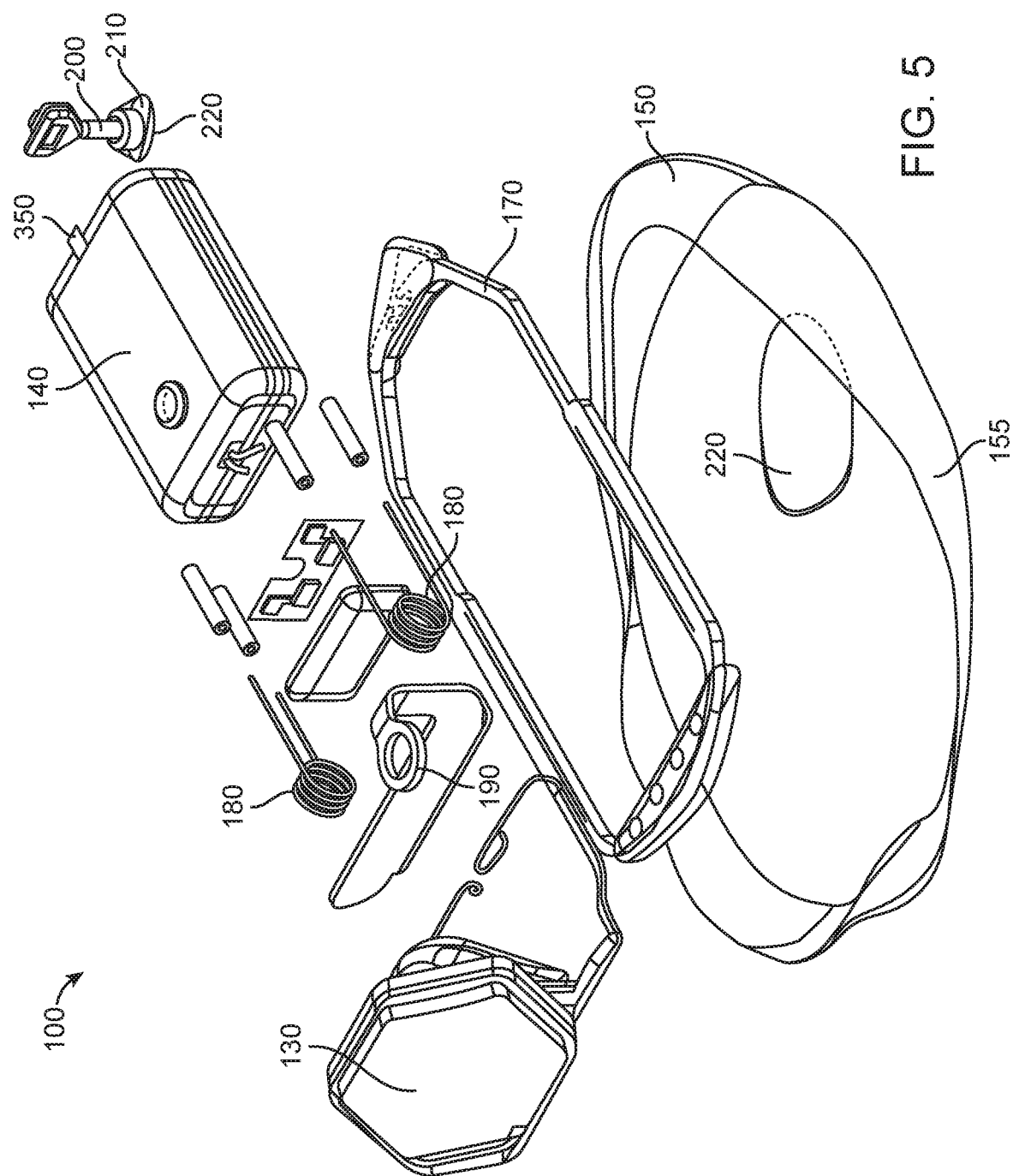
FIG. 5 is an exploded top view of a tympanic lens according to the present invention.

FIG. 3 is a top view of a tympanic lens 100 according to the present invention. FIG. 4 is a bottom view of a tympanic lens 100 according to the present invention. FIG. 4A is a side view of a tympanic lens 100 according to the present invention. FIG. 5 is an exploded top view of a tympanic lens 100 according to the present invention. In the tympanic lens of FIGS. 3, 4, 4A, and 5 a perimeter platform 155 is mounted on a chassis 170. Perimeter platform 155 may include a sulcus platform 155 at a medial end of perimeter platform 155. Chassis 170 may further include bias springs 180 (which may also be referred to as torsion springs) mounted thereon and supporting microactuator 140. Microactuator 140 is connected to drive post 200, which is connected to umbo lens 240 by adhesive 210. Chassis 170 further supports grasping tab 190 and photodetector 130.

Figure 6:
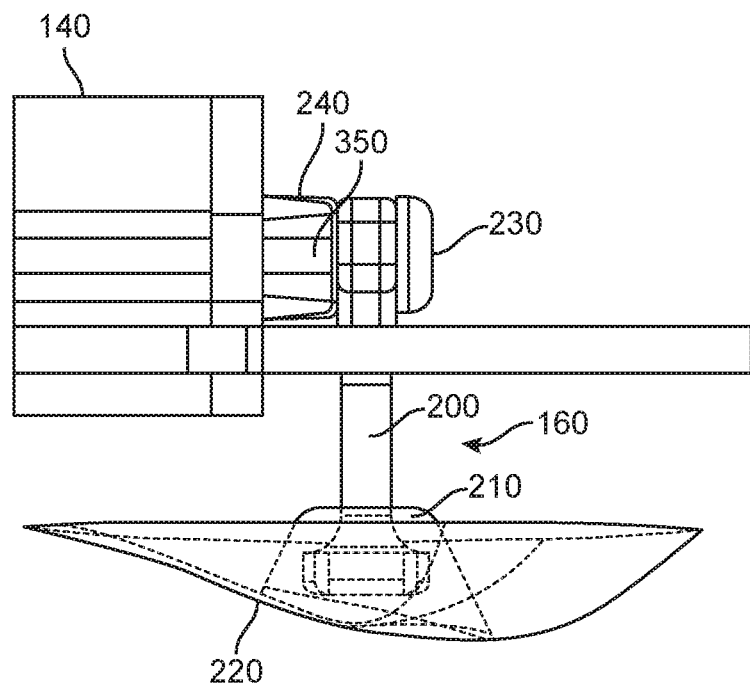
FIG. 6 is a side view of a distal end of a microactuator and umbo platform according to the present invention.

FIG. 6 is a side view of a distal end of a microactuator 140 and umbo platform 160 according to the present invention. Microactuator 140 includes membrane 240 and reed tip 230, which is positioned at the distal end of microactuator reed 350 (not shown in this view). Umbo platform 16, which is attached to microactuator 140 includes drive post 200, adhesive 210 and umbo lens 230. Umbo platform 160 is attached to microactuator reed 350 at a proximal end of drive post 200.

Figure 7:
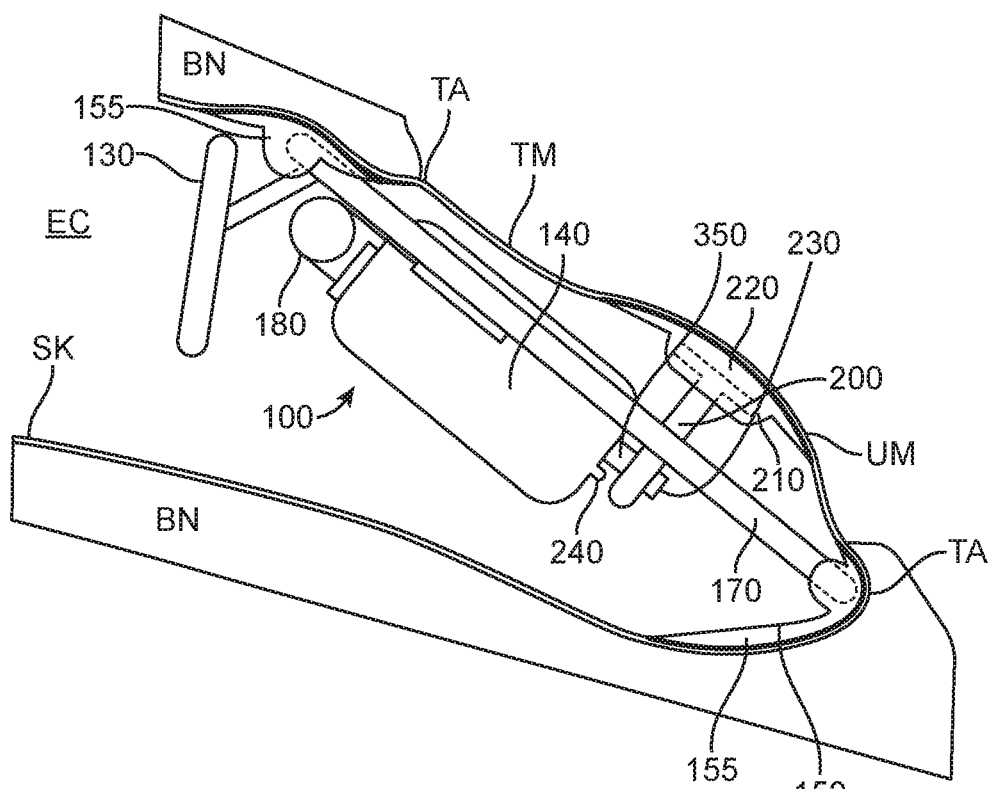
FIG. 7 is a side view of a tympanic lens according to the present invention positioned on the tympanic membrane of a user.
Figure 7A:
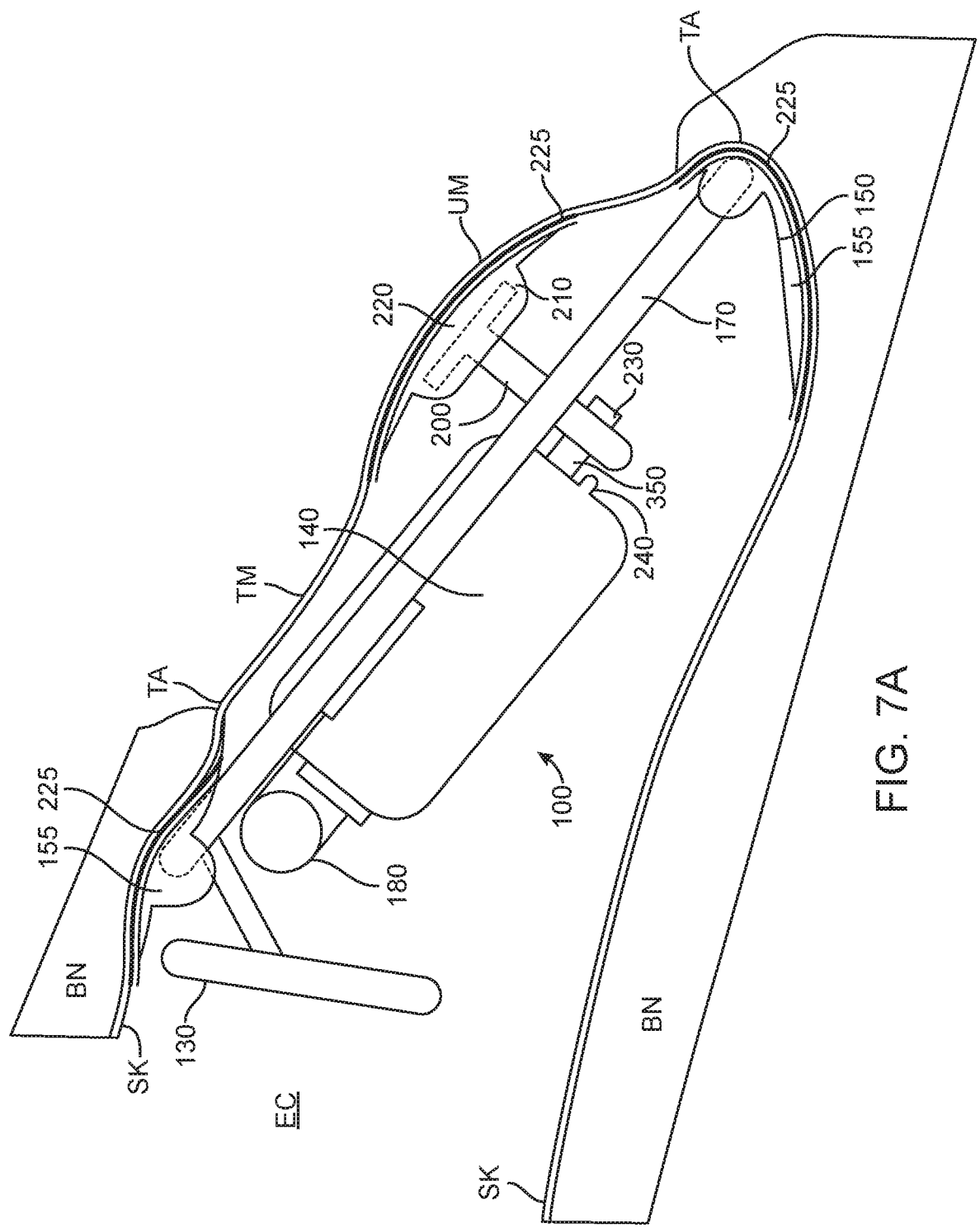
FIG. 7A is a further side view of a tympanic lens according to the present invention with the tympanic lens positioned on the tympanic membrane of a user.

FIG. 7 is a side view of a tympanic lens 100 according to the present invention where tympanic lens 100 is positioned on the tympanic membrane TM of a user. FIG. 7A is a further side view of a tympanic lens 100 according to the present invention positioned on the tympanic membrane TM of a user. In FIGS. 7 and 7A, tympanic lens 100 comprises perimeter platform 155 which includes sulcus platform 150 at a distal end thereof. Perimeter platform 155 is connected to chassis 170, which supports microactuator 140 through bias springs 180. Microactuator 140 includes microactuator reed 350 extending from a distal end thereof. Microactuator reed 350 is connected to umbo lens 220. Chassis 170 further supports photodetector 130, which is electrically connected to microactuator 140. In FIG. 7, perimeter platform 155 is positioned on skin SK covering the boney portion BN of the ear canal EC. The sulcus platform portion of perimeter platform 155 is positioned at the medial end of the ear canal in the tympanic annulus TA. Umbo lens 200 is positioned on umbo UM of tympanic membrane UM. In FIG. 7A, an oil layer 225, of, for example, mineral oil is positioned between perimeter platform 155 and skin SK and between umbo lens 220 and umbo UM.

Figure 7B:
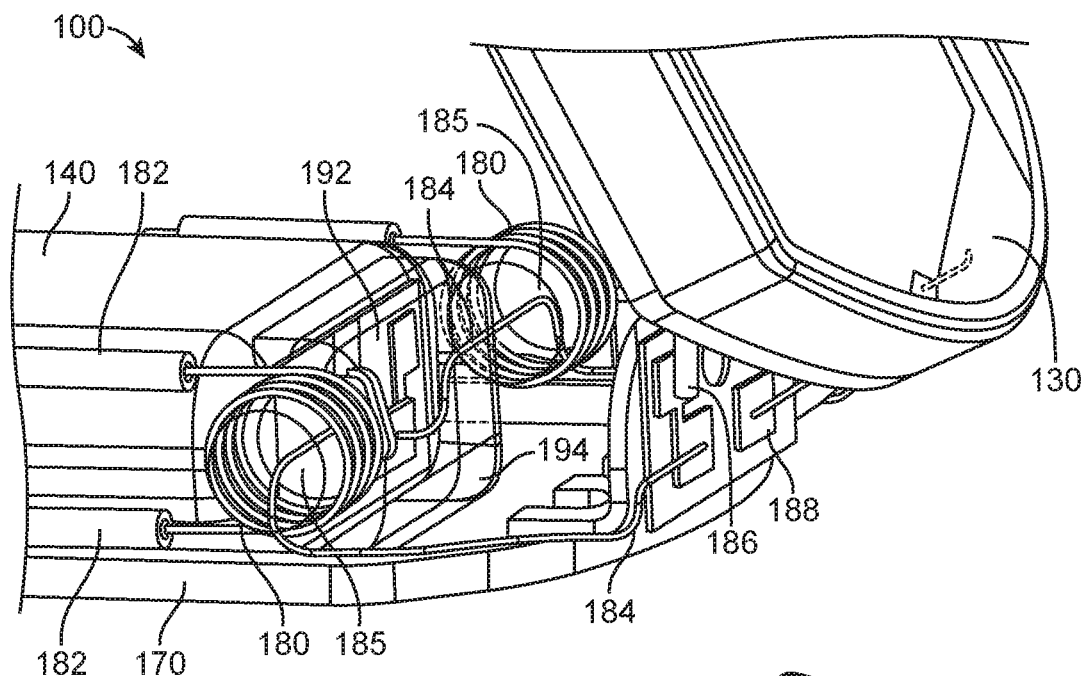
FIG. 7B is a view of a proximal end of a tympanic lens including a microactuator and bias springs according to the present invention.
Figure 7C:
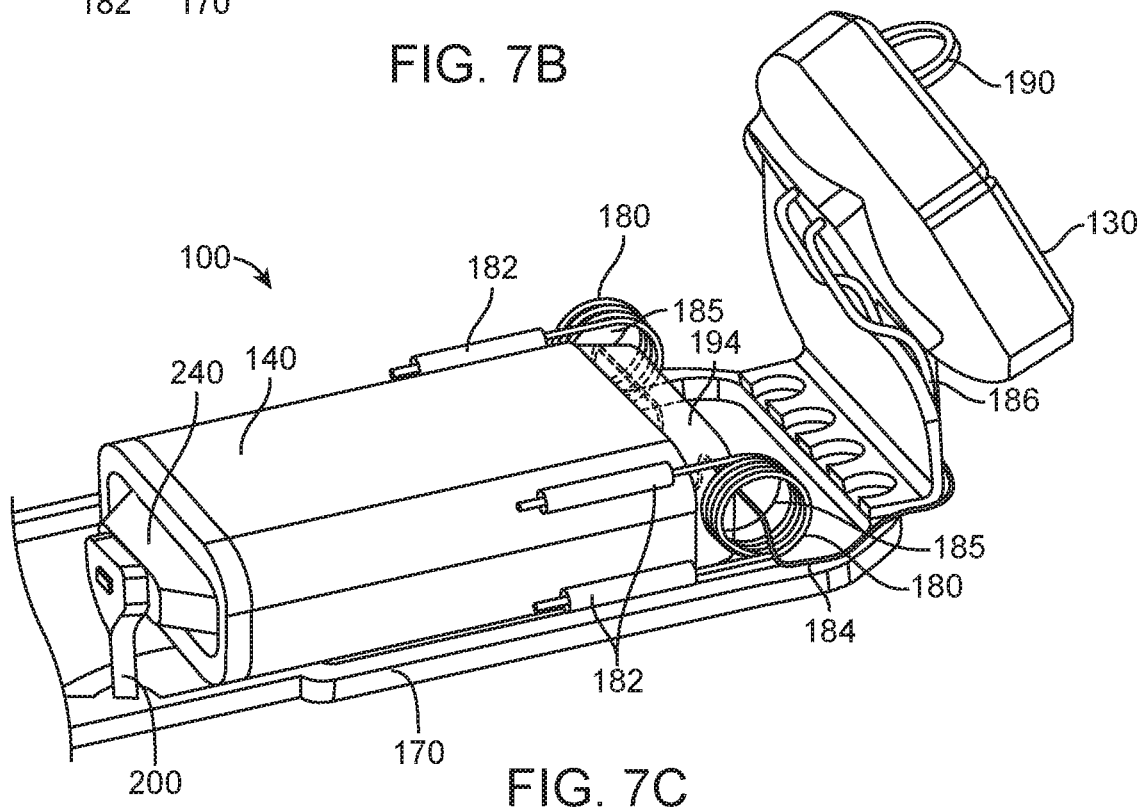
FIG. 7C is an alternate view of a proximal end of a tympanic lens including a microactuator and bias springs according to the present invention.

FIG. 7B is a view of a proximal end of tympanic lens 100 including microactuator 140 and bias springs 180 according to the present invention. FIG. 7C is an alternate view of a proximal end of tympanic lens 100 including bias springs 180 according to the present invention. The distal end of tympanic lens 100 includes bias springs 180 which are connected to microactuator 140 and chassis 170 by hypotubes 182. In embodiments of the invention, bias springs 180 include damper 185. Tympanic lens 100 may further include photodetector 130, which is electrically connected to microactuator 140 by photodetector wires 186, photodetector PCB 188, microactuator wires 184, and microactuator PCB 192. Microactuator PCB 192 may be protected by a potting material 194. Tympanic lens 100 further includes grasping tab 190. Microactuator 140 further includes drive post 200 and membrane 240.

Figure 7D:
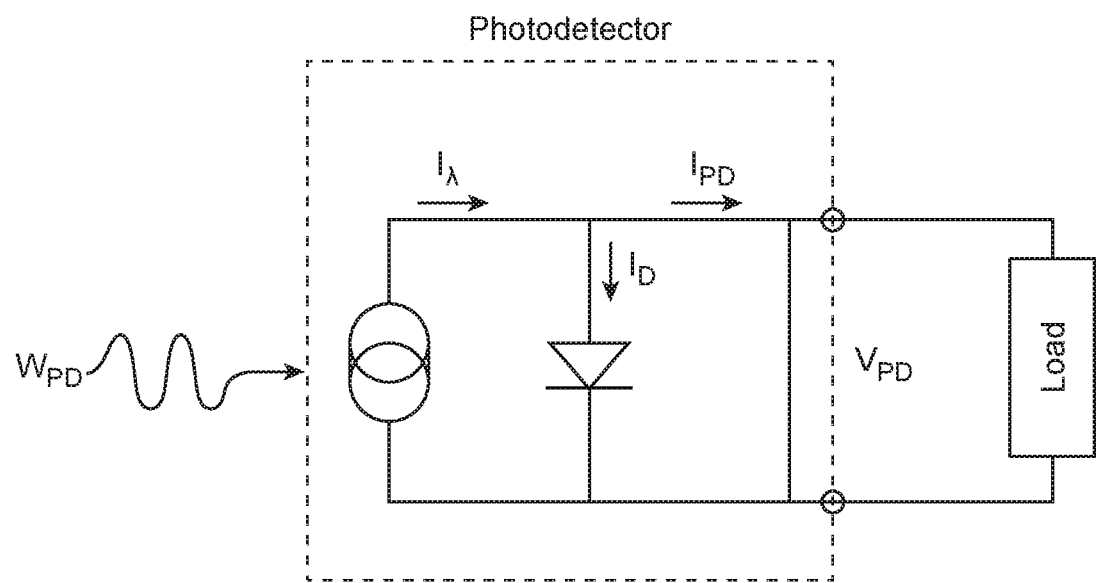
FIGS. 7D, 7E, and 7F are circuit diagrams of the tympanic lens, including a photodetector and microactuator.
Figure 7E:
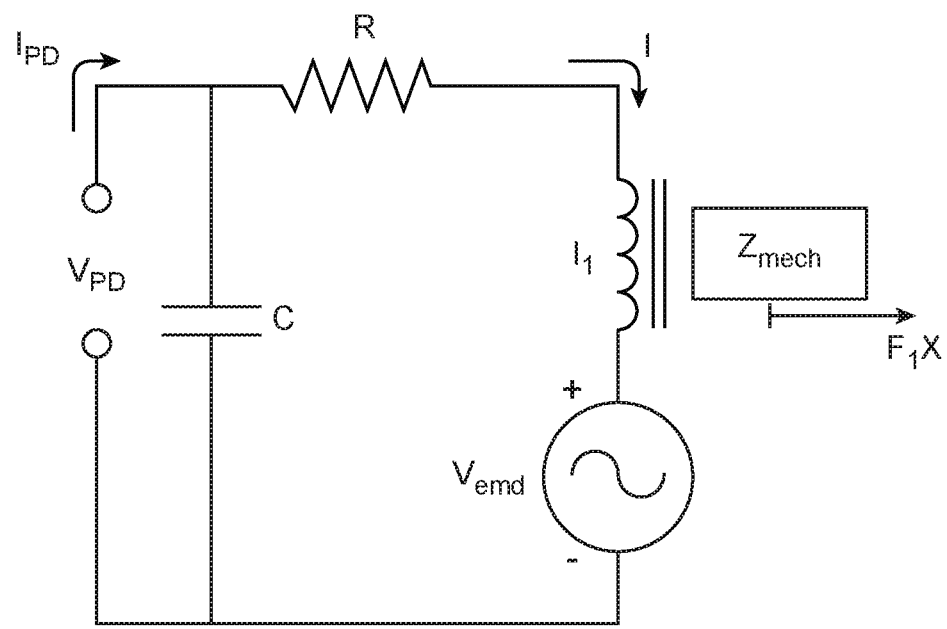
Figure 7F:
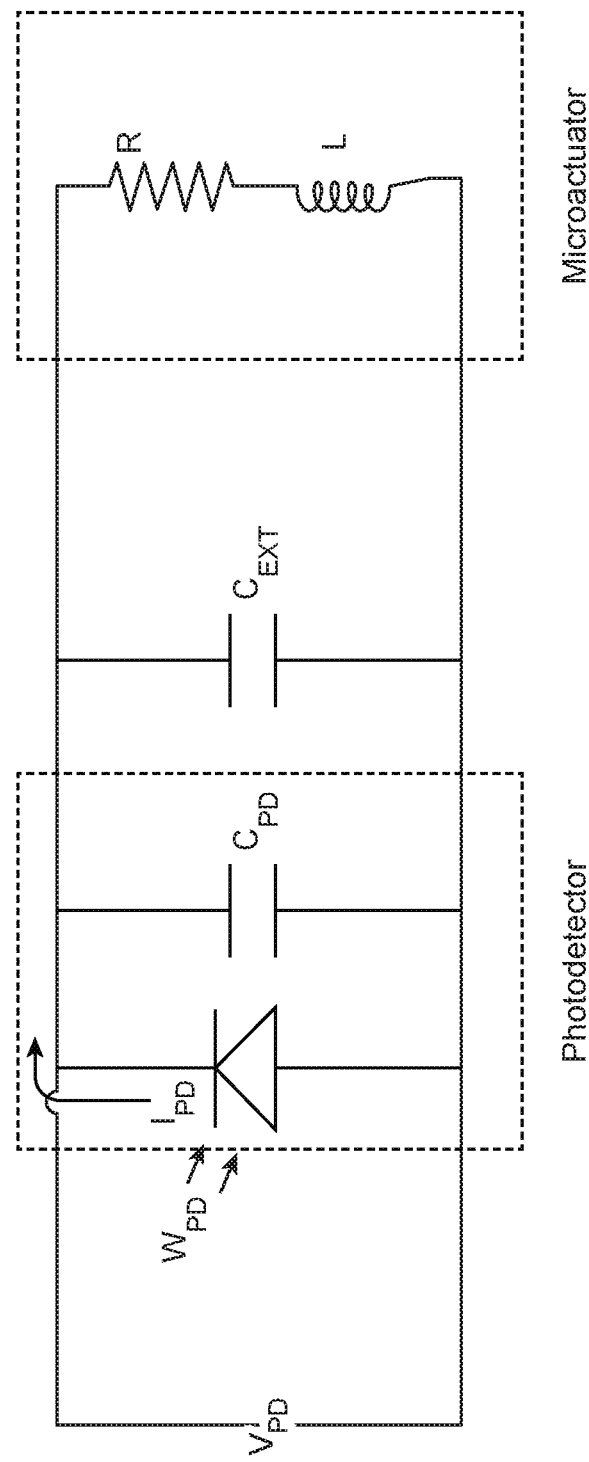

FIGS. 7D, 7E, and 7F are circuit diagrams of tympanic lens 100, including photodetector 130 and microactuator 140. In FIGS. 7D and 7E, the electrical output of photodetector 130 drives microactuator 140 directly.

Figure 8:
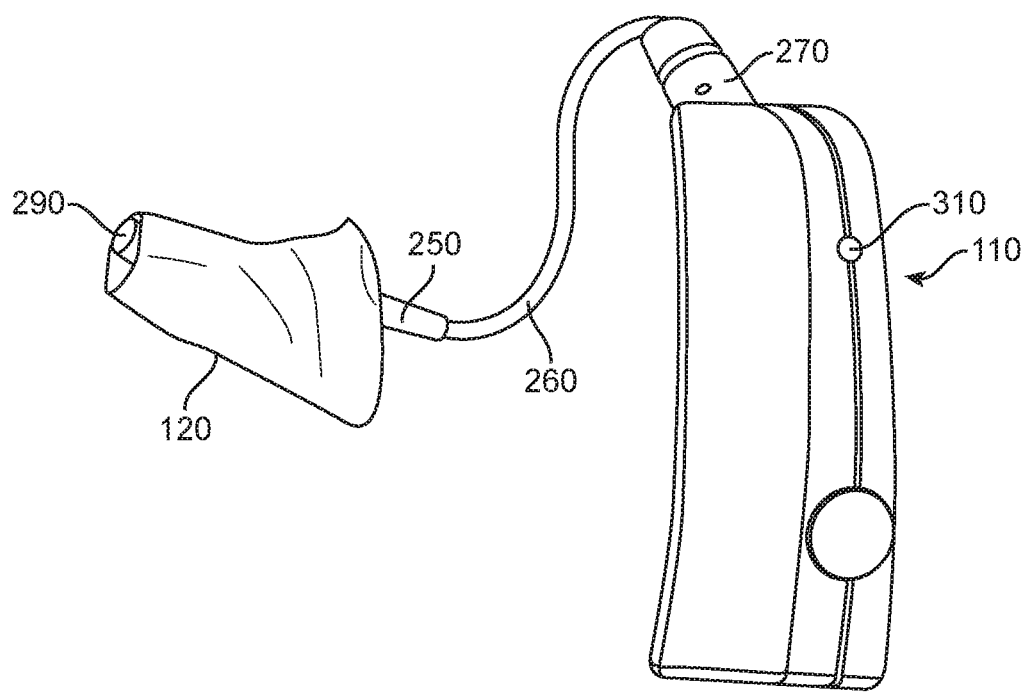
FIG. 8 is an illustration of a behind the ear device connected to a light tip in accordance with the present invention.

FIG. 8 is an illustration of a behind the ear device connected to a light tip in accordance with the present invention. In FIG. 8, BTE 110 includes microphone 310 and light tip connector 270. BTE 110 is connected to light tip 120 by cable 260. Light tip 120 includes taper tube 250 and emitter 290.

Figure 9:
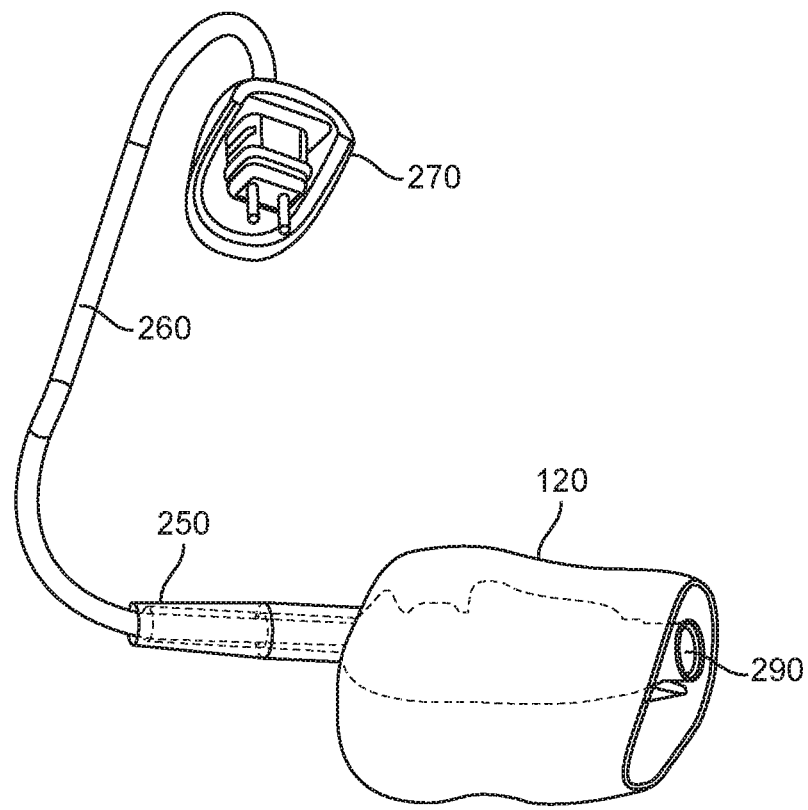
FIG. 9 is an illustration of a light tip and cable according to the present invention.

FIG. 9 is an illustration of a light tip and cable according to the present invention. In FIG. 9, cable 260 includes light tip connector 270 at a proximal end of cable 260.

Figure 10:
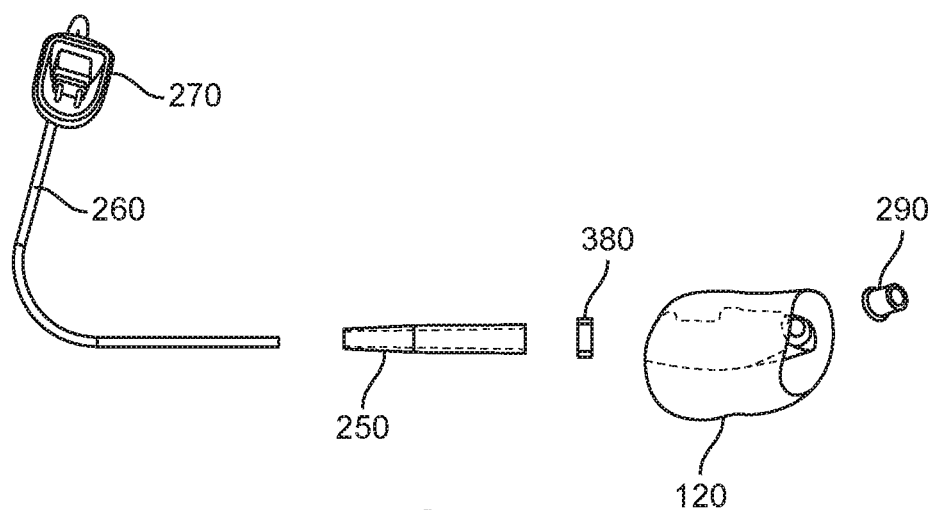
FIG. 10 is an exploded view of a light tip and cable assembly according to the present invention.

FIG. 10 is an exploded view of a light tip and cable assembly according to the present invention. In FIG. 10, lid 380 is illustrated.

Figure 10A:
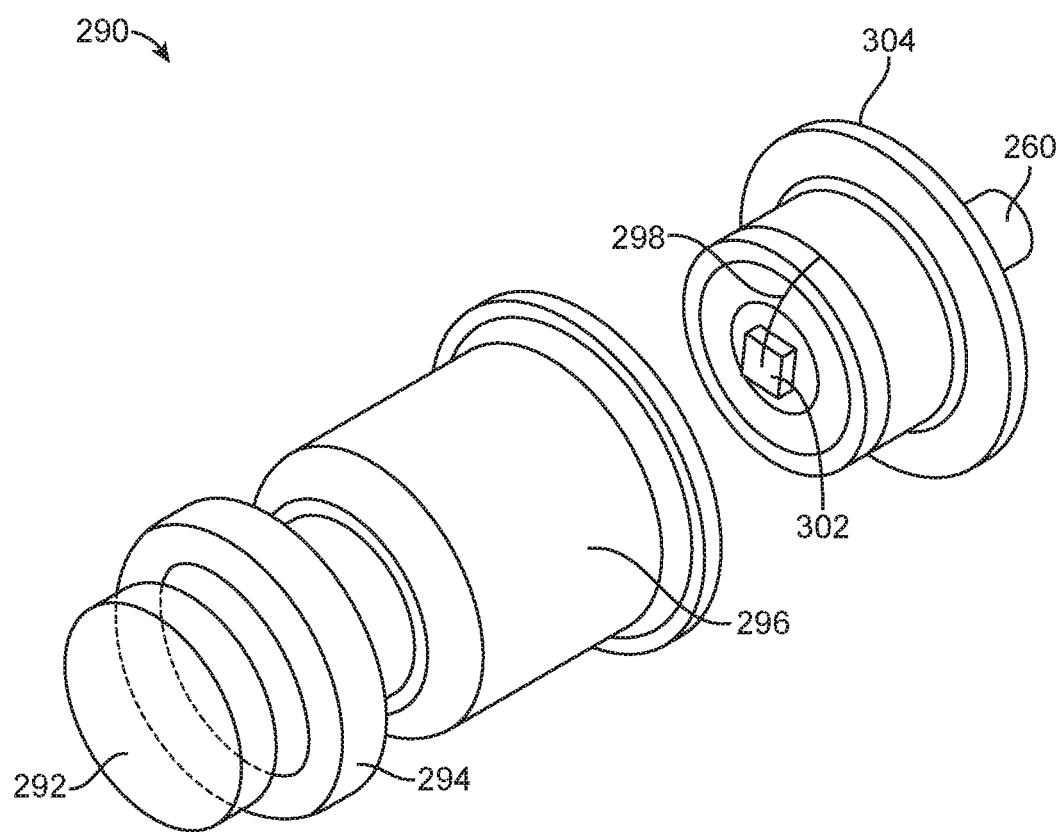
FIG. 10A is an exploded perspective view of an emitter according to the present invention.

FIG. 10A is an exploded perspective view of emitter 290 according to the present invention. In FIG. 10A, emitter 290 comprises diffuser 292, epoxy ring 294, cap 296, VCSEL 302, VCSEL wire 298, header 304, and cable 260. In embodiments of the invention, VCSEL 302 may be a vertical-cavity surface-emitting laser.

Figure 11:
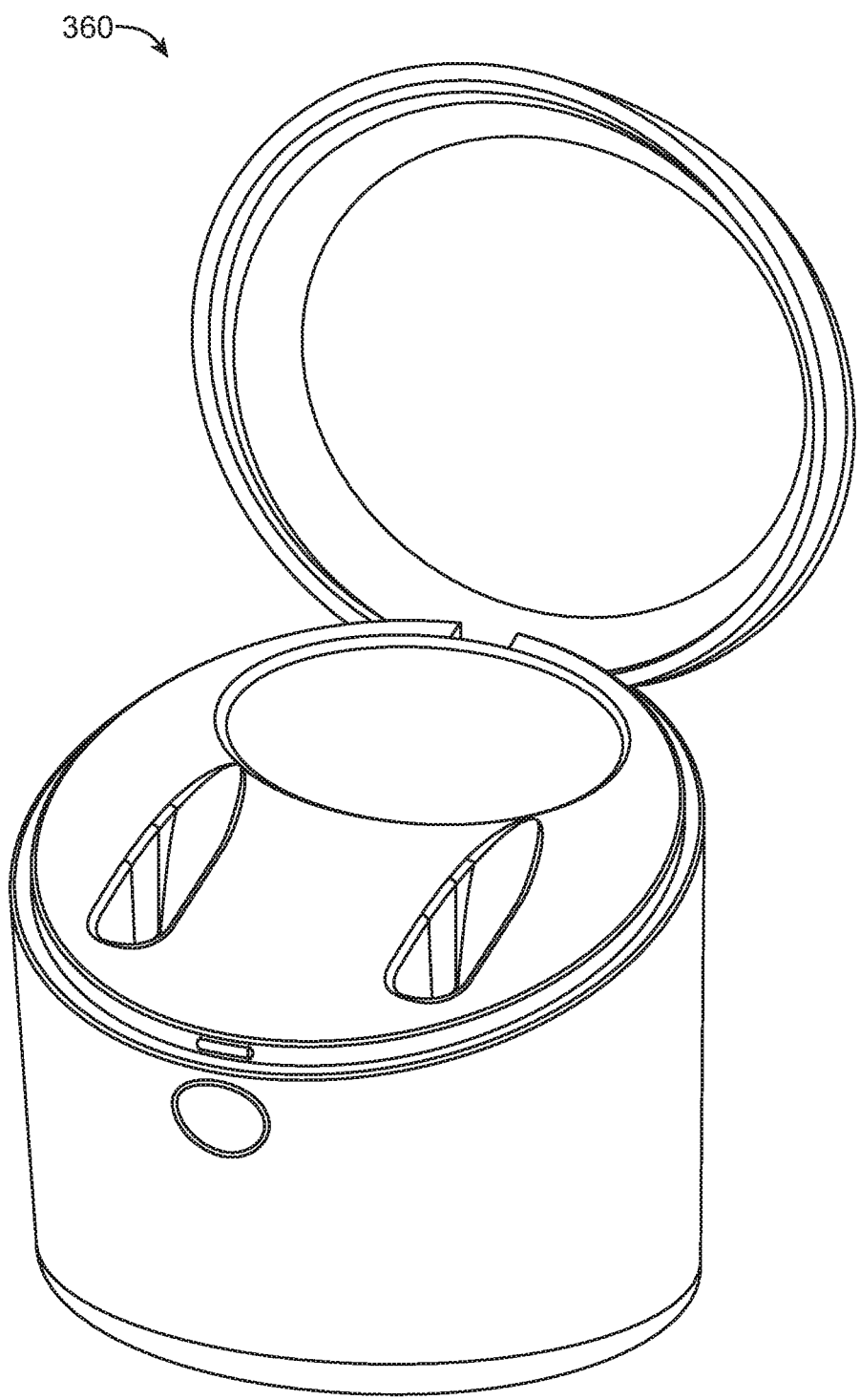
FIG. 11 is a perspective view of a light tip storage unit and charger according to the present invention.
Figure 12:
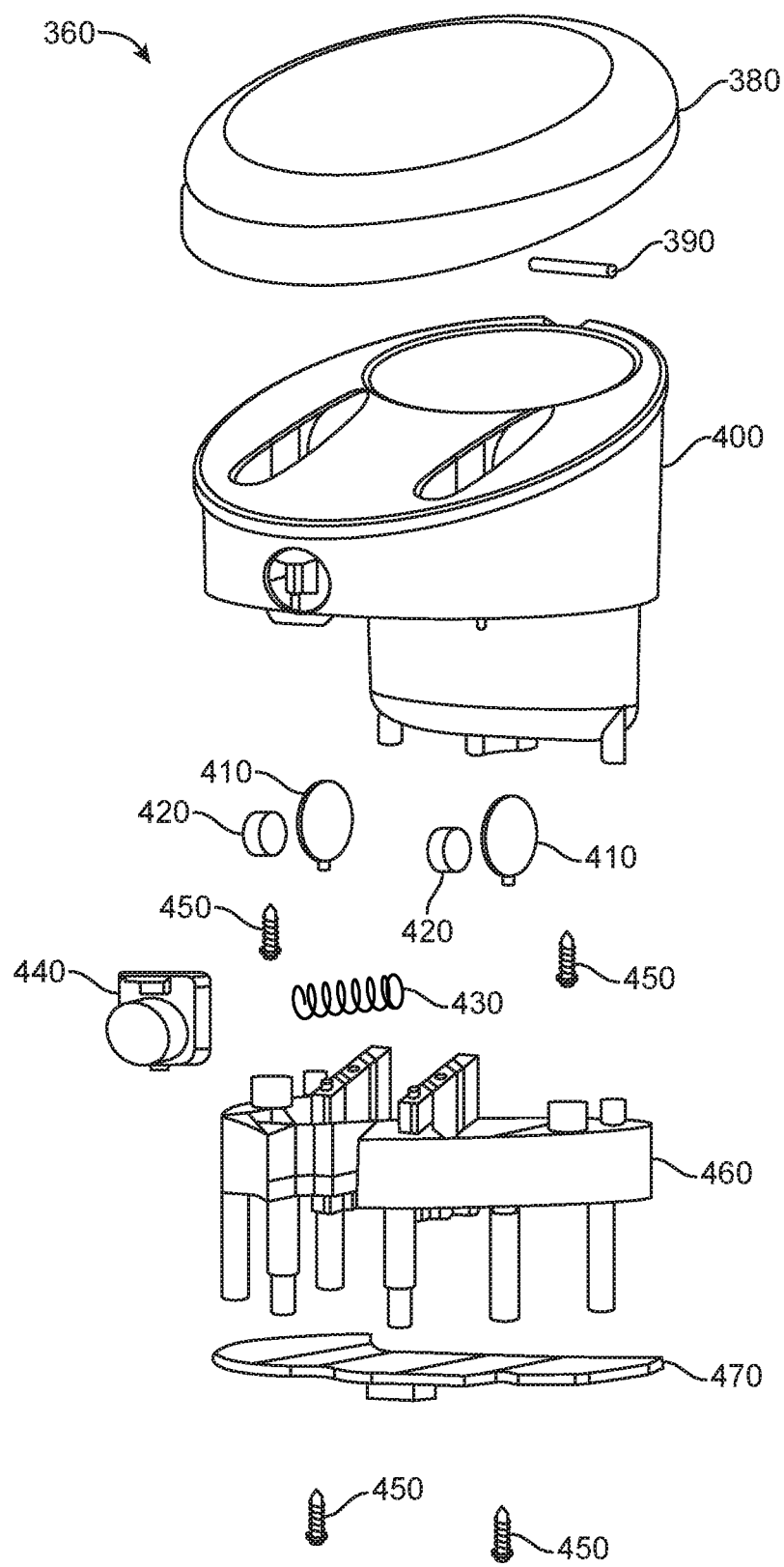
FIG. 12 is an exploded view of a light tip storage unit and charger according to the present invention.

FIG. 11 illustrates a light tip storage unit 360 with an integrated battery charger according to the present invention. FIG. 12 is an exploded view of light tip storage unit 360 according to the present invention. In FIG. 12, light tip storage unit 360 comprises screws 450, PCB Assembly 470, center chassis assembly 460, release button 440, spring 430, wireless charging coil 410, magnet 420, upper housing 400, hinge pin 390, and lid 380.

Figure 14:
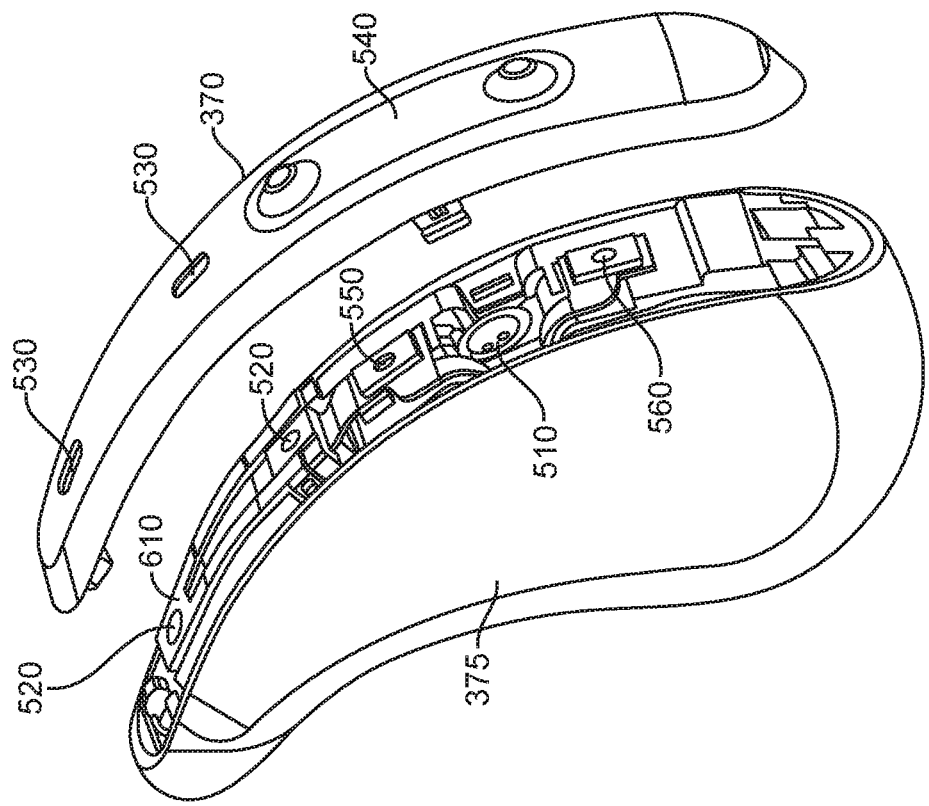
FIG. 14 is a side perspective view of a behind the ear device with an access cover removed according to the present invention.
Figure 13:
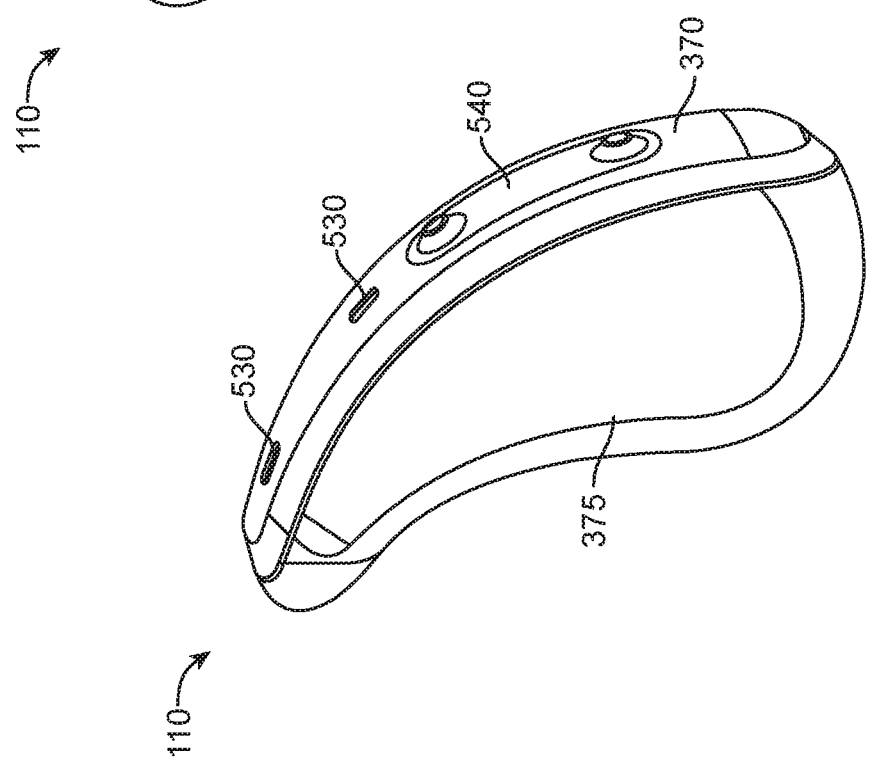
FIG. 13 is a side perspective view of a behind the ear device according to the present invention.

FIG. 13 is a side perspective view of behind the ear device 110 according to the present invention. FIG. 14 is a side perspective view of behind the ear device 110 according to the present invention with access cover 370 removed. In FIG. 14, behind the ear device 110 includes access cover 370, microphone through holes 520, microphone ports 530, antenna 610, first switch SW1 550, programing socket 510, second switch SW2 560, and rocker switch 540. In embodiments of the invention, rocker switch 540 may be used to control, for example, volume, program selection and/or to turn behind the ear 110 on and off.

Figure 15:
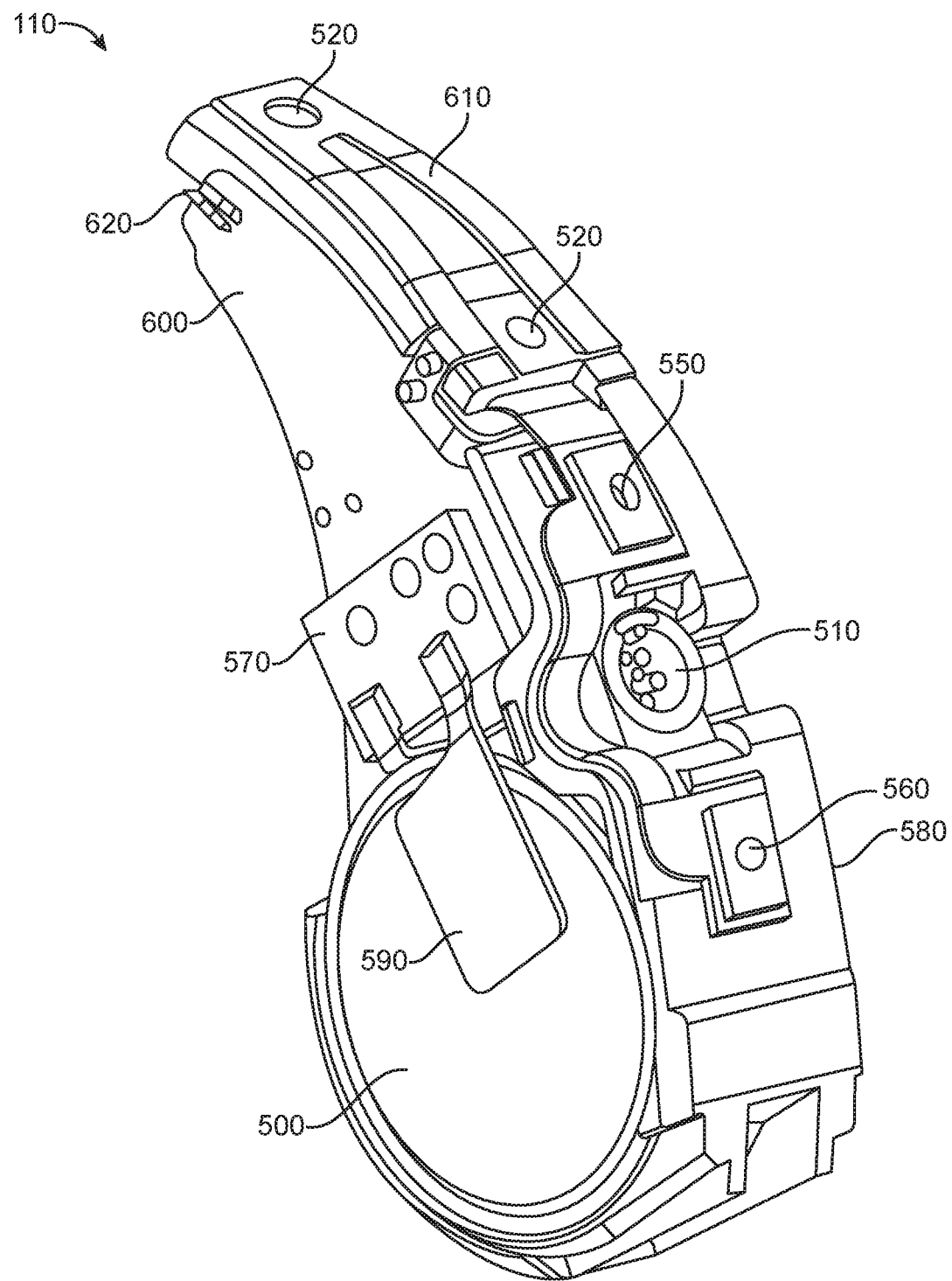
FIG. 15 is a perspective view of a behind the ear device according to the present invention with the access cover and BTE housing removed.

FIG. 15 is a view of behind the ear device 110 according to the present invention with access cover 370 and BTE housing 375 removed. In FIG. 15, BTE 110 includes microphone through holes 520, antenna 610, switch SW1 550, switch SW2 560, BTE chassis 580, battery 500, battery tab 590, PCM circuit 570, main PCB 600, and microsquid connector 620. In embodiments of the invention, PCM circuit 570 acts as an electronic protector for battery 500.

Figure 15A:
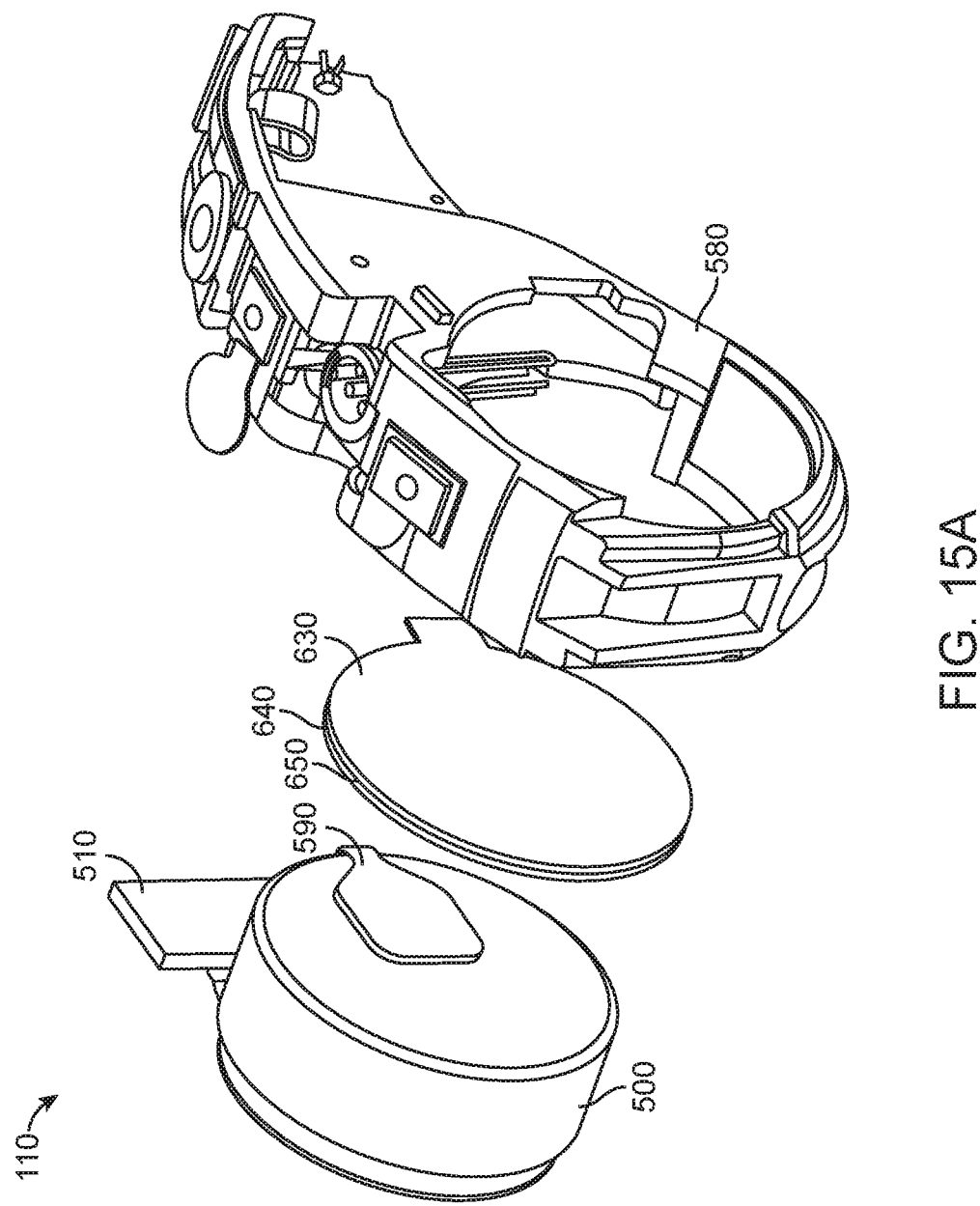
FIG. 15A is an exploded view of a portion of a behind the ear device, including the battery and charging coil according to the present invention.

FIG. 15A is an exploded view of a portion of behind the ear device 110, including battery 500 and coil antenna 630 (which may also be referred to as a charging coil) according to the present invention. In FIG. 15A, battery 500 is separated from coil antenna 630 by back iron 640 and spacer 650.

Figure 15B:
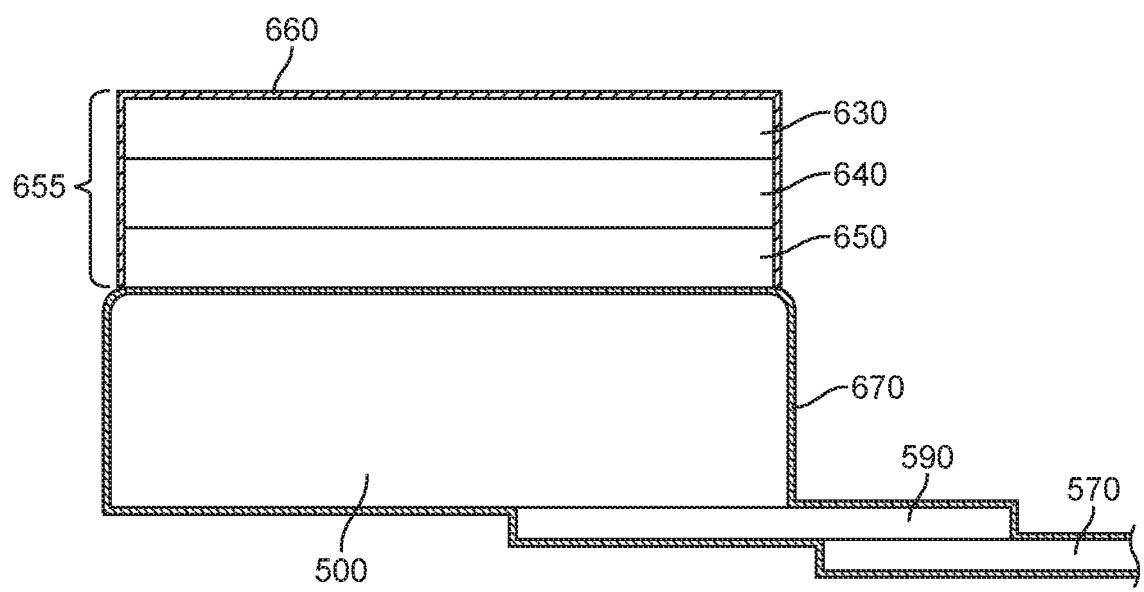
FIG. 15B is an illustration of the battery and coil antenna with back iron, including the coatings used to protect the battery and coil structure.

FIG. 15B is an illustration of battery 500 and coil antenna 630 with back iron 640 and spacer 650 including the coatings used to protect battery 500 and coil antenna 630. In FIG. 15B, coil antenna 630, back iron 640, and spacer 650 form antenna stack 655. Antenna stack 655 is covered by a first conformal coating 660, which protects antenna stack 655 from fluid ingress. Battery 500 is coated with a second coating material 670, which may be, for example, Parylene. The interface between battery 500 and antenna stack 655 does not include conformal coating 660. Second coating material 670 coats all of battery 500, battery tab 590, and PCM Circuit 570, including the interface between battery 500 and antenna stack 655.

Figure 16:
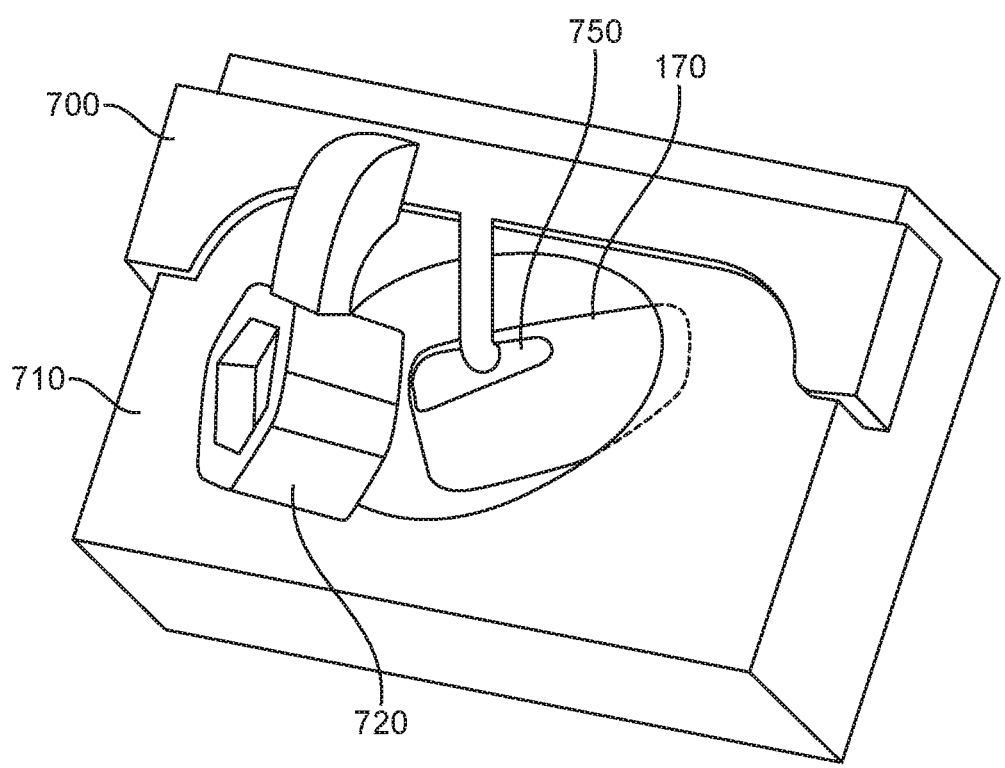
FIG. 16 is an illustration of an alignment tool mounted on a mold of an ear canal according to the present invention.

FIG. 16 is an illustration of an alignment tool 700 mounted on tympanic lens mold 710 according to the present invention. In FIG. 16, alignment tool 700 includes chassis alignment feature 750 and photodetector alignment feature 720. Chassis alignment feature 750 is used to align chassis 170 of tympanic lens 100 (not shown) in tympanic lens mold 710. Photo Detector Alignment Feature 720 is used to align a photodetector 130 (not shown), prior to gluing photodetector 130 in place on chassis 170. In embodiments of the invention, photodetector alignment feature 720 and chassis alignment feature 750 are custom designed for each patient using a digital model of the patient's anatomy.

Figure 17:
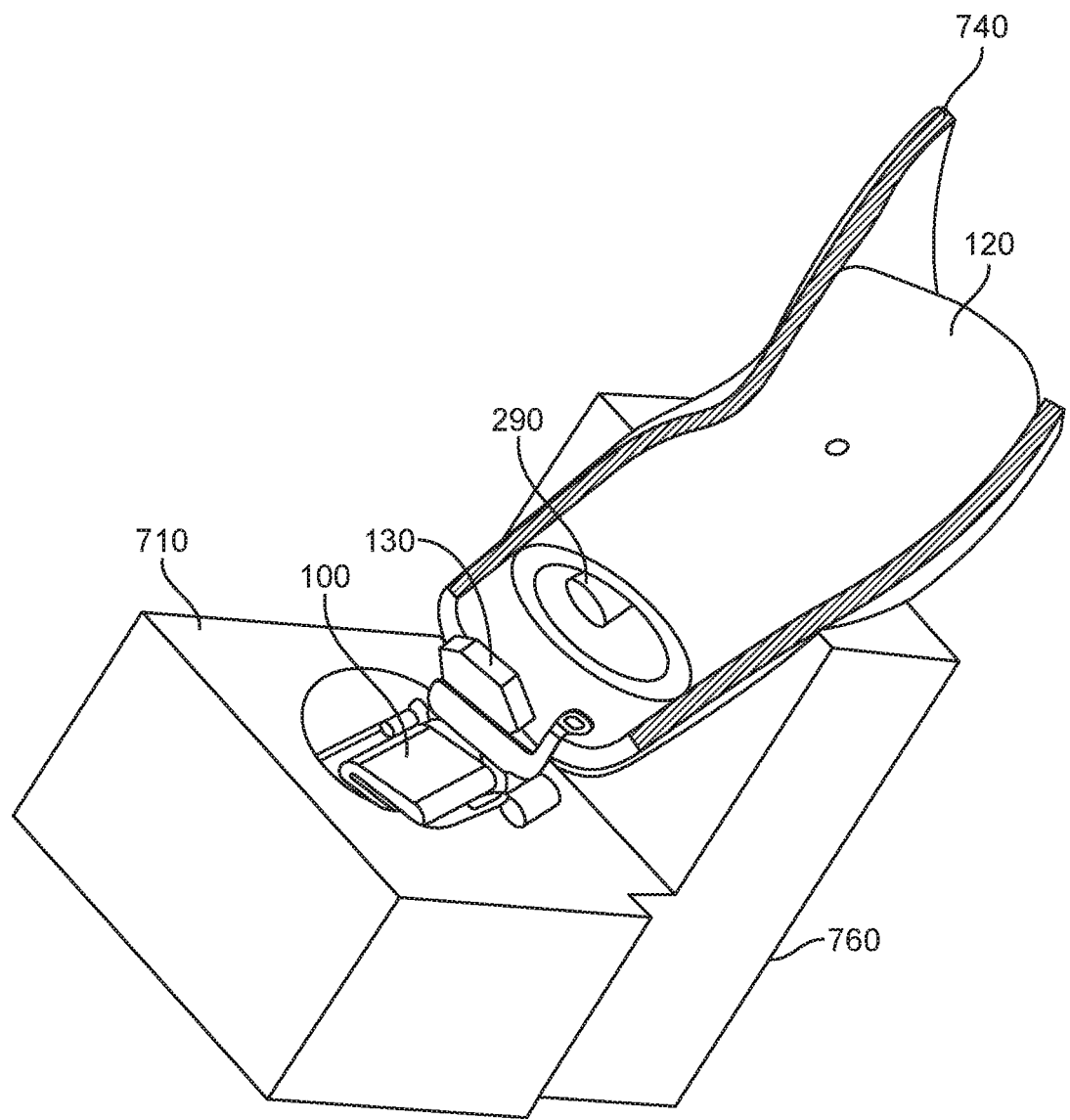
FIG. 17 is an illustration of a verification fixture according to the present invention.

FIG. 17 is an illustration of a verification fixture according to one embodiment of the present invention. In FIG. 17, verification fixture 760 includes ear canal mold 740 and tympanic lens mold 710. Ear canal mold 740 and tympanic lens mold 710 incorporate the anatomical details of the user for whom the tympanic lens 100 and light tip 120 are being manufactured. In embodiments of the invention, Ear canal mold 740 and tympanic lens mold 710 may be 3D printed. In embodiments of the invention, in order to verify that emitter 290 and photodetector 130 will be properly aligned when placed in the user's ear canal, light tip 120 and tympanic lens 100 are placed into verification fixture 760 at the locations and in the orientations they would have in the user's ear canal. Proper alignment may then be measured by exciting light output from emitter 290 and measuring the electrical output from photodetector 130.

Figure 18:
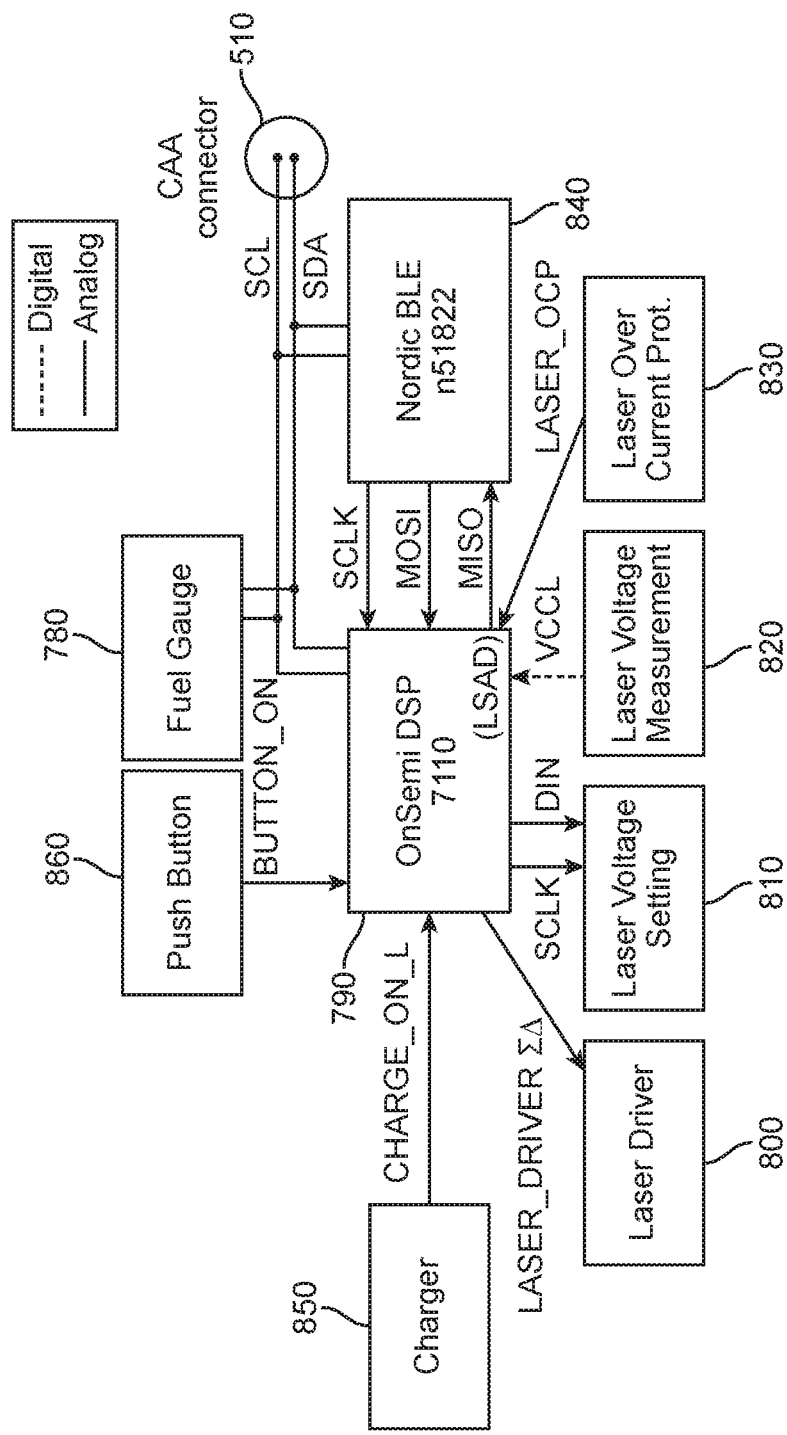
FIG. 18 is a block diagram of the circuitry in a behind the ear device according to the present invention.

FIG. 18 is a block diagram of the circuitry in a behind the ear device according to one embodiment of the present invention. In FIG. 18, programming socket 510 is connected to BLE circuitry 840, fuel gage 780, and digital signal processor 790. BLE circuitry 840 is further connected to digital signal processor 790. Push button circuitry 540, charger circuitry 850, laser driver circuitry 800, laser voltage setting circuitry 810, laser voltage measurement circuitry 820, and laser overcurrent protection circuitry are also connected to digital signal processor 790.

Figure 19:
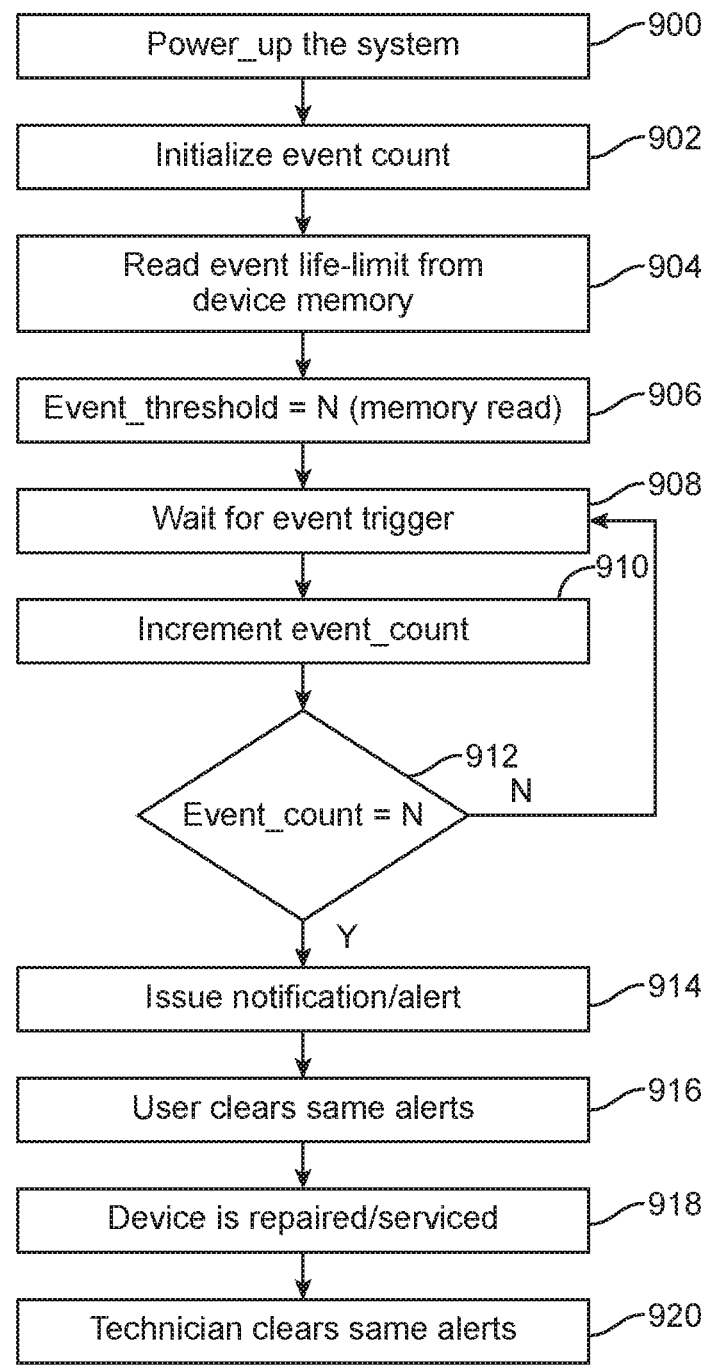
FIG. 19 is a flow diagram of the state machine for the behind the ear device according to the present invention.

FIG. 19 is a flow diagram of the state machine for the behind the ear device according to the present invention. In step 900, the system is powered up. In step 902, the event counter is initialized. In step 904, the event life limit is read from device memory. In step 906, the event threshold is set to N, which is obtained from memory. In step 908, the state machine is waiting for an event trigger. In step 910, the event counter is incremented when an event trigger is detected in step 908. In step 912, the state machine is sent back to step 908 to wait for the next event trigger unless the event counter is equal to N. If the event counter is equal to N in step 912, then an issue notification or alert is sent in step 914. In step 916, the user clears the notifications or alerts sent in step 914. In step 918, the device is repaired or serviced. In step 920, a technician clears the alerts after the unit has been repaired or serviced.

Figure 20:
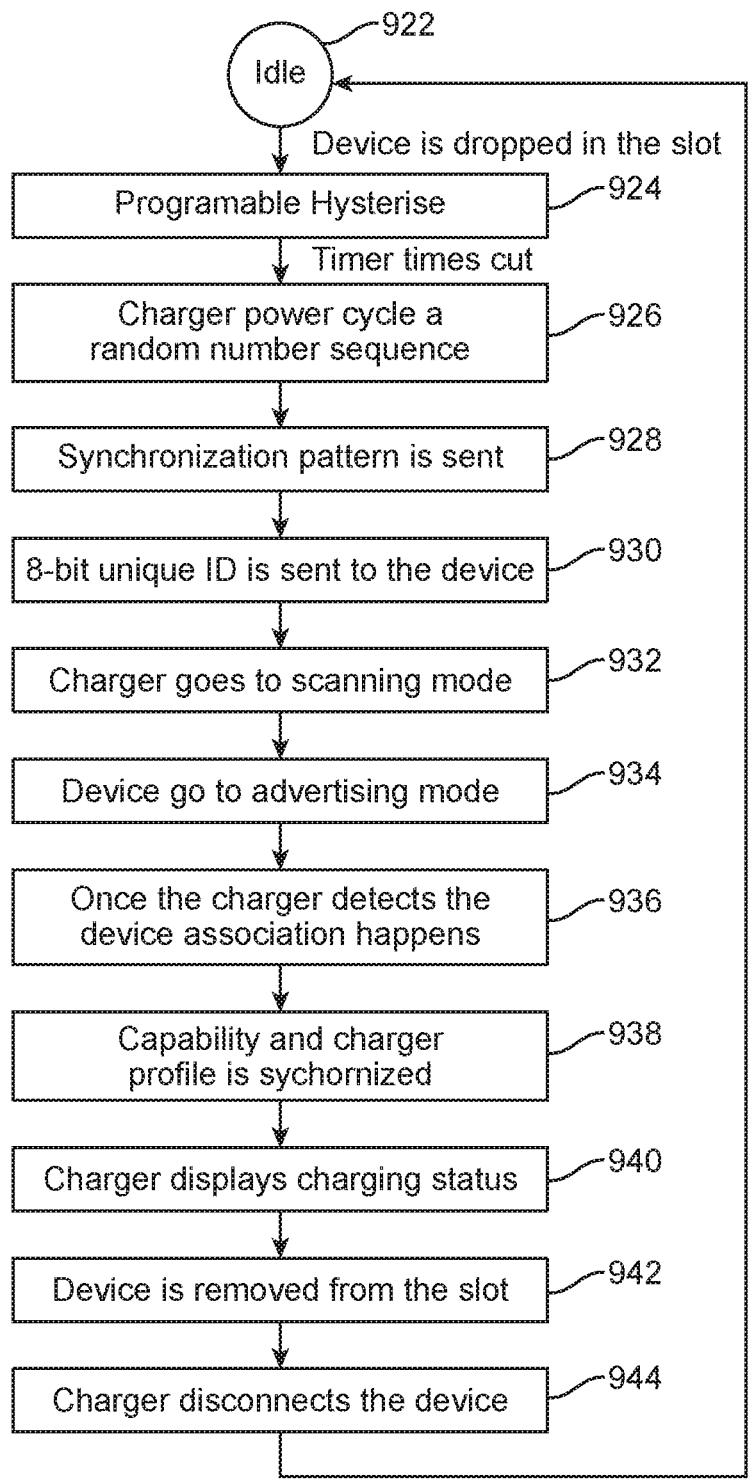
FIG. 20 is a flow diagram of the state machine for a charger according to the present invention.

FIG. 20 is a flow diagram of the state machine for a charger 360 according to the present invention. In step 922, the charger is idle until a behind the ear device 110 is dropped into a slot in the charger. In step 924, the charger goes through a hysteresis period until a timer times out. In step 926, the charger generates a random number sequence. In step 928, the charger sends the behind the ear device 110 a synchronization pattern. In step 930, the charger sends the behind the ear device 110 an 8-bit unique ID. In step 932, the charger goes into a scanning mode. In step 934, the behind the ear device 110 goes into an advertising mode. In step 936, the charger detects the behind the ear device 110 and the charger and behind the ear device 110 are associated. In step 938, the charger profile is synchronized. In step 940 the charger displays the charging status to a user. In step 942, the behind the ear device 110 is removed from the slot by the user. In step 944, the charger disconnects from the behind the ear device 110 and goes back to step 922. In embodiments of the invention, the state diagram for a charger may be implemented without using steps 924, 932, 934, or 938.

In embodiments of the invention, step 938 may include providing a connection to a remote storage device such as a cell phone or the cloud. Data may be transmitted to the remote storage device to, for example, upload data logs or, conversely, data may be downloaded to the hearing aid to, for example, update the firmware on the BTE.

Figure 21:
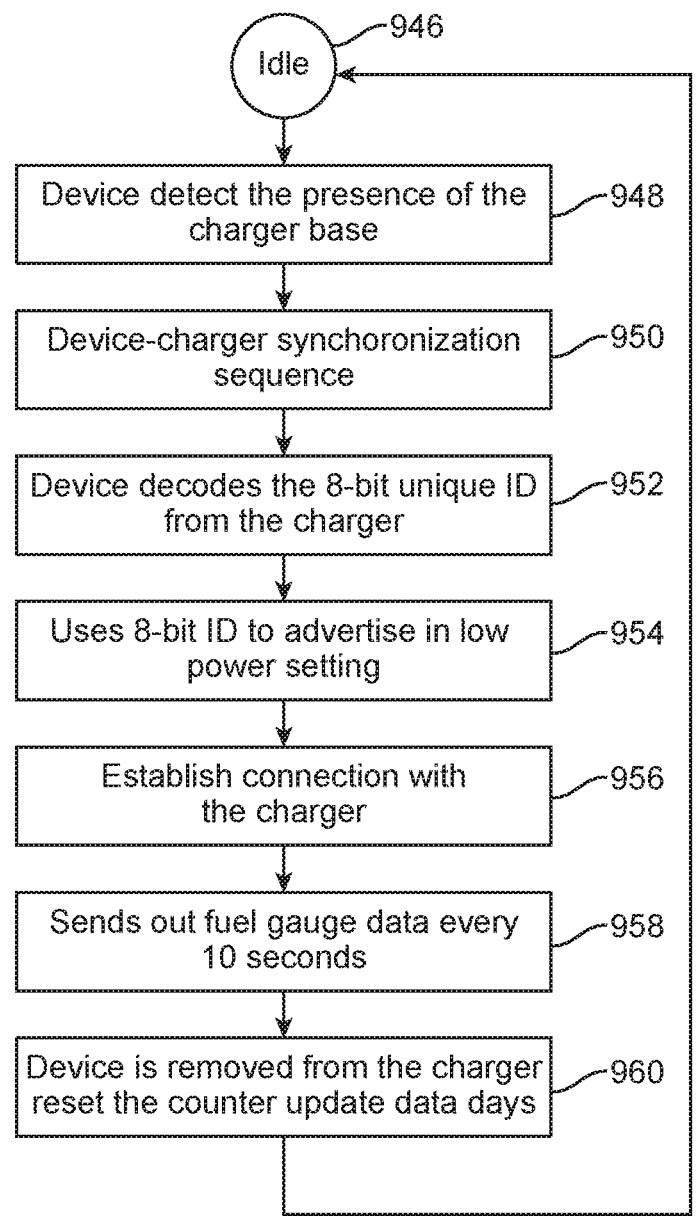
FIG. 21 is a flow diagram of the state machine for the BTE according to the present invention.

FIG. 21 is a flow diagram of the state machine for a behind the ear device 110 according to the present invention. In step 946, behind the ear device 110 is idle until the presence of a charger 360 is detected in step 948. In step 950, charger 360 and behind the ear device 110 are synchronized. In step 952, behind the ear device 110 decodes an 8 bit unique ID transmitted by charger 360. In step 954, behind the ear device 110 uses the unique ID to advertise its presence to charger 360 in a low power setting. In step 956, behind the ear device 110 establishes connection with charger 360. In step 958, behind the ear device 110 sends out fuel gage data to charger 360 every ten seconds. In step 960, behind the ear device 110 is removed from charger 360 by the user and the counter data days are reset. Behind the ear device 110 is then returned to its idle state in step 946.

Figure 21A:
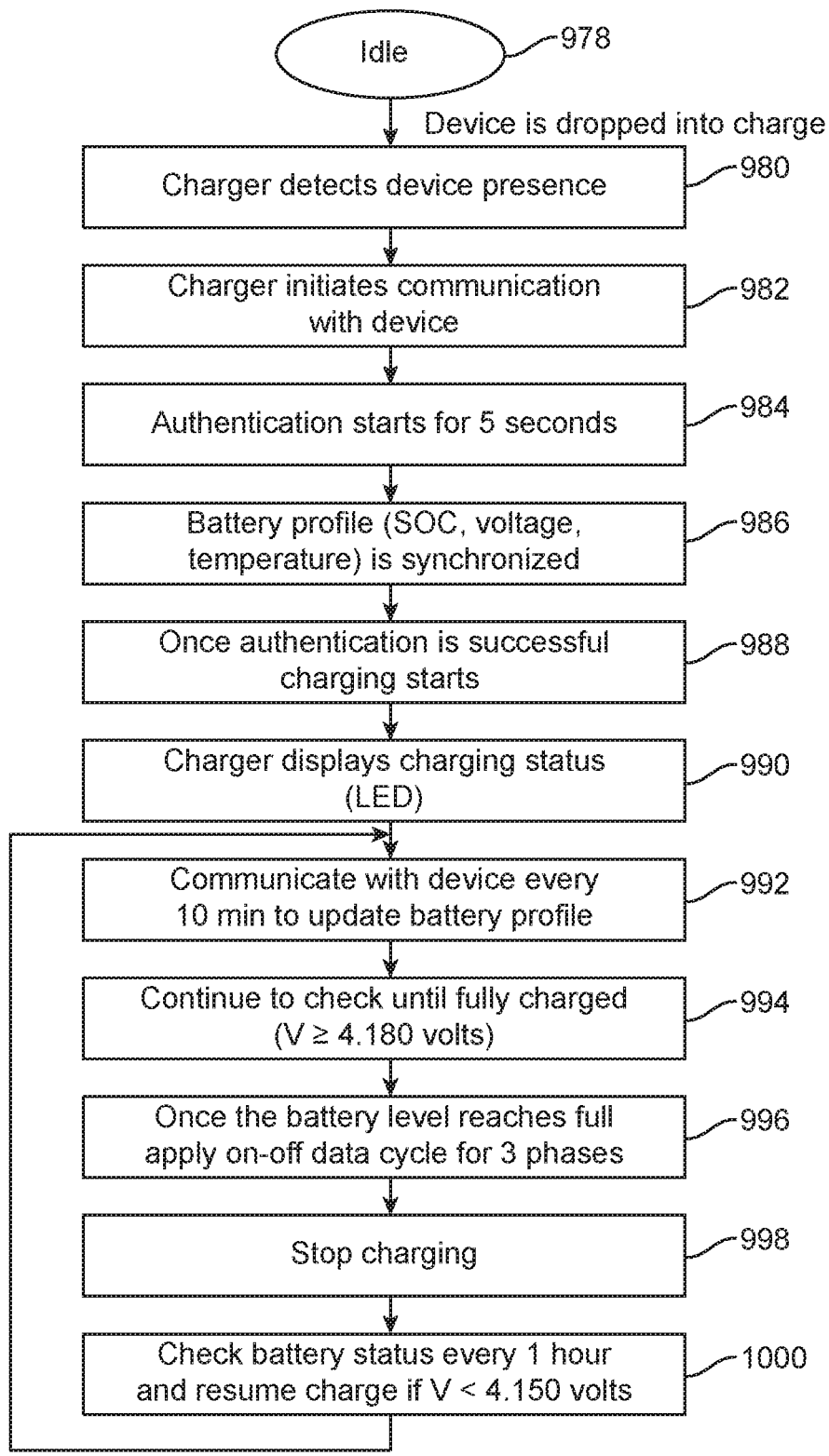
FIG. 21A is a flow diagram of the state machine for a charger according to the present invention.

FIG. 21A is a flow diagram of the state machine for a charger according to the present invention. In step 980, the charger is idle until a BTE 110 is dropped into a slot in the charger. In step 980, the charger detects the presence of the BTE. In step 982, the charger initiates communication with the BTE. In step 984, the charger authenticates the BTE to ensure that it is a BTE which is designed to be used with the charger. If the BTE is not designed to be used with the charger, then the charger goes back to the idle state (step 978). If the charger authenticates the BTE in the slot, then, in step 986, the BTE transmits its battery profile (state of charge, voltage, temperature, etc. to the charger. In step 988, having authenticated the BTE and established its battery profile, the charger begins charging the battery. In step 990, the charger displays the status of the charger (e.g., the degree of charge) using, for example, diodes on the charger. In step 992 the charger communicates with the BTE to update its battery profile. Step 992 may be repeated at predetermined intervals (e.g., every 10 Minutes). In step 994, the charger determines whether the batter is fully charged (e.g., has reached a voltage of 4.18 Volts). In step 996, the charger has determined that the battery is fully charged and it goes into a topping off cycle, wherein the charger comes on at reduced duty cycles for predetermined periods of time, with each subsequent period of time using a reduced duty cycle. After the topping off cycle the charger stops charging the battery in step 998. In step 1000, the charger checks the battery status at predetermined intervals (e.g., every hour) to determine whether the charge level has dropped below a predetermined level (e.g., 4.15 Volts). If the charge level has dropped below the predetermined level, then the charger goes back to step 992 and restarts the charging process.

Figure 22:
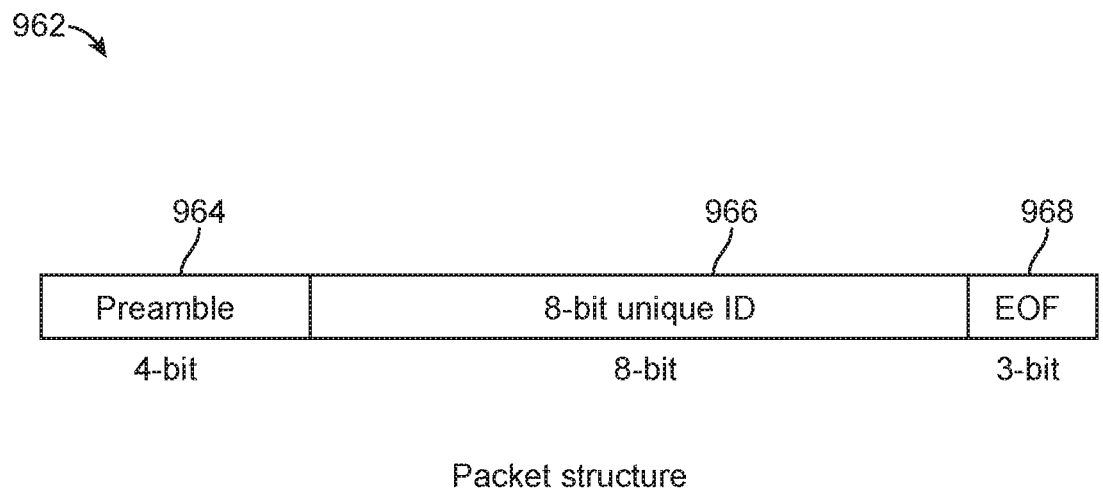
FIG. 22 is an illustration of a packet structure for data transmission between the behind the ear device and charger according to the present invention.

FIG. 22 is an illustration of packet structure 962 for data transmission between the behind the ear device and charger according to the present invention. In FIG. 22, packet structure 962 comprises preamble 964, 8-bit unique id 966 and EOF 968.

Figure 23:
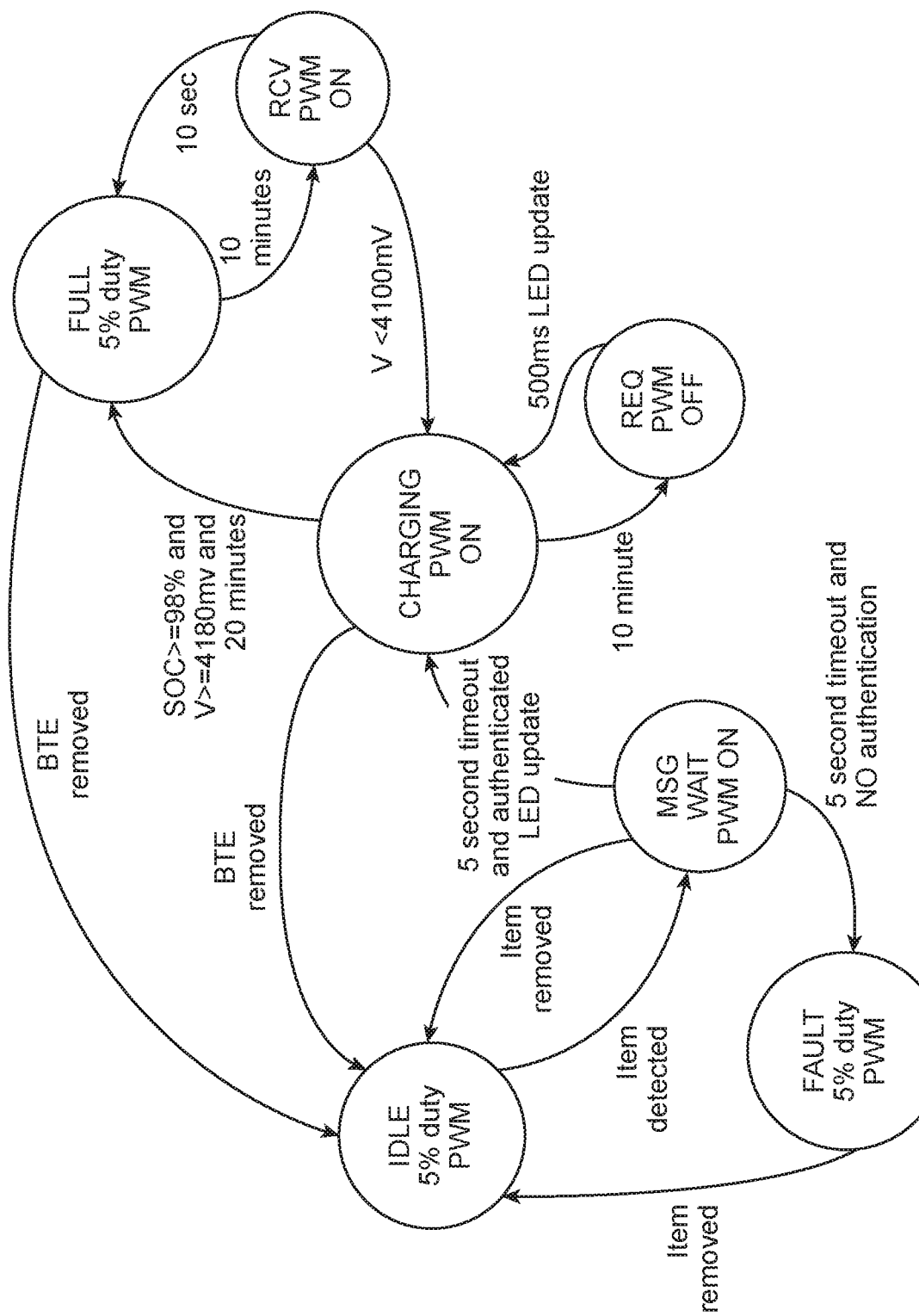
FIG. 23 is a state diagram of the BTE charging process.

FIG. 23 is a state diagram of the BTE charging process.

Figure 24:
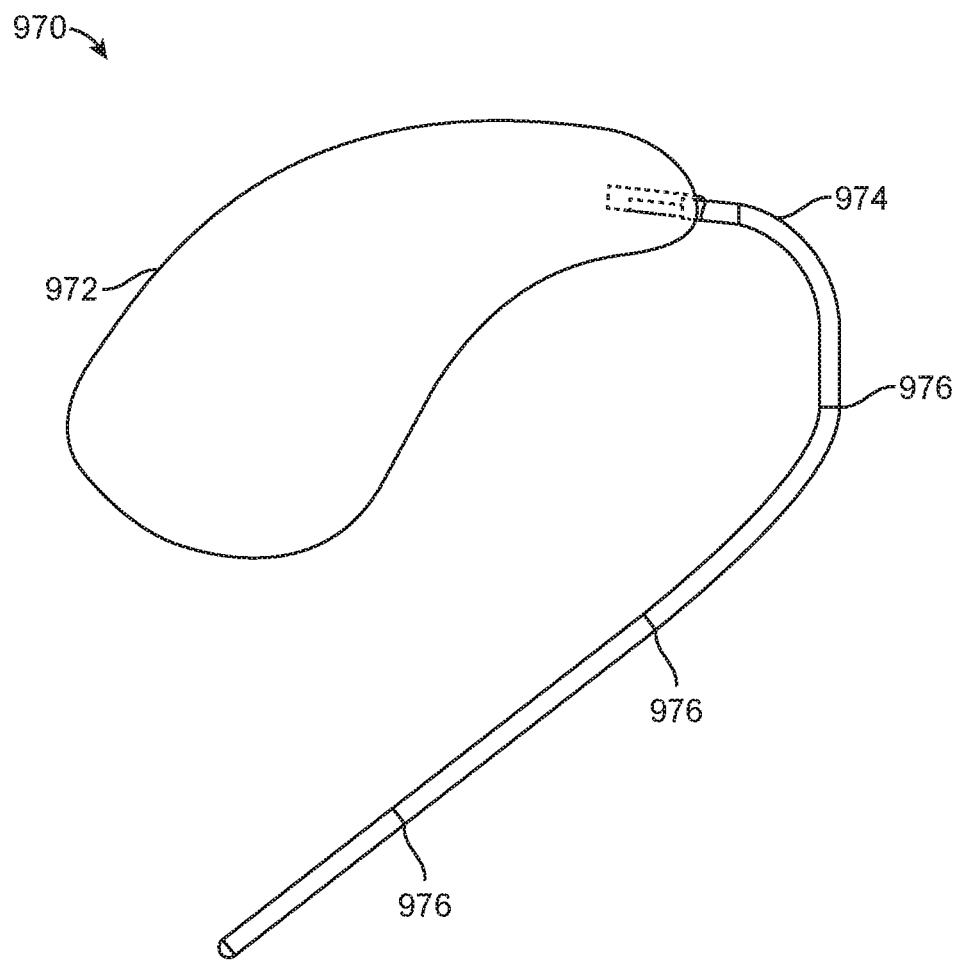
FIG. 24 is an illustration of a cable sizing tool according to the present invention.

FIG. 24 is an illustration of cable sizing tool 970 according to the present invention. In one embodiment of the invention, cable sizing tool 970 includes dummy BTE 972, sizing cable 974, and sizing markings 976. In embodiments of the invention, dummy BTE 972 may be sized and shaped to have the same dimensions as the behind the ear device being sold to the user in order to ensure that the sizing cable accurately reflects the size of the final cable. In practice, the health care provider positions dummy BTE 972 behind the ear of a user and then uses sizing markings 976 to identify the correct length cable for that user.

The present invention is directed to a hearing aid system 10 including a contact hearing device (which may also be referred to as a CHD) 20 and a charger 360 (which may also be referred to as a light tip storage device). Hearing aid system 10 may further include signal processing software for processing signals received by CHD 20.

In embodiments of the invention, hearing aid system 10 may comprise an audio processor 30 and a tympanic lens (which may also be referred to as a tympanic membrane transducer) 100. Tympanic lens 100 may be placed deep in the ear canal EC and adjacent to the tympanic membrane TM through a non-invasive and non-surgical procedure. Tympanic lens 100 makes contact with the umbo of the tympanic membrane TM and is intended to remain in the ear for extended periods.

In embodiments of the invention, audio processor 30 may comprise a behind the ear unit (which may also be referred to as a BTE) 110 and an attached light tip 120.

In embodiments of the invention, BTE 110 may comprise one or more microphones 310, digital signal processing circuitry (not shown) and a rechargeable battery 500. BTE 110 may be used to receive and process audio signals which processed signals are then transmitted to tympanic lens 100 through light tip 120.

Tympanic lens 100 is placed deep in the ear canal and adjacent to the tympanic membrane TM through a non-invasive and non-surgical procedure. Tympanic lens 100 makes contact with the umbo UM of the tympanic membrane TM and is intended to remain in the ear until removed by a physician. As used herein, the Umbo refers to the depressed area on the outer surface of the tympanic membrane. In one embodiment, the present invention involves the placement of a tympanic lens on the tympanic membrane to provide mechanical vibrations to the tympanic membrane. By driving the tympanic membrane directly, the present invention is able to provide hearing assistance which exceeds the range of typical air conduction hearing aids, thus allowing users to hear more clearly at high frequencies (e.g., frequencies in the 4 kHz to 10 kHz range). The tympanic lens is designed to achieve the ultimate goal of improving user's hearing while minimizing any adverse effects resulting from the placement of the tympanic lens on the tympanic membrane.

At high frequencies, e.g., between approximately 4,000 Hz and approximately 10,000 Hz, the energy required to directly drive the eardrum through a tympanic lens is approximately an order of magnitude less than the energy required to drive an audio speaker because the actuator/reed displacement required is an order of magnitude less than the displacement required to push air to create an equivalent dB SPL (i.e., an equivalent perceived sound level to the listener) in a typical air conduction hearing aid. In air conduction hearing aids, this increased energy drain results in an increased battery drain and a decrease in the time between replacing or recharging a battery. In order to obtain the same battery life and dynamic range in an air conduction hearing aid, it would be necessary to use a larger battery, which is considered undesirable.

Direct drive of the eardrum results in an improvement in gain at higher audio frequencies. In direct drive, the reed and umbo move nearly in unison and the efficiency of power transfer between them is high. Furthermore, the smallest type of balanced armature transducer can be used for direct drive, since the displacement involved is very small, and this typically allows lower reed mass and better high-frequency transducer performance. In contrast, in air-conduction hearing aids, the transduction path from reed motion to umbo motion is less efficient because it involves many more steps: The reed moves a speaker diaphragm, which drives air in the ear canal, which in turn flexes the tympanic membrane and applies force to the umbo. Power is lost in each step of transduction (compressing of the canal air volume, flexing of the TM and compressing of the back volume of the middle ear.). Furthermore, open-ear-tip hearing aids suffer even greater inefficiency because sound is radiated out of the ear canal, representing an additional power loss mechanism.). Larger receivers are typically used to increase sound output in air-conduction hearing aids, and these may have lower high-frequency output.

Direct drive of the eardrum can also be used to reduce feedback. When the umbo moves, some of its motion is translated to the TM, which radiates sound back into the canal toward the microphone. However, the TM acts as an inefficient speaker and the back-radiated sound pressure is much lower than the equivalent pressure sensed by the subject via the direct umbo drive. In contrast, in air-conduction hearing aids, the full pressure delivered to the canal and sensed by the subject is radiated toward the microphone and will result in increased feedback.

Because of the increased efficiency and lower feedback, there is an improvement in gain at higher audio frequencies. The increased efficiency enables a higher amplitude output at high frequencies, which allows for a larger dynamic range between the softest sound that can be heard and the maximum output of the TMT. This larger dynamic range results in higher achievable gain. The lower feedback allows for additional stable gain before feedback.

One concern with the application of force to skin, including the tympanic membrane and, more specifically, the umbo, is the potential for damage to the skin, including pressure sores. Such damage may be avoided by, for example, limiting the applied pressure to ensure that the applied pressure does not prevent blood from reaching the skin under the umbo platform. The tympanic lens is, therefore, designed to prevent damage to the tympanic membrane or other tissues in the ear canal. The tympanic lens is designed to provide direct mechanical drive to the tympanic membrane without damaging that membrane or any tissue in the ear canal. In practice, damage to the tympanic membrane may be prevented by limiting the pressure applied to the tissue of the tympanic membrane to a pressure which is less than the pressure which would cause the capillaries in the tympanic membrane to collapse (e.g., 20 mmHg). Damage may be further limited by providing a safety factor of, for example, 2× to prevent damage resulting from capillary collapse.

A second concern is the impact placing a tympanic lens on the tympanic membrane could have on a user's natural hearing. While the tympanic lens described herein is adapted to improve the user's hearing by driving the tympanic membrane directly, the tympanic lens is further designed to limit any reduction in a user's natural hearing resulting from the placement of the tympanic lens on the eardrum. The tympanic lens is therefore designed to minimize any reduction in air conduction hearing resulting from placing the tympanic lens in the ear canal and/or on the tympanic membrane. The tympanic lens is further designed to prevent an increase in bone conduction hearing. The tympanic lens is further designed to prevent or limit autophony resulting from the placement of the tympanic lens on the tympanic membrane. Limiting the pressure applied to the umbo and/or the mass of the elements in contact with the umbo may reduce bone conduction hearing and/or autophony.

The tympanic lens is designed to sit inside on the user's external ear canal in a manner which makes it easy to place and easy to remove, without surgery. The tympanic lens must remain in intimate contact with the tympanic membrane through a range of movement, including, movement of the user's head. Movement of the user's head may be problematic because forces exerted on the tympanic lens by such movements may tend to pull the tympanic lens or elements of the tympanic lens away from the tympanic membrane. In one example, certain orientations of the user's head may result in an increased gravitational pull on the tympanic lens, pulling the tympanic lens, or elements of the lens, away from the tympanic membrane. The tympanic lens must, therefore, be designed to account for such movements of the user's head. Similarly, some movements of the tympanic membrane, such as the movement caused by a Valsalva maneuver, may dislodge the tympanic lens or elements of the tympanic lens from the tympanic membrane if the tympanic lens is not designed to account for such forces. Thus, a tympanic lens according to the present invention is designed with features which hold the tympanic lens in place against the tympanic membrane and are designed to assist in keeping the tympanic lens in place even when external forces act to pull or push the tympanic lens away from the tympanic membrane.

In addition to remaining in place on the tympanic membrane, the tympanic lens includes a drive portion which is adapted to move the tympanic membrane in response to signals applied to the tympanic lens. Since the drive portion is not rigidly attached to the chassis of the tympanic lens, and is adapted to move freely with respect to that chassis, it is important to include design features which will provide a bias force to hold the drive portion in contact with the tympanic membrane in the presence of the gross forces discussed above, including gravitational forces and forces applied through the tympanic membrane itself (e.g., forces resulting from a Valsalva maneuver).

Tympanic lens 100 may be held in place by the mechanical features of the tympanic lens including the perimeter platform. Additionally, the physician or user may apply a fluid, such as mineral oil, to help to hold the tympanic membrane in place. The fluid assists in holding the tympanic lens in place because of the surface tension and viscous drag forces between the fluid and elements of the tympanic lens, such as the umbo lens and the perimeter platform. The viscosity of the fluid will be important to the amount of viscous drag forces holding the tympanic lens in place.

The total force exerted by the tympanic lens on the tympanic membrane is the combination of a number of different forces, including forces generated by elements of the tympanic lens and external forces. The forces generated by elements of the tympanic lens include the static bias force generated by the bias springs and the dynamic drive force generated by the movement of the reed when current is applied to the microactuator. External forces include the force of gravity, forces resulting from the movement of the users head and forces resulting from the movement of the tympanic lens.

During normal operation, microactuator 140 exerts very small amounts of dynamic force on umbo UM in order to achieve the displacement required for amplification. For example, in a normal ear, with approximately 80 dB of sound pressure level (SPL) at the tympanic membrane TM, umbo UM has an average peak to peak displacement of approximately 20 nm (nanometers) at 1 kHz. In the invention, an umbo UM displacement of approximately 20 nm may be achieved when microactuator 140 exerts a peak dynamic force of approximately 6 (micro Newton). In one embodiment of the invention, a sound pressure of 120 dB SPL may be simulated by applying a peak force of approximately 0.6 millinewtons to the umbo. In embodiments of the invention, tympanic lens 100 vibrates the tympanic membrane over a spectrum of amplification that extends from a minimum range of 125 Hz to 10,000 Hz. Frequencies outside of this range may also be transmitted but the efficiency at such frequencies may be reduced. In embodiments of the invention, tympanic lens 100 transmits amplified sound by vibrating the eardrum through direct contact.

The tympanic lens is designed to maintain the umbo lens in contact with the tympanic membrane while allowing the umbo platform to move in response to movement of the reed. Thus, the tympanic lens can accommodate gross movements, caused by, for example, movement of the users head or movements of the tympanic membrane, while maintaining the umbo platform in contact with the tympanic membrane to allow reed vibrations to be transmitted directly to the tympanic membrane.

Tympanic lens 100 does not contain a power source and is activated only when BTE 110 is switched on and light tip 120 is inserted into the ear canal EC. tympanic lens 100 includes photodetector 120 which converts the light pulses it receives from the light tip 120 into electrical signals which activate microactuator 140 to transmit vibrations to the umbo UM through direct contact. In embodiments of the present invention, both signal and power are transmitted to tympanic lens 100 by light received from light tip 120.

In embodiments of the invention, tympanic lens 100 is in direct contact with the umbo UM of tympanic membrane TM through umbo platform 160. Umbo platform 160 may be made up of umbo lens 220 and drive post 200. The mass of umbo platform 160 should be as small as possible since increases in mass will reduce the high end frequency response of the system.

Umbo lens 220, which may be made from, for example, Parylene, such as, for example Parylene C, and may be custom fit to the umbo UM of the individual ear anatomy of a user. Micro forces applied through umbo lens 220 act to directly vibrate the tympanic membrane when those forces are applied to umbo platform 160. Umbo lens 220 is preferably made of a material which is stiff enough to spread the pressure exerted by drive post 200 along the entire surface of the umbo UM which is contacted by umbo lens 220. An optimal Parylene umbo lens may have a thickness of approximately 18 microns.

It may, therefore, be advantageous to utilize an umbo lens having a large area in contact with the umbo to spread the forces applied by drive post 200 across a large section of the umbo, thus reducing the applied pressure on the tissue of the umbo. The distribution of pressure is important to prevent damage to the umbo, such as pressure sores. In order to prevent damage to the umbo tissue, the pressure exerted by the umbo lens may be limited to less than approximately 20 millimeters of mercury (mmHg). A large umbo lens is also beneficial because it increases the area of an oil layer between the umbo lens and the umbo tissue, thus helping to hold the umbo lens in place on the umbo via forces due to surface tension and viscous drag. However, a large umbo lens is disadvantageous in that it will result in a loss of air conduction hearing by blocking a section of the tympanic membrane. A large umbo lens may also result in an undesirable increase in bone conduction hearing (which may result in an increase in autophony). It is therefore advantageous to limit the overall area of the umbo lens, provided that the decreased area does not result in other problems, such as an increase in the pressure applied to the tissue beyond that which is safe, or a decrease in hydrostatic forces which results in the umbo lens detaching from the umbo.

In practice, an optimal umbo lens may have a diameter of between approximately 2.5 millimeters and approximately 3.5 millimeters. In embodiments where the umbo lens is not round, that diameter may be measured at the widest point of the umbo lens. Further, in practice, an optimal umbo lens may have an area of between approximately 4.9 square millimeters and approximately 9.6 square millimeters.

For an umbo lens having an area of approximately 4.9 square millimeters (the smallest optimal umbo lens) a force of 6 millinewtons would translate to a pressure of approximately 9.3 millimeters of mercury (mmHg), a safety factor of 2 with respect to a pressure of 20 mmHg. For an umbo lens having an area of approximately 7 square millimeters, a force of 6 millinewtons would translate to a pressure of approximately 6.5 millimeters of mercury (mmHg). For an umbo lens having an area of approximately 9.7 square millimeters (the largest optimal umbo lens) a force of 6 millinewtons would translate to a pressure of approximately 4.6 millimeters of mercury (mmHg).

An adhesive, such as Masterbond UV15X-6Med-2 or Epotek OG116-31 may be used to attach the umbo lens to the drive post. The adhesive may be further used to extend the effective length of the drive post. The adhesive may be use to extend the length of the drive post by building up the adhesive in the umbo lens prior to inserting the drive post. The adhesive may further be used to extend the effective length of the drive post to ensure that the drive post meets the umbo at a substantially right angle in order to ensure efficient transmission of vibrations from the microactuator to the umbo.

For reasons set forth above, it may be advantageous to limit the amount of adhesive used to connect the umbo lens to the drive post in order to limit the effective mass of the drive post, umbo lens, adhesive combination, thus reducing the effective mass on the umbo. Reducing the effective mass on the umbo both improves high frequency output and improves (decreases) bone conduction hearing changes and autophony.

Drive post 200 may be bonded to umbo lens 220 by, for example, adhesive Masterbond UV15X-6Med-2 or Epotek OG116-31. Drive post 200 may be used to couple mechanical vibrations generated by microactuator 140 to umbo UM. It would be advantageous to minimize the mass of drive post 200 in order to minimize the effective mass of the umbo platform. Drive post 200 is designed to be positioned over the center of the umbo when the tympanic lens is properly positioned.

Microactuator 140 may use an electromagnetic balanced armature design. Microactuator 140 includes a reed extending through an opening at a distal end of the microactuator and a membrane surrounding the opening through which the reed extends. In the microactuator the reed is connected to the drive post. In one example, a reed with a thickness of approximately 0.006 inches (approximately 150 micrometers) is used.

The outer casing of the microactuator may act as a flux return path for the motor and may be constructed of a nickel iron alloy to facilitate the return flux path. The microactuator, including the outer casing may be coated in order to prevent corrosion or discoloration. The microactuator may be coated in, for example, Parylene and/or gold to prevent corrosion or discoloration. The outer casing of the microactuator may be a stainless steel material which does not act as a flux return path but protects the microactuator from corrosion or discoloration.

The diaphragm may be positioned to prevent water, oil and debris from entering the microactuator through the hole where the reed extends from the distal end of the microactuator. The diaphragm is preferably made from a material, for example, urethane or silicone, which is flexible enough to allow the distal end of the reed to vibrate without compromising its efficiency.

In the tympanic lens, light energy is converted by the microactuator into movement of the reed, which transmits those movements through the umbo platform to the tympanic membrane. Microactuator 140 may be designed such that the force exerted by the reed may be approximately 2.7 Newtons per Ampere of input current. In the tympanic lens, the input current supplied by the output of the photodetector which receives light energy from an emitter located in the light tip.

The system may be designed such that the output of the laser/emitter may be adjusted in steps in order to adjust the static current applied to the microactuator and the dynamic force applied to the tympanic membrane, increasing the maximum output of the system. For example, the system may be designed such that 1 dB increase in light results in 1 dB increase in average current applied to the microactuator which allows an increase in the dynamic force applied to the tympanic membrane of up to 1 dB SPL (Sound Pressure Level). For users with significant hearing loss, the higher levels of emitter output would result in higher maximum available force that can applied to the tympanic membrane through the movement of the reed to provide a higher maximum output of the system.

Because the tympanic lens must accommodate macro movements, such as, for example, movements caused by Valsalva maneuver, the tympanic lens includes a hinge connecting the microactuator to the chassis. In one embodiment, the hinge is formed by the bias springs, which connect the microactuator to the chassis. In addition to connecting the microactuator to the chassis and acting as a hinge, the bias springs also provide the bias force necessary to keep the microactuator in place through macro movements. Because the tympanic lens must also accommodate micro movements of the reed without moving the microactuator in response to those micro-movements, the tympanic lens is designed to maximize the inertia of the microactuator in response to movements of the reed.

The tympanic lens may, therefore, be designed to allow macro movements through a hinge design while increasing the inertia of the microactuator in response to movements of the reed by positioning the hinge at the opposite end of the microactuator from the drive post 200. A larger distance between the springs and the drive post 200 increases its moment of inertia (resistance to movement) with respect to forces exerted on the microactuator by movements of the reed, which improves efficiency by helping to keep the microactuator stationary as the reed vibrates.

The hinge may secure the microactuator so that it is at an angle relative to the chassis. The angle is achieved by adjusting the distance between the reed of the microactuator and the umbo of the tympanic membrane. The angle is design to ensure that the microactuator does not interfere with the anatomy after placement while also allowing movement as a result of the various forces exerted on the tympanic lens, for example, a Valsalva maneuver. The angle is designed to ensure that the bias force remains in the appropriate range. The angle of the microactuator with respect to the chassis is, however, limited by the need to pass the tympanic lens through the ear canal and position it on the tympanic membrane. In embodiments of the invention, the angle of the microactuator with respect to the chassis is a function of the desired bias force, the anatomical fit and the insert ability. In embodiments of the invention, the microactuator may be designed to form an angle of between zero and 15 degrees with respect to the plane of the chassis.

In one embodiment of the invention, tympanic lens 100 employs dual bias springs (which may also be referred to as torsion springs) 180 to connect microactuator 140 to chassis 170 and bias microactuator 140 towards tympanic membrane TM. When properly mounted, microactuator 140 should be at an angle of between approximately 0 and approximately 15 degrees with respect to a plane through the chassis with the umbo platform 160 positioned to contact the umbo. Bias springs 180 may be used to position microactuator 140 at an appropriate angle to the chassis.

While in situ in the ear canal EC, microactuator 140 is positioned almost upside down when the user is standing or sitting. Bias spring(s) 180 provide sufficient force to counter the weight of microactuator 140, providing a positive net force, towards tympanic membrane TM to ensure good coupling between umbo lens 220 and umbo UM.

While the Bias spring(s) must be sufficiently strong to overcome the force of gravity and keep umbo lens in position on the umbo, they should also, for the reasons set forth herein, not be so strong that the umbo lens causes damage to the tympanic membrane. Additionally, excessive spring force may degrade the audio characteristics of the tympanic lens, or increase autophony. Therefore, bias springs 180 may, in some embodiments of the invention be designed to be very soft springs. In embodiments of the invention, bias spring(s) 180 may be designed to exert at least 0.8 millinewton of force on the umbo UM, when gravity is working against bias spring(s) 180. Bias spring(s) 180 may also be designed to exert a force which is less than the force applied on the tympanic membrane TM by the tensor tympani muscle. Bias spring(s) 180 may also be designed such that microactuator 140 moves with the tympanic membrane TM and does not impede its natural movement.

In certain orientations of the user's head, the bias force from bias spring(s) 180 and the weight of the microactuator become additive. Tympanic lens 100, including the force exerted by the bias springs may, therefore, be designed such that that the maximum total force exerted on tympanic membrane TM is less than 6 millinewtons. Tympanic lens 100, including the force exerted by bias spring 180, is designed such that the maximum total force exerted on tympanic membrane TM results in a pressure of less than the minimum venous capillary return pressure. Tympanic lens 100, including the force exerted by bias spring 180, may be further designed such that the maximum total pressure exerted on the tympanic membrane through the umbo lens is less than 20 millimeters of Mercury. Tympanic lens 100, including the force exerted by bias spring 180, may further be designed such that that the maximum total force exerted on tympanic membrane TM is less than 3 millinewtons. Tympanic lens 100, including the force exerted by bias spring 180, may be further designed such that the maximum total force exerted on tympanic membrane TM is less than the force exerted by 10 mmHg air pressure on tympanic membrane TM.

In one embodiment of the invention, the spring constant of bias spring 180 is approximately $1.5 \times 10-5$ Newton meters per radian.

Bias springs 180 are arranged to allow the umbo platform to move at least 0.3 millimeters. Bias springs 180 are arranged to allow the umbo platform to move a distance which ensures that the umbo platform will continue to be in intimate contact with the tympanic membrane when the user performs a Valsalva maneuver. Bias springs 180 are arranged to allow umbo platform to maintain contact with the tympanic membrane when changes in pressure between the inner and outer ear, (e.g. as a result of sneezing, burping or flying), cause the tympanic membrane to move up to approximately ¼ mm. Bias springs 180 may therefore be designed to enable the umbo platform to maintain contact with the umbo through ¼ mm of movement.

Bias springs 180 may also be designed to minimize the force, pressure, displacement and impedance presented to the umbo without losing contact with the tympanic membrane. Minimizing force, displacement and impedance at the umbo may also minimize the effect of the tympanic lens on bone conduction hearing and autophony.

The position of the tympanic lens in the ear canal when properly placed results in gravity pulling the microactuator away from the TM in many situations. Therefore, the minimum bias force required to be exerted by the bias spring is the force required to offset the force of gravity on the microactuator. In one embodiment, the microactuator may have a mass of approximately 120 milligrams, in which case, the bias force required to keep the umbo lens in contact with the tympanic membrane is at least 0.8 millinewtons. In this embodiment, the bias springs may be designed to provide a bias of at least 0.8 milliNewtons.

In embodiments of the invention, a tympanic lens may have resonant or anti-resonant frequencies when positioned in the user's ear canal, on or near the user's tympanic membrane. These resonant and/or anti-resonant frequencies may be located within the range of frequencies which the tympanic lens is designed to transmit to the user, such as, for example, the range of audio frequencies. Such resonant and/or anti-resonant frequency responses may, in some embodiments, result in unwanted distortion, amplification and/or attenuation of the audio signal transmitted to the user by the tympanic lens. In embodiments of the invention, it would be advantageous to introduce a damping material and/or damping element between the tympanic lens chassis and the microactuator to reduce the effect of the resonant and/or anti-resonant frequency responses. In embodiments of the invention, it would be advantageous to introduce a damping material and/or damping element between the tympanic lens chassis and the microactuator to move the resonant and/or anti-resonant responses to frequencies which do not impact the performance of the tympanic lens, such as, for example, out of the range of audible frequencies.

In embodiments or the invention, the inclusion of a bias spring may result in or act to increase unwanted harmonic vibrations in the frequency range of interest (e.g., between 125 Hz and 10,000 Hz in one embodiment of the invention). One mechanism for limiting or eliminating those vibrations is the inclusion of a damper in the tympanic lens. In embodiments of the invention, the damper is designed to limit or prevent unwanted harmonic vibrations by damping the motion of the bias spring. In these embodiments, the damper acts by taking away the free motion of the bias spring(s), damping resonance and anti-resonance behavior of the system. In embodiments of the invention, inclusion of damper within the spring will increase the overall stiffness of the spring and shift the frequency response of the system forward, to frequency ranges that are less critical for speech audibility. The damper may also make the bias springs stiffer than they would be without damping at low frequencies (e.g., below 4 KHz). The inclusion of a damper in the tympanic lens may also result in the reduction or elimination of autophony caused by unwanted harmonic oscillations of the system. In embodiments of the invention, the inclusion of a damper in the tympanic lens may also result in the reduction or elimination of the TM damping (i.e., overall reduction in a user's audibility) induced by placement of the tympanic lens on the eardrum. In embodiments of the invention, a damper may be inserted into the tympanic lens between the chassis and the microactuator to dampen resonant and/or anti-resonant behavior resulting from, for example, the movement of the microactuator and/or components of the microactuator with respect to the chassis.

The damper may be a material applied to the bias springs to dampen the motion of the bias springs at low frequencies (e.g., frequencies of less than 500 Hz or frequencies of less than 4 KHz). The materials used to coat or fill the bias spring may be chosen to have a characteristic storage modulus and loss modulus. The storage modulus describes the materials solid, elastic properties. The loss modulus is related to viscosity and gives the material the ability to dissipate energy as heat through internal friction as the material is deformed.

In embodiments of the invention, the materials used to coat or fill the bias spring may be chosen to have a storage modulus in the range of approximately 100 Pascals (Pa) to approximately 200,000 Pascals (200 kPa). In embodiments of the invention, the materials used to coat or fill the bias spring may be chosen to have a storage modulus in the range of approximately 8,000 (8 kPa) to 30,000 Pascals (30 kPa). In embodiments of the invention, materials used to coat or fill the bias spring may be chosen to have a storage modulus of approximately 10,000 Pascals (10 kPa).

In embodiments of the invention, the materials used to coat or fill the bias springs may be chosen to have a loss modulus in the range of 200,000 Pascals (200 kPa) to approximately 20,000,000 Pascals (20 MPa). In embodiments of the invention, the materials used to coat or fill the bias springs may be chosen to have a loss modulus in the range of 1,000,000 Pascals (1 MPa) to approximately 10,000,000 Pascals (10 kPa). In embodiments of the invention, the materials used to coat or fill the bias springs may be chosen to have a loss modulus of approximately 6,000,000 Pascals (6 MPa).

The viscosity of the coating material may act as an energy loss mechanism in the damper. The damping material used may be a viscoelastic material or a material such as silicone or a silicone gel. The damping material may be a material which becomes stiffer or more viscous as the vibration frequency of the tympanic lens 100 increases. The damping material may be a material which provides greater damping at lower frequencies and lower damping at higher frequencies. Specific classes of viscoelastic materials include Newtonian, dilatant, rheopectic and thixotropic.

In embodiments of the invention, the bias spring may be damped to prevent the system from oscillation at resonance or anti-resonance frequencies. Such oscillations could divert energy from signal transmission, reducing the amount of drive to the umbo lens at the resonant frequency. In particular, bias spring 180 may be damped to prevent oscillation at a resonant (or anti-resonant) frequency of the system, such as, for example approximately 500 Hz. Bias spring 180 may be damped by coating the coils of bias spring 180 in a damping material, such as, for example, silicone or a silicone gel. Bias spring 180 may be damped by filling the coils of bias spring 180 in a manner that creates a damper, which may be a plug of damping material, in the center of the coils of bias spring 180. Bias springs 180 may be damped by adding a damper which prevents side to side motion of microactuator 140 with respect to chassis 170. A damper may be adapted to stiffen lateral modes of vibration or any other mode of vibration which reduces the energy which reaches the tympanic membrane. Damper 185 may be designed to damp a critical vibration mode of the system which shows up between approximately 400 Hz (resonance) and approximately 600 Hz (anti-resonance).

In selecting an appropriate damping material for the present invention, the moduli (Young's modulus E, shear modulus, etc.) of a material are often treated as a complex number, mathematically. That is, the complex modulus $E^*$ will have real and imaginary components: $E^*=E'+iE''$ (where $i^2=-1$). In the present invention, $E'$ is the storage modulus and $E''$ is the loss modulus. The loss modulus is related to viscosity by: $E''=\omega\eta=2\pi\eta\times$frequency, where $\eta$ is the dynamic viscosity in Pascal-seconds (or Centipoids, cP). 1 cP=0.001 Pa-s=1 mPa-s. In embodiments of the invention, the viscosity of the damping material can be in the range of 100 mPa-s (a light oil) through 100,000 mPa-s (a paste) and higher. In embodiments of the invention, the viscosity of the damping material can be in the range of approximately 1,000 Centipoids to approximately 10,000 Centipoids In embodiments of the invention, a damping material with a viscosity of approximately 5000 Centipoids.

As used herein, the terms damp, damping, damped, dampened refer to the function and/or properties relating to decreasing the amplitude of an oscillating system.

In embodiments of the invention, a tympanic lens, comprises: a chassis; a perimeter platform connected to the chassis; a microactuator connected to the chassis through at least one bias spring positioned at a proximal end of the microactuator; a damper attached to the at least one bias spring; and an umbo platform attached to a distal end of the microactuator. In embodiments of the invention, the tympanic lens further comprises a photodetector mounted on said chassis and electrically connected to the microactuator through at least one wire. In embodiments of the invention, the damper comprises a viscoelastic material in contact with the at least one bias spring. In embodiments of the invention, the viscoelastic material comprises silicone. In embodiments of the invention, the viscoelastic material comprises a silicone gel. In embodiments of the invention the at least one bias spring comprises a series of coils and the viscoelastic material fills the center of the coils. In embodiments of the invention, the at least one wire passes through the center of the series of coils at a right angle to the series of coils.

Embodiments of the present invention include a method of controlling unwanted vibration in a tympanic lens, wherein the tympanic lens comprises a chassis, a perimeter platform connected to the chassis, a microactuator connected to the chassis through at least one bias spring, the method comprising the step of: damping the motion of the at least one bias spring. Embodiments of the invention the at least one bias spring is coated in a damping material. In embodiments of the invention, the damping material is a silicone material. In embodiments of the invention, the at least one bias spring comprises a series of coils and the damping material fills the center of the coils.

In embodiments of the invention, a tympanic lens, comprises: a perimeter platform; a microactuator connected to the perimeter platform through at least one biasing element positioned between the microactuator and the perimeter platform; a damper attached to the at least one biasing element; and an umbo platform attached to a distal end of the microactuator. In embodiments of the invention, the perimeter platform is connected to the microactuator at a proximal end of the microacutoator. In embodiments of the invention, the tympanic lens further includes a chassis connected to the perimeter platform and the microactuator. In embodiments of the invention, the biasing element is a spring. In embodiments of the invention, a photodetector is mounted on the chassis and electrically connected to the microactuator through at least one wire. In embodiments of the invention, the damper comprises a viscoelastic material in contact with the at least one bias spring. In embodiments of the invention, the viscoelastic material comprises silicone. In embodiments of the invention, the at least one bias spring comprises a series of coils and the viscoelastic material fills the center of the coils. In embodiments of the invention, the at least one wire passes through the center of the series of coils at a right angle to the series of coils.

Embodiments of the present invent include a method of controlling unwanted vibration in a tympanic lens, wherein the tympanic lens comprises a perimeter platform connected to a microactuator through at least one biasing element, the method comprising the step of: damping the motion of the at least one biasing element. In embodiments of the invention, the at least one biasing element is a spring. In embodiments of the invention, the at least one bias spring is coated in a damping material. In embodiments of the invention, the damping material is a silicone material. In embodiments of the invention, the at least one bias spring comprises a series of coils and the damping material fills the center of the coils.

The photodetector is connected to a PC board located on the grasping tab by a first set of wires. The PC board is, in turn, connected to bond pads on the back of the microactuator through a second set of wires. The second set of wires may be, for example, 48 Gauge wires. The second set of wires and the routing thereof is selected to minimize the contribution the second set of wires makes to the overall spring constant of the system. The size of the second set of wires is selected to be as small as possible in order to minimize any contribution to the spring constant of bias springs 180. The second set of wires are routed through the coils of bias springs 180 to minimize any contribution such wires might make to the spring constant of bias spring 180. The connection between the PC board and the microactuator is made with 30 micron (48 Gauge) wires, which are routed through the center of bias spring 180 to minimize the spring stiffness of the spring added by the connector wires.

One consideration in selecting the size and routing of the second set of wires is the effect of such wires on the force applied to the microactuator by the combination of the second set of wires and the bias springs. The size and routing of the second set of wires should be chosen to minimize the contribution of the second set of wires to the total effective spring constant of the second wire bias spring combination. In one embodiment of the present invention, the size and routing of the second set of wires should be selected to limit the combined spring constant of the springs and the wires to less than approximately $2.0\times10^{-5}$ Newton meters per radian.

The Chassis is the support structure for the tympanic lens. It is designed to support the microactuator and umbo platform while bridging the tympanic membrane. The chassis is further designed to bridge the tympanic membrane without touching it. In embodiments of the invention, the chassis supports the photodetector, microactuator, and other components and circuitry without touching any part of the tympanic membrane, including raised portions such as the short process (which may also be referred to as the lateral process) of the malleus. The chassis is designed to be oriented in a manner which prevents contact with the short process when the tympanic lens is properly positioned in the ear. The chassis is also designed and oriented to prevent the chassis from touching the manubrium of the malleus and any other structures or regions on the tympanic membrane. The chassis is designed to be positioned at least ½ millimeter above the surface of the eardrum at its closest point to allow the eardrum to move without contacting the chassis.

Each chassis may be individually designed and manufactured for specific users. The chassis size and the relationship between the chassis and the perimeter platform drives design of individual chassis, including its height above the tympanic membrane.

The chassis provides a stable platform for the microactuator to work against through bias springs 180 when pressing the umbo platform against the surface of the tympanic membrane.

Tympanic lens 100 is intended to remain in the user's ear for a long period of time and may be constructed using biocompatible materials. Long term stability of tympanic lens 100 is achieved through the use of a perimeter platform which provides support and stability to tympanic lens 100. The perimeter platform may be customized to match the individual user's ear anatomy. The perimeter platform may be customized to fit along the sulcus of the tympanic membrane TM. When properly positioned on the ear of a user, the perimeter platform may rest on the portion of the ear canal wall surrounding and immediately adjacent to tympanic membrane TM. The perimeter platform may be made of a material such as Parylene. The perimeter platform may be designed to have a thickness sufficient to support the tympanic lens while not being so thick that it kinks when bent. The perimeter platform may be approximately 18 microns thick.

The perimeter platform is designed not to touch the tympanic membrane but to provide a support structure, along with the chassis, to suspend the microactuator over the tympanic membrane such that only sound producing features touch the tympanic membrane. The perimeter platform is generally designed not to touch the pars tensa (portion of eardrum under tension). In some designs, the perimeter platform may overlap regions of the tympanic membrane up to a distance of approximately ½ millimeter.

The perimeter platform includes a region known as the sulcus platform at an anterior medial end of the perimeter platform. The sulcus platform sits in sulcus (curved portion of bony canal at the medial end of the canal which intersects with tympanic membrane). The sulcus platform serves to anchor the anterior end of the tympanic lens in the Ear Canal, preventing it from moving deeper into the ear canal or from moving away from the ear canal. The sulcus platform may act in concert with the umbo lens and the remainder of the umbo platform preventing the tympanic lens from moving away from the tympanic membrane and back out into the ear canal.

The perimeter platform may be designed to be sufficiently flexible to compress as it passes through the ear canal and expand when it reaches the tympanic membrane and is positioned in place. Expansion of the perimeter platform when placed at the distal end of the ear canal may assist the tympanic lens to remain in place by pressing the perimeter platform against features of the ear canal.

The Perimeter platform includes openings at its proximal and distal ends which allow air to past through the perimeter platform to reach the tympanic membrane, thus allowing natural sounds to reach the tympanic membrane. Openings in the proximal and distal ends of the perimeter platform which facilitates air conduction hearing, even with the tympanic lens in place.

The width of the perimeter platform is customized for each user to ensure that the tympanic lens can be safely and successfully passed through the ear canal. The height of the perimeter platform may involve a tradeoff between height and surface area. The surface area would preferably be made larger to facilitate holding the tympanic lens in place (through, for example, hydrostatic force), however the height would preferably be made smaller to facilitate the need to insert the tympanic lens through the ear canal, which can require a smaller height to get through narrow regions and around obstacles. The height of the perimeter platform may be optimized to be between approximately 1 millimeter and approximately 1.5 millimeters tall.

Tympanic lens 100 may be held in place by one or more of surface tension, fit and/or friction. The surface of the perimeter platform is adapted to hold the tympanic lens in place through surface tension. When properly placed and maintained there is a layer of oil present between the perimeter platform and the surface of the ear canal covered by the perimeter platform. The tympanic lens is kept in place at least in part by the surface tension/hydrostatic force of the oil acting to hold the perimeter platform on the ear canal surface.

In embodiments of the invention, tympanic lens 100 may be held in place by the fit between tympanic lens 100 and features of the ear canal EC. In embodiments of the invention, tympanic lens 100 may be held in place by mechanical interlocking between features of tympanic lens 100 and anatomical features of the user's ear canal. In embodiments of the invention, tympanic lens 100 may be held in place by mechanical interlocking between perimeter platform 150 and curvature of the ear canal such as the anterior bulge and the angle of the deep sulcus region with respect to the canal lateral to the sulcus.

In embodiments of the invention, tympanic lens 100 may be held in place by frictional interaction between elements of tympanic lens 100 and features of the user's ear canal, for example, perimeter platform 150 may be positioned to push against elements of the user's anatomy while umbo platform 160 pushes against umbo UM, preventing tympanic lens 100 from moving laterally with respect to tympanic membrane TM.

Oil, such as Mineral oil, may be applied to the ear canal EC to create surface tension between the portions of the ear canal wall adjacent the tympanic membrane and the perimeter and umbo platforms. Oil can create surface tension between the surface of the perimeter and umbo platforms and the skin of the ear canal that keeps the perimeter and umbo platforms in place. Such surface tension may be used to, for example, keep tympanic lens 100 in place and coupled to tympanic membrane TM. Such surface tension may also be used to keep umbo lens in place and coupled to umbo UM. Oil may also be used to keep the perimeter platform in place without actually touching the skin of the ear canal, allowing skin tissue to migrate out from under the umbo platform and perimeter platform without interference. Oil may be used to allow skin tissue to migrate out from under perimeter platform and umbo platform without displacing the tympanic lens.

The photodetector 130 is comprised of a semiconductor material which has been processed to convert photonic energy into electrons, generating current, for example, Silicon, Gallium Arsenide or Indium Gallium Arsenide. The semiconductor material has been bonded to a carrier, for example ceramic or PCB material, in a manner such that the anode and cathode can be connected to the microactuator through the PC board and wires. The semiconductor and carrier are protected with a covering to ensure that there is a clear light path from the emitter to the semiconductor and that the assembly is protected from mechanical handling and exposure to fluids found in the ear canal, for example water, mineral oil, or cerumen. The covering may be a plastic housing, epoxy or silicone coating, Parylene, or a combination of those materials.

The photodetector may be protected from fluid (e.g. sweat) ingress by front-coating or dip coating it in a soft silicone material, such as, Nusil Med-4086, Nusil Med-6345, or Shin-Etsu KE-109 Silicone followed by a separate Parylene outer coating. The use of this layered process is important because the soft silicone material relieves stress and will not damage wire bonds on the photodetector when it expands or deforms due to thermal, mechanical or chemical processes, including swelling upon exposure to fluids (such as sweat, water or oil). Silicone encapsulants can also provide strong adhesion to the underlying materials (photodetector and carrier) to prevent fluid ingress and buildup that could compromise reliability. In addition, the layered structure further prevents fluid ingress and buildup. The Parylene outer coating may be a thin coating of approximately 18 micrometers thickness of Parylene C. The Parylene thickness may span the range of approximately 3 micrometers to 50 micrometers. The photodetector may be coated in a manner which leaves a frosted dome over the front (light sensitive portion) of the photodetector. In addition to improving the resistance to fluid ingress, the addition of a Parylene outer coating provides a surface against which a health care professional may push, using a probe, when inserting the tympanic lens into a user's ear canal without damaging or destroying the silicone coating or the photodetector. Finally, the addition of a Parylene outer coating is advantageous because it limits light reflection off the surface of the photodetector, making it easier for the health care professional to see when placing the tympanic lens using an external light source.

The soft silicone may also be encapsulated with an alternate, hard conformal coating materials rather than Parylene. Example hard-coat materials include adhesives such as Epotek OG116-31 epoxy, Polytec EP653 epoxy and silicones such as Shin-Etsu SCR-1012 and SCR-1016 and Dow Corning OE-7670 and OE-7662.

The grasping tab is positioned adjacent to the Photodetector. It is used by the physician to hold the tympanic lens as it is placed into the ear canal using, for example, a forceps. The grasping tab extends in a plane which is parallel to the chassis to facilitate placement. Device stays in line with grasped with forceps as inserted. The grasping tab includes a removal ring which is used to facilitate easy removal using a bent or right angle pick.

FIGS. 7D, 7E, and 7F are circuit diagrams of the tympanic lens, including a photodetector and microactuator. In one embodiment of the invention, the design has constant value parameters, and is driven by an input signal composed of a DC signal and an AC signal. In one embodiment of the invention, the constant value parameters fall into the ranges:

$C_{PD}$ (junction capacitance of the PD) ranges from 4 to 7 nF (6 nF is nominal)

$C_{EXT}$ (added capacitance) ranges from 0 to 15 nF (0 is nominal)

R varies from 270 to 330 Ohms (300 is nominal)

L varies from 20 to 26 mH (24 mH is nominal)

The DC components vary based on the input power to the photodetector and fall into the ranges:

$\overline{W}_{pd}$ (DC light power) ranges from 0.3 to 3.0 mW (0.875 mW is nominal)

$\overline{I}_{pd}$ (DC PD current) ranges from 0.1 to 1 mA (0.3 is nominal)

$\overline{V}_{pd}$ (DC PD voltage) varies from 27 mV to 330 mV

The AC components are dependent on the signal level and can vary from 0 to full scale DC:

$\tilde{W}_{pd}$ (AC light power) ranges from 0 to 3.0 mW $\tilde{I}_{pd}$ (AC PD current) ranges from 0 to 1 mA $\tilde{V}_{pd}$ (AC PD voltage) varies from 0 to 1V The grasping tab is positioned adjacent to the Photodetector. It is used by the physician to hold the tympanic lens as it is placed into the ear canal using, for example, a forceps. The grasping tab extends in a plane which is parallel to the chassis to facilitate placement. Device stays in line with grasped with forceps as inserted. The grasping tab includes a removal ring which is used to facilitate easy removal using a bent or right angle pick.

In a hearing aid system according to the present invention, sound is detected by microphones in the BTE and converted to electrical signals which are passed through signal processing circuitry. The output of the signal processing circuitry is transmitted through a cable to a light tip positioned in a user's ear canal. At the light tip, the electrical signals are converted to light signals, which are transmitted through the user's ear canal to the tympanic lens described herein.

In one embodiment of the invention, sound waves received by microphone(s) 310 are converted into electrical signals, digitally processed, amplified and sent to light tip 120 through cable 260. Light tip 120 houses emitter 290, which may be, for example, a laser diode. Emitter 120 converts the electrical signal containing the amplified sound information into light pulses 40. When light tip 120 is inserted into ear canal EC and BTE 110 is switched on, light pulses 40 shine onto photodetector 130 on tympanic lens 100. Photodetector 130 converts light pulses 40 back into electrical signals which drive microactuator 140 of tympanic lens 100 to transmit sound vibrations to umbo UM.

Light tip 120 may be inserted and removed from the ear canal daily by the user.

In one embodiment of the invention, the Audio Processor consists of a behind the ear unit (BTE) and an attached Ear Tip. The BTE is an external device worn behind the ear of the user. The BTE houses microphones, a digital signal processor and a rechargeable battery. The BTE also includes a programming button to allow the recipient to switch to different programmed memory settings and a programming connector to allow connection of the BTE to an external computer running, for example, fitting software. The Light tip houses a laser diode and is connected to the BTE with a cable.

In operation of the BTE converts sound into electrical signals, which are passed to the light tip where the electrical signals are converted into light pulses. In the BTE however, the sounds waves are received by the microphones and converted into electrical signals, which are digitally processed, amplified and sent to the light tip through a cable. The laser diode in the light tip converts the electrical signals containing the amplified sound information into light pulses. The light pulses are transmitted to the tympanic lens, at which point they are converted back into electrical signals which drive the microactuator and couple mechanical vibrations directly to the umbo of the tympanic membrane. The BTE is designed to allow health care professionals to adjust the brightness of the light transmitted by the light tip.

The laser diode used in the Ear Tip is custom made in order to maximize the efficiency of light conversion. The laser diode is a VCSEL (vertical cavity surface emitting laser) and operates at infra-red wavelength of 850 nm. The BTE uses electrical pulses to drive the laser and allows the hearing health professional to adjust the light intensity as part of the fitting process.

In order for the system to work and the recipient to perceive sound amplification, the light pulses transmitted from Ear Tip need to be received by the tympanic lens and therefore the laser and the photodetector need to be generally aimed at each other. In order to achieve this in variable ear canal anatomies two key steps are taken: 1) the laser includes a diffuser, which provides greater insensitivity to misalignment by providing a broad and diverging beam pattern and 2) during the manufacturing of the Ear Tip, the laser is aimed at the photodetector using anatomical information from the silicon impression of the full ear canal.

The housing for the light tip is a custom mold made to fit individual ear anatomy with comfort while maintaining approximately 3-4 mm separation between the laser and the photodetector photodiode of the tympanic lens. Materials used in the manufacture of the light tip include acrylic, silicone, and biopore.

The taper tube acts as a strain relief for the cable as it enters the light tip and may act as a handle for user's who are removing the light tip from the ear canal. The taper tube also acts as a safety feature to prevent the light tip from being inserted too deep into the ear canal.

The cable is bent to follow the anatomy of the ear canal and the tragus. When the light tip is properly positioned, the cable will come out above the tragus and below the crus helix of the user's ear.

The light tip include built in emitter supports and taper tube supports which provide platforms to hold the emitter and taper tube while they are being glued in place. These topographical features allow an operator to accurately position the emitter and taper tube and hold them in place during the process of gluing them to the light tip. The emitter is held in a horseshoe shaped feature which includes a flange to assist it in aligning properly. The taper tube is held in a glue ring with a tooth feature to control its lateral and medial position during the gluing process.

In addition and similar to rechargeable hearing aids a BTE charger is provided to the recipient to help replenish the battery inside the BTE. The charger may have connectivity, such as, for example WiFi, to allow it to automatically upload data from the BTE while the BTE is being charged. That data may be uploaded to, for example, the user's health care provide or to the BTE manufacturer. The charger may be further adapted to automatically change its power output depending on the time of day, user profile etc. Such changes in power output may also be used to modulate the range of the charger. While in the charger, the BTE may also send periodic fuel gauge profiles to the charger. The indicator lights on the charger may be used to indicate what profile data is being transmitted from the BTE to the charger. Further, the charger may be adapted to automatically dim or even turn off LED indicator lights on the charger based on the time of the day so that the LED light does not interfere with the sleep patterns of the users.

In embodiments of the invention, a BTE includes a battery, a circuit board, a charging coil, a back iron (ferrite disk) and a spacer. These components are arranged such that the charging coil, back iron and spacer (the charging elements) are mounted on the battery, which is, in turn, mounted on the circuit board. The charging coil is adapted to receive electromagnetic energy from a charger, which is then used to recharge the battery. The back iron is a ferrite disk which focuses and concentrates the electromagnetic field from the charger.

In the event that moisture, such as sweat, gets into the BTE, it may create an electrolyte which provides a path for ferrite electro-migration in the presence of electromagnetic fields. In the event of such moisture ingress, ferrite may migrate through the electrolyte from the ferrite disk to the charging coil, reducing or eliminating the effectiveness of the coil. There is also potential for damaging the internal electronics due to the ferrite migration. In embodiments of the invention, ferrite electro-migration may occur in the presence of battery voltage, which may cause ferrite electro-migration from the ferrite disk to the battery.

In embodiments of the invention, the spacer is placed between the battery and the ferrite disk to isolate the battery case from the ferrite disk and/or to position the coil to maximize the efficiency of the transfer of energy between the charger and the BTE. This spacer may be made of plastic and is mounted to the battery using an adhesive. In order to prevent electro-migration of the ferrite to the charging coil, the charging coil, ferrite, spacer combination may be conformal coated. The conformal coating may be, for example, a conformal coating using an organic coating material, such as Hysol. The conformal coating prevents electro-migration of ferrite from the backing iron to the charging coil.

In embodiments of the invention, the battery, circuit board combination may be separately coated, using, for example, Parylene C. Separately coating the battery, circuit board combination ensures that there is no electro-migration of ferrite to the battery or circuit board.

In embodiments of the invention, the charging elements and the battery are separately coated to prevent magnetic fields within the coating from causing electro-migration under the coating. In embodiments of the invention, the portion of the spacer attached to the battery is not coated since the conformal coating will not stick to the adhesive used to attach the spacer to the battery. In embodiments of the invention, the edge of the coil, ferrite and spacer are coated, sealing the sides and top but not the bottom of the charging elements (antenna stack). This side and top coating ensures that there will be no electro-migration along the edge of the charging elements (antenna stack) between the backing iron and the coil.

In embodiments of the invention, a hearing aid device comprises: an antenna stack having a top, sides and a bottom, the antenna stack comprising: a coil antenna having a first and second side, the first side of the coil antenna forming the top of the antenna stack; a backing iron having a first and second side, the first side of the backing iron being attached to the second side of the coil antenna; and a spacer having a first and second side, the first side of the spacer being attached to the second side of the backing coil and the second side of the spacer forming the bottom of the antenna stack; a battery stack, the battery stack comprising: a rechargeable battery having a first and second side, the first side of the rechargeable battery being attached to the second side of the spacer; a printed circuit board attached to the rechargeable battery; a conformal coating material covering the top and sides of the antenna stack sealing the top and sides of the antenna stack from moisture ingress; a second coating material covering the top and sides of the battery and the printed circuit board, sealing the battery stack from moisture ingress. In the embodiments of the invention, the conformal coating material comprises an organic coating material. In embodiments of the invention, the conformal coating material comprises Hysol. In embodiments of the invention, the second coating material comprises Parylene.

Embodiments of the invention include a method of preventing ferrite migration in a hearing aid including an antenna stack and a battery stack wherein the antenna stack sits on the battery stack, the method comprising the steps of: conformally coating the top and sides of the antenna stack using a conformal coating material; and separately coating all the surfaces of the battery stack using a separate material.

In embodiments of the invention, an adhesive cover is used to prevent moisture ingress into the CS45 data connector. The adhesive cover prevents moisture from getting into the CS45 connector and causing the connector pins from shorting. The use of a disposable adhesive cover eliminates the need for a thicker cover which may interfere with the housing cover.

In embodiments of the invention, a fitting software is provided to the hearing health professional to customize the prescription to the recipient's hearing profile. The Fitting (ELF) software is used by the hearing health professional to program and customize the Audio Processor to the individual hearing profile. In addition to the ELF software, the fitting system includes a laptop personal computer (PC), a HiPro 2 box [GN Otometrics A/S] and programming cables for each BTE.

In embodiments of the invention, the ELF software includes a Lightgram measurement, which is used to calibrate the output of the hearing system of the present invention in equivalent acoustic pressure units (dBSPL). The output of prior art air conduction hearing aids are typically characterized with the use of a 2 cc coupler and an ear simulator, which are intended to represent an average ear. Since the output of the present systems is mechanical sound vibrations through direct contact to the umbo, a calibration is needed to represent these vibrations in equivalent terms to acoustic sound pressure. To this effect, during the fitting session a user's unaided pure tone acoustic thresholds are measured using conventional audiometric techniques and recorded in ELF. Subsequently, aided pure-tone thresholds are measured using the Lightgram, where tones are generated in the Audio Processor, played back and responses are recorded as the light based thresholds. Using these two sets of pure tone threshold data, ELF computes a calibration function which equates the light stimulus of the present system to an equivalent sound pressure level at the tympanic membrane. In practice, the calibration is determined for each ear by measuring the sound pressure required to achieve threshold of hearing at standard audiometric frequencies between 125 Hz and 10,000 Hz, then measuring the output level of the CHD (the Lightgram) to achieve the same threshold level. In this way, not only is the system calibrated but the maximum equivalent pressure output (MEPO) can also be determined. The MEPO of the CHD is determined by adding the remaining CHD headroom at threshold to the acoustic sound pressure delivered at threshold to determine the maximum output of the system at each of the standard audiometric frequencies.

For example, in one embodiment of the invention, a subject requires 65 dB SPL to reach the acoustic threshold during a hearing test at 2000 Hz. The same subject, when fitted with the CHD requires an output at a power level that is −55 dB relative to the full scale output to reach the same perceptual threshold at 2000 Hz. The MEPO can be determined by adding 65 dB SPL (acoustic threshold) and 55 dB (additional headroom to reach full scale output), or a MEPO of 120 dB SPL.

In order to present the natural sound quality to hearing aid users, the selection and combination of hearing aid parameters have to be arranged and ordered in a way which optimizes those settings for each individual user. Hearing aid devices currently available require user intervention when programming the device. Since user intervention is required, the number of available programs may be limited because users cannot generally keep track of more than four programs at a time. This limited number of options may make it difficult for a user to program the optimal parameters based on the environment they are in. In addition, it may be difficult for a user to know which program is active and it may require trial and error to get to the right target program, resulting in frustration and poor sound quality. Limiting the number of available programs based upon the need for user intervention, instead of the system capabilities (e.g., storage capacity) results in a sub optimal solution.

Some hearing devices have mitigated this problem by providing different types of tones and/or differing numbers of beeps to indicate particular programs and assist the user in programing their devices. However depending upon the current program type and voice prompts. Though useful this type of feedback still requires the user to actively participate in selecting the optimal program parameters. In addition, many users do not want it known that they are wearing hearing aids so social stigma associated with the user using program buttons in public in order to get to the right parameter selection may deter them from changing the program settings, even where the result is suboptimal hearing.

In the present invention, the hearing aid may be automatically programmed, without active user intervention. In the present invention, wirelessly connecting the hearing aid to an external device, such as a smart phone, allows the hearing aid to use the location sensor built in the connected device to activate parameters based on external parameters such as the user's location. Alternatively, a GPS sensor may also be embedded in the hearing aid device to offer location based parameter programming. With a GPS enabled location device, either in the hearing aid or an associated device, the software would be able to gather external data to program the hearing aid for operation based upon those factors, for example, whether a user is in a car and the speed of the car. The system may then select specific programs or settings to optimize the user's experience, such as, adjusting a noise reduction algorithm to reflect the added wind noise that might be experienced by a user in a car. Location devices may also be used to determine whether a user is indoors or outdoors and activate settings or programs in the hearing aid automatically based upon those parameters. As another example, if the user is in the mall or movie theater, the appropriate parameter selection can be made to give them optimal sound quality. As a further example, if the user is in concert hall, the music program can automatically be selected without user intervention.

In embodiments of the invention, hearing aid programs and parameters may also be updated based upon events on the user's calendar. For example, if the user is scheduled to have a business meeting in his/her calendar, the device can create a record of that and automatically put it in a quite mode during the meeting.

In embodiments of the invention, a request to stream real time audio music may result in the programs and parameters of the hearing aid being adjusted to automatically select the music program selection without user intervention and revert to the previous program selection when the audio stream disconnect request is received.

In embodiments of the invention, configuring the hearing aid device into a hands free listening device during an active phone conversation, may result in the hearing aid automatically mode switching to a directional microphone set up and selection of a program which includes appropriate noise reduction and fast feedback cancellation. Once the user hangs up the call, the hearing aid may automatically revert back to its original program selection.

In embodiments of the invention, the user's external environment may be sensed by the hearing aid and/or associated device and the programs and parameters automatically adjusted as the user's environment changes. The hearing aid automatically selecting the appropriate program or parameter based on the environment the user is in. As an example, wireless communication programs may be disabled or turned off when the hearing aid or associated device senses that the user is on an airplane, by, for example, sensing the presence of an iBeacon. In one embodiment, an iBeacon application running on the connected device will sense the iBeacon and signal the hearing device to put itself in the airplane mode. As a further example, temperature sensors in the hearing aid and/or associated device could be used to determine if the user is sitting in a sauna or taking a cold shower and the hearing aid programs and parameters adjusted accordingly.

In embodiments of the invention, physical characteristics of the user may be sensed by the hearing aid and/or associated device and the programs and parameters automatically adjusted based upon those characteristics. For example, a hearing aid device may have an embedded 3D accelerometer to determine the activity level of the user and the programs or parameters could be automatically selected if the patient is sitting up, sleeping, running and/or walking.

In embodiments of the invention, sensors on the hearing aid and/or associated device may include location sensors such as GPS and/or an iBeacon receiver. In embodiments of the invention, the associated device may include one or more special applications. In embodiments of the invention, the hearing aid device may include a software algorithm to automatically enable and select different programs or parameters based on inputs such as location, iBeacon inputs, user selected programs such as audio streaming or Calendar events.

It is generally desirable that hearing-aid systems be reliable, with no system failures. Thus, it is desirable to perform preventative maintenance on regular basis before any system failure. In addition, it would be useful to be able to predict when preventative maintenance will be required in order to plan service resource needs. There are many moving parts in the system and it will be desirable to predict the failure modes and life cycle counts of these components so that timely service and/or replacement could be performed.

The device software actively monitors the hearing aid system, collecting data on the system components. The collected data may then be compared to thresholds stored in device memory and the user alerted when the subsystems and/or components of the devices need to be replaced. The user may also clear alerts. Alerts may also be sent to the user's health care provider or to the manufacturer. Usage related information can also be communicated to a remote server which gathers and processes usage related information from multiple hearing aids.

In one embodiment of the invention, the hearing aid system collects a broad range of data which may be used to predict failure of the system and provide alerts when components of the system need to be replaced or repaired. Data collected by the hearing aid system may include:

1. A manufacturing timestamp indicating the date the system, and/or a component thereof was manufactured.
2. A placement timestamp indicating the date a tympanic lens was placed in the user's ear.
3. A removal timestamp indicating the date a tympanic lens was removed from the user's ear.
4. One or more fitting timestamps, indicating the date the hearing aid system was first programed for the user and/or the date of the first audiogram and/or lightgram for that user.
5. One or more lightgram timestamps, indicating the date of each subsequent lightgram.
6. A count of the number of times the hearing aid system is programed.
   a. This count may be a count of the number of times the communication accelerator adaptor ("CAA") connector is used.
   b. This count may be used to predict failure of the CAA connector by comparing the count to the life limit of the CAA connector insertions
7. A time stamp log of all over the air programing ("OTAP").
8. A log of all the number of times the system is turned on and the duration of use.
9. A log of the number of times the system is placed into standby mode and the durations of those standby times.
10. A count of the number of times the BTE is recharged and the duration of those charging cycles.
11. A count of the number of times the BTE is placed in its charging slot.
    a. This count may compared against a specification and used to predict a failure based upon wear and tear.
12. A log of the laser current settings (e.g. LC=6 . . . 1) and a count of the number of times those settings are changed
13. A count of the number of times the laser current exceeds its maximum specified value.
14. A count of the number of times the laser is turned off and on.
    a. This count may be a count of the number of times the laser current driver is turned on.
    b. This count may be compared against a specification and used to predict a failure of the laser current driver
15. A count of the number of times a light tip is inserted into the user's ear.
    a. This count may be based upon:
       i. A feedback measurement reading;
       ii. A battery temperature reading from the fuel gauge; or
       iii. A battery temperate reading of the wireless chip
    b. Light tip insertion count may be compared against a specification on the life limit of the light tip insertion and used to predict failure of the light tip.
    c. Light tip insertion count may be compared against a specification on the life of the light tip connection wire and used to predict failure of the light tip connection wire.
16. A count of the number of motor post movements
    a. This count may be compared against a specification on the life limit of the motor post and used to predict motor post failure.
17. A timestamp indicating the time the battery is replaced;
18. A timestamp indicating the time the battery is manufactured;
19. A count of the number of times the battery is recharged.
20. A record of the battery temperature;
21. A record of the battery over temperature conditions;
22. A count of the number of times the battery current exceeds its specified limit; and 23. A count of the number of times the battery voltage is less than its specified limit.

24. A count of the number of times the rocker switch is depressed

25. A record of which programs are selected by the user and the number of times each program is selected.

26. A record of the volume settings selected by the user and the number of times those settings are changed.
   a. This count may be based upon the number of activations of the from the Rocker switch
   b. This count may be based upon data from a device, such as a cell phone, wirelessly connected to the hearing aid system.

27. A record of the frequency of application of oil to the user's ear

28. A record of the quantity of oil applied to the user's ear (e.g. number of drops)

29. A record of the person dispensing the oil into the user's ear.

30. A record of the number and length of Bluetooth low energy ("BLE") connection sessions.

31. A record of the number and length of Audio streaming sessions.

32. A record of the number and length of Audio codec selections.

The hearing aid system may also include a list of life limit thresholds for various actions in its memory. As an example, the hearing aid system may include the life limit on battery recharge cycles in its memory. As the data described above is collected, the collected data is compared against relevant stored data, such as, life limit thresholds stored in memory. When the collected data reaches a predefined limit, such as a life limit threshold, an alert may be sent to indicate that the hearing aid system, or a component of that system is in need of maintenance or repair. These alerts may be sent directly to the user, the user's health care provider, the hearing aid system manufacturer or any combination of the above. In the event that the alert is sent to the user, it may be repeated at predefined intervals until cleared by the user. Alternatively, the hearing aid system may be designed such that specified hearing aid alerts can only be cleared by the health care provider or the manufacturer. In addition, alert types may be user programmable. Such user programmable alert alternatives include, voice prompt, audible beep, and pop up messages on a connected device. The hearing aid system may send both preventative and critical maintenance notifications. Connected device apps can convert the alerts in calendar events upon receiving Of particular interest in hearing aid systems is tracking and maintenance of the battery, particularly in hearing aid systems using rechargeable batteries. In the hearing aid system described herein there are multiple functions performed which are related to battery tracking and maintenance.

The hearing aid system may range check the battery temperature from the fuel gauge and alert the user if the hearing aid system has been exposed to the out of bound conditions, such as extreme temperature. Once the battery temperature is exposed to the out of bound conditions, the hearing aid system will shut off predetermined elements of the system to prevent damage to the system. Before shutting off the system, the system may set a "Device Check" flag, which may be reset by a technician after they have thoroughly checked the device and/or replaced the battery.

The hearing aid system may also monitor the battery for voltage conditions which are indicative of remaining battery life during a charge cycle. Under low battery conditions, predetermined elements of the system may be disabled and enabled again when the battery voltage is high enough. Alternatively, the hearing aid system could recommend certain settings, profiles or usages to the user in order to extend the remaining battery life. These settings, profiles and usages could be modified by the system as the battery ages and its capacity is reduced.

The hearing aid system may also monitor the battery temperature. A change in battery temperature could indicate that the battery has been removed from its charger. If the battery is removed from the charger when the hearing aid system is not being used, the hearing aid system may be put into deep sleep mode to conserve power. The hearing aid system may further broadcast an audible signal to indicate its location to the user. A change in battery temperature may further indicate a change in the position of the BTE relative to the user or the charger. If the battery temperature indicates that the BTE is no longer on the user's ear or in the charger, the hearing aid system may be put into a deep sleep mode to preserve battery life. Alternatively, or in addition, the BTE may be programed to broadcast a signal, for example, every three seconds, to assist the user in locating the BTE.

The fundamental problem with short distance wireless communication is cross-interference and interoperability. In devices using short distance wireless communication, either the controller or the peripheral can connect and communicate with any other device as long as they use the same RF frequency band and link layer protocols. As multitude of these devices operate in close proximity, cross channel interference and interoperability becomes an issue. Traditionally user intervention is required to selectively associate with the devices of interest. In addition, extensive authentication and encryption algorithms are used to protect the integrity of the data and device identification. Since the short distance devices all operate in close proximity, selectively associating with the device of interest becomes a very complicated process.

One solution to these issues in a hearing aid system would be the use of a pairing button to pair the BTE and charger. However, pairing buttons take extra space on the device, cost extra money and introduce reliability issues. In addition, such switches require the user to remember to push the pairing button, which is not desirable from an ease of use perspective. Alternatively, extensive encryption and authentication methods may be used to ensure proper pairing but those methods add to development and validation cycles while introducing unnecessary complexity to the system.

In embodiments of this invention, the traditional problems are solved by using two different low power wireless communication techniques to associate and communicate among devices of interest selectively without the need for user intervention, or the use of a pairing button or extensive protocol re-engineering. In the present invention, when the hearing-aid device is dropped into the slot of the charger base, it automatically triggers a sequence wherein low power communication protocols are used to associate the hearing aids exclusively with that charger base, without the need for user intervention, a pairing button, or complex authentication schemes. In addition, embodiments of the present invention automatically locate a local charger when a user walks into a room and alerts the user if the user leaves the room without bringing the charger along.

In one embodiment of the present invention, illustrated in the flow diagrams of FIGS. 20 and 21, a short-distance wireless charging technique is used to associate the hearing-aid device to the charger base without the need for pairing. In embodiments of the invention, this is accomplished using a low distance wireless communication technique that is initiated upon insertion of the BTE into the charger base slot. The association of the hearing-aid device to the associated charger is critical to make sure the right hearing-aid device is being charged and profiled on the status indicators. This invention also uses low power wireless communication between the hearing-aid and the charger base to associate, authenticate, exchange device profile and status information while in the charger base. The system may also be adapted to perform two way communication from the charger base to the device. The present invention is adapted to eliminate the problem of a hearing-aid device sitting in one charger base can inadvertently communicate to another charger base in close proximity to the charger base.

In the present invention, the insertion of a BTE into a charger is used to automatically trigger association of the inserted BTE with the charger base. The charger software is adapted to keep track of a plurality of BTEs and to identify left and right devices. A unique ID is generated every time a BTE is dropped into the charger base, reducing or eliminating the chance of charging a BTE in a nearby charging base. When the BTE is dropped in the slot of the charger base, an 8-bit unique random ID is generated using an OOSK method. This unique ID is only associated with that base and is communicated to the BTE using an extremely low power protocol to avoid cross-communication to any other device. The extremely low power protocol is adapted to prevent communications beyond 1 cm. When the BTE is dropped in the slot in the charger base, upon detection in the charger base, the device uses the lowest transmit TX power settings to avoid cross-interference with other chargers in the close proximity.

In the present invention, a low power RF power cycle modulation sequence may be used to encode charger base ID and exchanged through the wireless charging coil. The BTE demodulates the unique encoded ID transmitted by the charger and then uses this ID in a wireless communication protocol, such as a low power Bluetooth Low Energy ("BLE") protocol, to advertise itself on the network. In embodiments of the invention suitable wireless communication protocols may include, for example WiFi, Zigbee, or other wireless protocols. The charger base is continuously scanning and listening to find BTEs that have same ID. Once a BTE having the proper ID is identified, it is associated with the charger. The association is achieved by low power on/off sequence to generate a unique ID as opposed to using BLE protocol to associate devices. Once a BTE is associated with a charger base, the system switches over to low power BLE protocol to communicate between the charger and BTE. Such communication may include communication of the battery profile of the BTE, which information may be used to allow the user to see the battery status while the device is sitting in the charger base. The association may be ended as soon the BTE is removed from the charger.

In one embodiment of the invention, illustrated in the flow diagram of FIG. 21A the introduction of a hearing aid into the charger is sensed by the charger because of a fluctuation in the charger magnetic field. This fluctuation is sensed as a change in the I_SENSE signal. The hearing aid senses that it has been placed into a charger by sensing a heart beat signal from the charger and signals its presence by cycling on and off. The hearing aid then sends the charger a packet structure, including a preamble and, assuming the correct preamble is sent, the charger identifies the hearing aid as being a valid hearing aid (i.e. a hearing aid that can be charged). If the hearing aid is not identified as being a valid hearing aid, the charger will not initiate charging and turns off. The authentication process takes approximately 5 seconds. Once the hearing aid is authenticated, the charger can read the state of charge (SOC) status along with the battery voltage and temperature.

In embodiments of the invention, when there is no device in the slot, the firmware on the charger is put in deep standby to conserve power. The charger system may be adapted to wake up from the interrupt when a BTE is dropped in the slot. In embodiments of the invention, there is programmable hysteresis built in the charger base to ensure that momentarily device drops in the slot and/or momentarily removal of the device from the slot do not trigger the charger to change status (e.g. wake up or go into standby mode). In embodiments of the invention, the charger may be configured such that it will continuously broadcast its location in the room or office.

In embodiments of the invention, the BTE may be associated with an external device such as a smart phone and the smart phone may be alerted when a charger is nearby so that the user is given an option to use the charger while there. In embodiments of the invention, the smart phone may also assist the user in finding a nearby charger if requested by the user. Other alerts, either directly by the charger or through the smart phone may include alerting the user that they are leaving he charger behind, the BTE is fully charged, the BTE is in the charger or the BTE is being removed from the charger. In addition, the smart phone may be used to define a geolocation based on a user's profile and adjust the power output of the charger beacon mode to a smaller or larger geofence. In embodiments of the invention, the charger may be connected to a remote data source, such as a cloud based server. By connecting to the remote data source, the charger may transmit data from the remote data source to the BTE, including, for example, firm ware updates. The charger may also transmit data from the BTE to the remote data source, including, for example, data logs showing data collected from the BTE.

In embodiments of the invention, a charger is responsible for charging two BTE modules. The Charger oscillates a coil which transfers energy to the BTE coil and charges the device. Firmware within the charger will disable/enable the oscillation; detect if a BTE has been placed on the charger; communicate with the BTE to find out the state of charge; and display the battery level or fault conditions to a user using the external LEDs.

The state diagram illustrated in FIG. 23 shows the logic flow of the Charger FW. The charger starts of in the IDLE state, when an item is placed the charger waits for a message for 5 seconds (MSG WAIT). After the 5 seconds it transitions to a fault state or charging state depending if a valid message was received. The charger then remains in the charging state, except for when it requests (REQ) an update from the BTE every 10 minutes. When a full charge criteria has been met for over 20 minutes the charger transitions into full state. While full the charger transitions to an RCV state every 10 minutes for 10 seconds to allow for an update from the BTE. If a device is removed and any point the charger will transition to an idle state.

In embodiments of the invention, the charger charges the BTE by oscillating a PWM signal at 744 kHz. This signal induces an electromagnetic field on the coil which transfers energy to the receiving coil on the BTE. The PWM signal is toggled on for 10 ms and off for 190 ms, resulting in a 5% duty cycle. When the PWM is on, an ADC signal [I_SENSE] can detect if an object, such as a BTE is placed into the charging bin. A level of 80 mV on the I_SENSE will indicate the presence of a BTE. Once detected it has to drop below 64 mv in order to be detected as off, this prevents jumping between on and off states. The charger allows 5 seconds for authentication process to complete. After 5 seconds, if a valid message was received, the charger will continue charging, and LED status will indicate state of charge to a user. If a valid message is not received after 5 seconds, charging will be disabled, and an error status will be indicated by blinking 4 LEDs.

In embodiments of the invention, communication with the BTE is initiated by the charger. It is the BTE's task to respond with an appropriate message. When the BTE is first placed in the charger it will start sending state of charge and voltage readings. After the first sequence the charger will request an update every 10 minutes. The charger requests an update from the BTE by disabling the PWM signal for 500 ms then enabling it back on. This will be received by the BTE on the CHARGER_ON_L pin. It will cause the BTE to toggle states between standby and charging. When the BTE goes to charging state it will send a sequence of updated state of charge and voltage messages. The BTE sends a message, by toggling the REFLECT pin. This will be received by the Charger on the ADC [I_SENSE] line. The BTE sends a 32bit message in the following format: 0xAz 0xdddd 0xA5, where 0xAz is the preamble that indicates a start of transmission, 'z' indicates a nibble notifying what value is sent (1 for %, 2 for V), 0xdddd is a 2 byte value. Followed by 0xA5 to end the transmission. If a message does not meet the specified criteria it will be ignored. It is important that the first and last bit sent is a 1, since this is how a start and end of transmission is determined.

| Preamble | Description | Example |
|---|---|---|
| 0xA1 | battery state of charge message | 0xA10060A5: SOC = 96% |
| 0xA2 | battery voltage message | 0xA20F7CA5: V = 3964 mV |

To determine if a 1 or a 0 bit is being transmitted an adaptive algorithm used to find a threshold between a 1 and a 0. The algorithm tracks the maximum level, and the minimum level and finds the average of the two. The following table describes what is being communicated to the user through the charger LED lights:

| | |
|---|---|
| OFF | Nothing in charger bin |
| LED 1 fast blink | Device has just been placed and authentication is taking place. First 5 seconds |
| LED 1 | SOC <= 33% |
| LED 2 | SOC <= 66% |
| LED 3 | SOC > 66% |
| LED 4 | SOC >= 97% && SOC <= 100% && V > 4150 |
| 4 LED blink | FAULT status. |

When the BTE battery reaches full charge [SOC>=98% and V>=4180 mv] the charger will charge for 20 more minutes, after which it will go to idle state (PWM is driven at 5% duty cycle). The battery state will still be monitored. Every 10 minutes the charge will be enabled for 10 seconds which will allow the BTE to send an updated state of charge and voltage reading. If the voltage drops below 4100 mV charging will be resumed, otherwise the charger will go back to idle mode.

If a foreign device is placed on the charger and detected. The charger will wait 5 seconds to receive a message. If it does not receive a message it will blink 4 LEDs to indicate a fault condition and the charger state will go to idle.

In one embodiment of the invention, the charger software displays the LED status based on the current battery voltage, state of charge or communication state as follows: The first LED blinks when processor detection is in process and turn solid when the processor is authenticated. The second LED turns solid when the battery state of charge is greater than 33%. The third LED turns solid when the battery state of charge is greater than 66%. The fourth LED turns solid based on the current battery voltage (BV), in mV, and/or state of charge (SOC), in percentage.

The Charger software blinks all four LEDs when it detects a non-communication state. The Charger software displays the LED status as normal after a non-communication state has been cleared.

In one embodiment of the invention, the Charger software regularly restarts the watchdog timer before it's expired in, for example, 4 seconds. In embodiments of the invention, the Charger software range checks the battery state of charge value. In embodiments of the invention, the charger software monitors the current battery temperature (BT), in degrees Celsius, and/or the current battery voltage (BV), in milli-Volts. The Charger software stops charging the processor when the sensing threshold level is less than 55 mV or after an adaptive charging timeout of up to 6 hours is expired.

In embodiments of the invention, the charger monitors the BTE temperature as the BTE is being charged. In order to prevent overheating the BTE, the charger uses on/off cycling to limit the heat buildup in the charger. In embodiments of the invention, the charger may use different duty cycles, depending upon the state of charge of the BTE. For example, if the BTE is between a minimum voltage and a first voltage (e.g., between 3.0 and 3.5 volts) when placed into the charger, the duty cycle may be at a maximum value (e.g., 100%). In embodiments of the invention, the BTE charge is prevented from going below the minimum voltage by turning the BTE off until it can be recharged when it gets to the minimum voltage. If the BTE is within a first interim range of voltage (e.g., between 3.5 volts and 4.18 volts), the charging duty cycle may decreased to an interim value (e.g., 90%). Once the BTE reaches its target charging voltage (e.g., 4.18 volts), the charging may continue in phases, with Phase 1 being a first duty cycle (e.g., 75%) for a first period (e.g., 10 minutes). Phase II may be a second duty cycle (e.g., 50%) for a second period (e.g., 10 minutes) and Phase III being a third duty cycle (e.g., 25%) duty cycle for a third period (e.g., 10 minutes). During each of these phases, the temperature is continually checked to ensure that the battery is not overheating. At the end of the third phase the charging may be discontinued and the BTE battery voltage monitored until the battery reaches a depleted state (e.g., 4.1 volts), at which time the charging process is restarted.

In embodiments of the invention, it may not be possible to rely on continuous communication between the charger to ensure proper charging but prevent overcharging. The charger may, therefore include a watchdog timer which estimates a time to charge when the BTE is placed into the charger and sets a maximum charge time based upon the measured charge. The maximum charge time is used to shut off the charger in the event that the charger and BTE lose communication during the charging cycle. In embodiments of the invention, a maximum charge time is used to prevent overcharging and/or overheating. In embodiments of the invention, this maximum charge time may be, for example, six hours. The maximum charge time may, however, be adjusted to take into account the actual state of charge of the battery. For example, in embodiments of the invention, if the battery is 50% charged when the BTE is placed in the charger the max charge time would be reduced. In one embodiment of the invention, the max charge time would be reduced from six hours to four hours.

Embodiments of the invention include a method of charging a rechargeable battery in a hearing aid, the method comprising the steps of: detecting the presence of a rechargeable hearing aid in a hearing aid recharger; generating a unique random ID in the charger; transmitting the unique random ID to the hearing aid using an extremely low power protocol; demodulating the unique ID in the hearing aid; using the demodulated unique ID in a low power protocol to advertise the hearing aid on a network which includes the charger; associating the hearing aid to the charger when the charger which broadcast the unique ID receives that unique ID from a hearing aid using a wireless protocol; using the wireless protocol to communicate between the associated charging station and hearing aid; radiating power from the charger to the hearing aid; and ending the association when the hearing aid is removed from the charger. In embodiments of the invention, the step of establishing the state of charge of the associated hearing aid prior to radiating power from the charger to the hearing aid. In embodiments of the invention, the charger waits a predetermined time after detecting a hearing aid in the charger before transmitting the unique ID to the hearing aid. In embodiments of the invention, the charger charges the hearing aid by oscillating a pulse wave modulation signal at 744 kHz. In embodiments of the invention, the pulse wave modulation signal is toggled on for approximately 10 milliseconds and off for approximately 190 milliseconds.

Embodiments of the invention include a method of charging a rechargeable battery in a hearing aid, the method comprising the steps of: detecting the presence of a rechargeable hearing aid in a hearing aid recharger; generating a unique random ID in the charger; demodulating the unique ID in the hearing aid; transmitting the unique ID back from the hearing aid to the charger; radiating power from the charger to the hearing aid; and ending the association when the hearing aid is removed from the charger. Embodiments of the invention further include the step of establishing the state of charge of the associated hearing aid prior to radiating power from the charger to the hearing aid. In embodiments of the invention, the charger waits a predetermined time after detecting a hearing aid in the charger before transmitting the unique ID to the hearing aid. In embodiments of the invention the charger charges the hearing aid by oscillating a pulse wave modulation signal at 744 kHz. In embodiments of the invention, the pulse wave modulation signal is toggled on for approximately 10 milliseconds and off for approximately 190 milliseconds. Embodiments of the invention further include the step of transmitting the unique random ID to the hearing aid using an extremely low power protocol. Embodiments of the invention further comprise the step of using the demodulated unique ID in a low power protocol to advertise itself on a network which includes the charger. Embodiments of the invention further comprise the step of associating the hearing aid with the charger when the charger which broadcast the unique ID receives that unique ID from the hearing aid. In embodiments of the invention, the charger and hearing aid are associated using a Bluetooth protocol. In embodiments of the invention, the wireless protocol is used to communicate between the associated charging station and the hearing aid. In embodiments of the invention, the wireless protocol is a Bluetooth protocol.

Embodiments of the invention include a method of charging a hearing aid battery, the method comprising the steps of: inserting the hearing aid into a charger; measuring the current charge level of the battery; charging the battery at a first duty cycle for a first period until the charge level of the battery reaches a first predetermined level; charging the battery at a second duty cycle for a second period until the charge level reaches a second predetermined level, wherein the second duty cycle is less than the first duty cycle; charging the battery at a third duty cycle for a first fixed period, wherein the third duty cycle is less than the second duty cycle; charging the battery at a fourth duty cycle for a second fixed period, wherein the fourth duty cycle is less than the third duty cycle; charging the battery at a fifth duty cycle for a third fixed period, wherein the fifth duty cycle is less than the fourth duty cycle; and discontinuing the charging until the battery charge reaches a third predetermined value, wherein the third predetermined value is less than the second predetermined value.

In embodiments of the invention, physical models are made of the user's ear canal, including the lateral and medial ends of the canal and the tympanic membrane. Once those physical models are made, they may be scanned to create a digital model of the user's ear canal. In embodiments of the invention, the physical model of the user's ear canal may be an impression of the ear canal taken by a healthcare provider. In embodiments of the invention, the physical model may be multiple impressions of all or portions of a user's ear canal which are scanned and the scanned data combined to generate the digital model of the user's ear canal. In embodiments of the invention, the digital model may be made directly by taking a scan of the user's ear canal using digital scanning equipment and using the scanned data to generate the digital model.

The digital model may be used to design the tympanic lens and light tip in the digital domain to ensure that the final products will fit into the patient's ear canal and that the light tip is properly aligned when placed into the user's ear canal. The digital model may be further used to design and properly position a chassis alignment feature and a photodetector alignment feature to form an alignment tool 700. The digital modeling step determines the optimal alignment of the chassis, the photo detector and the emitter. Once the positioning of those three components is optimized, the digital model may be used to create appropriate alignment tools, including the photodetector alignment feature and the chassis alignment feature. In embodiments of the invention, alignment may be accomplished in the digital domain using the digital model. In embodiments of the invention, the alignment may be verified using the verification feature of FIG. 17.

The scanned data and digital model may then be used to size and position the chassis and photodetector. In embodiments of the invention, the grasping tab and the posterior tympanic membrane plane may be used as a baseline. In embodiments of the invention, certain design rules are used to ensure that the components of the tympanic lens are properly positioned with respect to the anatomical features of the user. In one embodiment of the invention, a 0.5 mm space is maintained between the chassis and the anterior sulcus. In one embodiment of the invention, a 0.5 mm space is maintained between the chassis and the plane of the tympanic membrane TM. In one embodiment of the invention, the center axis of the chassis is designed to lie above the deepest point in the user's umbo. In one embodiment of the invention, the chassis is designed to avoid interaction with any potential irritation areas like the Short Process and anterior bulge. In one embodiment of the invention, digital proximity tools may be used to maintain appropriate relationships between the chassis and elements of the user's anatomy.

In embodiments of the invention, the photodetector position may be established by using a fixed distance of, for example, 3.5 mm between the face of the photodetector and the face of the emitter. The fixed distance may, in some embodiments be between 3 and 9 mm. In embodiments of the invention, both the emitter and the photodetector may be designed to be positioned along the superior ear canal axis to facilitate placement of a connecting cord along the Tragus channel. Finally, once the positioning of the photodetector and emitter are determined, proximity tools may be used to confirm that there are no points of interaction between the photodetector and emitter and the user's anatomy, including any anatomical features which would block or restrict the transmission of light from the emitter to the photodetector. In embodiments of the invention, digital alignment may be used to minimize distance and offset the angle between the photodetector and the emitter. In practice, the photodetector is designed to be in line with the emitter axis to maximize energy transfer between the photodetector and the emitter. During the manufacturing process, the photo detector alignment feature and chassis alignment feature are used to align the photodetector with the emitter and glue the photodetector in place on the chassis.

In embodiments of the invention, once the relative positions of the photodetector and chassis have been determined for a particular patient, the patient specific tympanic lens mold, photodetector alignment feature, and chassis alignment feature may be manufactured for that patient. In embodiments of the invention these patient specific features may be digitally modeled and the alignment of the resulting emitter and photodetector checked in the digital domain before being manufactured. Alternatively, in embodiments of the invention, one or more molds may be manufactured and used to align the resulting emitter and photodetector as illustrated in FIG. 17.

In embodiments of the invention, two components, the tympanic lens and the light tip are customized for the individual patient based upon an impression which is taken from that patient's ear canal. In embodiments of the invention, the impression may be made by a physician. The impression may be taken using a material which hardens when poured into the ear canal. In practice, the impression is inspected visually (for presence of voids or air bubbles) and dimensionally (to confirm that the patient's ear canal is large enough to accommodate the tympanic lens and light tip. The impression may, thereafter, be scanned and a digital model of the user's ear canal created by scanning the user's ear canal impression. The digital model may, thereafter be used to create a cavity, using, for example, 3D printing, resulting in the tympanic lens mold. In embodiments of the invention, the tympanic lens mold is coated with Parylene C through a vapor deposition process. The parylene (now matching the shape of the ear canal) is then removed from the tympanic lens mold and may be trimmed to create the sulcus and the umbo platforms.

In embodiments of the invention, the tympanic lens mold may also be used in the manufacture of the tympanic lens to properly position and affix the photodetector to the chassis. In particular, an alignment tool including a chassis alignment feature and a photodetector alignment feature may be affixed to the tympanic lens mold and the chassis positioned in the tympanic lens mold using the chassis alignment feature to properly position the chassis. Once the chassis is aligned within the tympanic lens mold, the photodetector alignment feature may be used to properly position the photo detector before it is glued to the chassis. In embodiments of the invention, the tympanic lens mold may be further used to properly position other components of the tympanic lens on the chassis. In embodiments of the invention, the chassis may be glued to the sulcus platform, then the microactuator glued to the chassis, then the grasping tab glued to the chassis, followed by the placement and gluing of the photodetector to the chassis using the photodetector alignment tool.

In embodiments of the invention, after the tympanic lens mold is finished, an impression is made using the mold (with the same material as the one used to take the original impression). This mold impression is visually compared to the original impression to confirm absence of surface defects. This confirms that the tympanic lens mold was created correctly.

Once the ear tip and tympanic lens are complete, the tympanic lens mold and the ear canal mold can be mated to form a complete model of the user's ear canal. The complete model of the user's ear canal can then be used to verify that the manufactured ear tip and tympanic lens will be properly aligned when placed in the user's ear. Specifically, the manufactured ear tip may be placed in the ear canal model and the manufactured tympanic lens in the tympanic lens model and the alignment between the emitter in the manufactured ear tip and the photodetector on the manufactured tympanic lens measured to confirm that they will be properly aligned in the user's ear canal.

Embodiments of the invention include a method of manufacturing a tympanic lens, the method comprising the steps of: creating a digital model of at least a portion of a user's ear canal; manufacturing an ear canal mold using the digital model, wherein the ear canal mold includes a recessed portion wherein the recessed portion includes a model of at least a portion of the user's medial ear canal, including the tympanic membrane; manufacturing an alignment tool, including a chassis alignment feature and a photodetector alignment feature, wherein the chassis alignment feature and the photodetector alignment feature are unique to the anatomy of the user; mating the ear canal mold and alignment tool; mounting a chassis in the ear canal mold using the chassis alignment feature to properly align the chassis in the ear canal mold; mounting a photodetector to the chassis; and using the photodetector alignment feature to position the photodetector on the chassis prior to gluing the photodetector in place. In embodiments of the invention, the step of creating a digital model comprises the steps of: forming an impression of a user's ear canal, including the user's tympanic membrane; and digitally scanning the ear canal impression to create a digital model of the user's ear canal. In embodiments of the invention, digital data is used to size a chassis for the tympanic lens. In embodiments of the invention, the chassis is sized for the user. In embodiments of the invention, the ear canal mold is coated with a flexible material. In embodiments of the invention, the flexible material is Parylene. In embodiments of the invention, the chassis is placed into the mold, using the alignment tool to fix the position of the chassis with respect to the tympanic membrane and features thereof. In embodiments of the invention the method further includes the steps of: gluing the chassis to the flexible material coating the mold; and cutting the flexible material to create a perimeter platform and an umbo lens. In embodiments of the invention, the flexible material is Parylene. In embodiments of the invention, the components are manufactured using 3D printing. In embodiments of the invention, the method further comprises the step of creating registration markers to align the digital model with global predetermined coordinates of a digital working environment after the step of digitally scanning the ear canal mold to create a digital model of the user's ear canal. In embodiments of the invention, an origin of the global predetermined coordinates of the digital working environment is positioned at the deepest point of the digital representation of the patient's ear canal.

Embodiments of the invention include a method of manufacturing a tympanic lens, the method comprising the steps of: forming mold of a user's ear canal, including the user's tympanic membrane; digitally scanning the ear canal mold to create a digital model of the user's ear canal; using the digital data to size a chassis for the tympanic lens; manufacturing a chassis; manufacturing an ear canal mold, including a recessed portion with the anatomy of the user's medial ear canal, including the tympanic membrane; coating the ear canal mold with a flexible material; manufacturing an alignment tool, including a chassis alignment feature and a photodetector alignment feature; mating the ear canal mold and alignment tool; placing the chassis into the mold, using the alignment tool to fix the position of the chassis with respect to a model of the user's tympanic membrane and features thereof; mounting a microactuator and photodetector to the chassis; and using the photodetector alignment feature to position the photodetector prior to fixing the photodetector in place. In embodiments of the invention, the method further includes the steps of: affixing the chassis to the flexible material coating the mold; and cutting the flexible material to create a perimeter platform and an umbo lens. In embodiments of the invention, the flexible material is Parylene. In embodiments of the invention the components are manufactured using 3D printing.

Embodiments of the invention include a method of verifying the alignment of a user unique light tip and tympanic lens, the method comprising the steps of: manufacturing a light tip using a digital model of the lateral portion of the user's ear canal, the tympanic lens including an emitter; manufacturing a tympanic lens using a digital model of the medial portion of the user's ear canal, including the user's tympanic membrane, the tympanic lens including a photodetector; manufacturing a verification fixture, the verification fixture comprising: an ear canal mold manufactured using the digital model of a lateral portion of user's ear canal; a tympanic lens mold manufactured using the digital representation of a medial portion of a user's ear canal; mating the ear canal mold and tympanic lens mold in a manner which replicates the relation between the user's ear canal and tympanic membrane; positioning the light tip in the ear canal mold; positioning the tympanic lens in the tympanic lens mold; exciting the emitter in the light tip; and measuring the electrical output from the photodetector.

Embodiments of the invention include a method of creating one or more alignment tools, the method comprising: making one or more physical impressions of a user's ear canal; scanning the one or more impressions to create one or more digital models of the user's ear canal, including the user's tympanic membrane; digitally combining the one or more digital models to create a combined digital model of the user's ear canal; creating a first alignment tool using a distal portion of the combined digital model, wherein the first alignment tool replicates, at least in part, the user's tympanic membrane and surrounding anatomy. In embodiments of the invention, the method the method further comprises the steps of: creating a second alignment tool, the second alignment tool comprising a photodetector alignment feature and a chassis alignment feature. In embodiments of the invention, the method further comprises the steps of: creating third alignment tool, the third alignment tool comprising the first and second alignment tools. In embodiments of the invention, the method further comprises the step of: creating a third alignment tool using a proximal portion of the combined digital model, wherein the second alignment tool replicates, at least in part, the lateral portion of the user's ear canal anatomy.

The cable between the BTE and Ear Tip is custom formed and sized during the manufacturing process based on measurements provided by the clinician and the ear canal impression.

Hearing aid systems according to the present invention are custom designed for each individual user. One of the custom elements of the hearing aid system is the cable which connects the BTE to the light tip positioned in the user's ear. Selecting the appropriate cable length is important for the comfort of the patient. It is also important for optimizing the position of the sound processor behind the ear, which affects the sound quality experienced by the patient.

FIG. 24 is an illustration of a cable sizing tool according to the present invention. The cable sizing tool illustrated in FIG. 24 is adapted to assist a health care provider in accurately measuring the appropriate light tip cable length for a particular user. The cable sizing tool enables a clinician to accurately measure a custom cable length in three dimensions. This provides a significant advantage over traditional ear piece sizing tools which only characterize the cable length in one dimension. The result of using a cable sizing tool according to the present invention is improved fit accuracy for custom products.

In one embodiment of the invention, the cable sizing tool includes a model BTE having the size and shape of the actual BTE to be used with the cable. The model BTE is connected to a measuring cable which includes markings at predefined intervals. In use, the model BTE is placed behind the pinna of the user's ear and is positioned in the optimum position for fit and directional microphone location. The health care provider then identifies the user's tragal notch and positions the measuring cable such that it follows the natural contour of the pinna into the tragal notch. The BTE location is maintained while the measuring cable is pressed flat against the skin of the tragis channel and the distance measured by noting which of the markings on the measuring cable touch the tragus notch. While these measurements could be taken using a measuring cable connected to, for example a cardboard model of the BTE, the use of a model BTE having the height and thickness of a standard BTE ensures a more accurate cable measurement by ensuring that the cable measurement includes all three dimensions necessary to ensure that the cable will fit the user. In this way the cable takes on a curved 3D form and accurately indicates the overall length needed for the custom light tip cable.

While the preferred embodiments of the devices and methods have been described in reference to the environment in which they were developed, they are merely illustrative of the principles of the present inventive concepts. Modification or combinations of the above-described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

What is claimed is:

1. A method of charging a rechargeable battery in a hearing aid, the method comprising the steps of:
    detecting the presence of a rechargeable hearing aid in a hearing aid charger;
    generating a unique random ID in the charger;
    transmitting the unique random ID to the hearing aid using an extremely low power protocol, wherein the charger waits a predetermined time after detecting the hearing aid in the charger before transmitting the unique random ID to the hearing aid;
    demodulating the unique random ID in the hearing aid;
    using the demodulated unique random ID in a low power protocol to advertise the hearing aid on a network which includes the charger;
    associating the hearing aid to the charger when the charger which broadcast the unique random ID receives that unique random ID from the hearing aid using a wireless protocol;
    using the wireless protocol to communicate between the associated charging station and the hearing aid;
    radiating power from the charger to the hearing aid, wherein the charger charges the hearing aid by oscillating a pulse wave modulation signal at a predetermined frequency, wherein the pulse wave modulation signal is for at least a portion of the charging time toggled on for a first period of time and off for a second period of time, the second period of time being longer than the first period of time, wherein the first period of time is approximately 10 milliseconds;
    establishing the state of charge of the associated hearing aid prior to radiating power from the charger to the hearing aid; and
    ending the association when the hearing aid is removed from the charger.

2. A method of charging a rechargeable battery according to claim 1 wherein the predetermined frequency is approximately 744 kHz.

3. A method of charging a rechargeable battery according to claim 1 wherein the second period of time is approximately 190 milliseconds.

4. A method of charging a rechargeable battery in a hearing aid, the method comprising the steps of:
    detecting the presence of a rechargeable hearing aid in a hearing aid charger;
    generating a unique random ID in the charger;
    demodulating the unique random ID in the hearing aid;
    transmitting the unique random ID back from the hearing aid to the charger, wherein the charger waits a predetermined time after detecting the hearing aid in the charger before transmitting the unique random ID to the hearing aid;
    radiating power from the charger to the hearing aid, wherein the charger charges the hearing aid by oscillating a pulse wave modulation signal at a predetermined frequency, wherein the pulse wave modulation signal is toggled on for a first period of time and off for a second period of time, the second period of time being longer than the first period of time, wherein the first period of time is approximately 10 milliseconds;
    establishing the state of charge of the associated hearing aid prior to radiating power from the charger to the hearing aid; and
    ending the association when the hearing aid is removed from the charger.

5. A method of charging a rechargeable battery according to claim 4 wherein the predetermined frequency is approximately 744 kHz.

6. A method of charging a rechargeable battery according to claim 4 wherein the second period of time is approximately 190 milliseconds.

7. A method of charging a rechargeable battery according to claim 4, further comprising the step of transmitting the unique random ID to the hearing aid using an extremely low power protocol.

8. A method of charging a rechargeable battery according to claim 7, further comprising the step of using the demodulated unique random ID in a low power protocol to advertise itself on a network which includes the charger.

9. A method of charging a rechargeable battery according to claim 8, further comprising the step of associating the hearing aid with the charger when the charger which broadcast the unique random ID receives that unique random ID from the hearing aid.

10. A method of charging a rechargeable battery according to claim 9, wherein the charger and the hearing aid are associated using a Bluetooth protocol.

11. A method of charging a rechargeable battery according to claim 10, wherein the wireless protocol is used to communicate between the associated charging station and the hearing aid.

12. A method of charging a rechargeable battery according to claim 4, wherein the wireless protocol is a bluetooth protocol.

13. A method of charging a rechargeable battery in a hearing aid, the method comprising the steps of:
    detecting the presence of a rechargeable hearing aid in a hearing aid charger;
    generating a unique random ID in the charger;
    transmitting the unique random ID to the hearing aid using an extremely low power protocol, wherein the charger waits a predetermined time after detecting the hearing aid in the charger before transmitting the unique random ID to the hearing aid;
    demodulating the unique random ID in the hearing aid;
    using the demodulated unique random ID in a low power protocol to advertise the hearing aid on a network which includes the charger;
    associating the hearing aid to the charger when the charger which broadcast the unique random ID receives that unique random ID from the hearing aid using a wireless protocol;
    using the wireless protocol to communicate between the associated charging station and the hearing aid;
    radiating power from the charger to the hearing aid, wherein the charger charges the hearing aid by oscillating a pulse wave modulation signal at a predetermined frequency, wherein the pulse wave modulation signal is for at least a portion of the charging time toggled on for a first period of time and off for a second period of time, the second period of time being longer than the first period of time, wherein the second period of time is approximately 190 milliseconds;
    establishing the state of charge of the associated hearing aid prior to radiating power from the charger to the hearing aid; and
    ending the association when the hearing aid is removed from the charger.

14. A method of charging a rechargeable battery according to claim 13 wherein the predetermined frequency is approximately 744 kHz.

15. A method of charging a rechargeable battery according to claim 13 wherein the first period of time is approximately 10 milliseconds.

16. A method of charging a rechargeable battery in a hearing aid, the method comprising the steps of:
- detecting the presence of a rechargeable hearing aid in a hearing aid charger;
- generating a unique random ID in the charger;
- demodulating the unique random ID in the hearing aid;
- transmitting the unique random ID back from the hearing aid to the charger, wherein the charger waits a predetermined time after detecting the hearing aid in the charger before transmitting the unique random ID to the hearing aid;
- radiating power from the charger to the hearing aid, wherein the charger charges the hearing aid by oscillating a pulse wave modulation signal at a predetermined frequency, wherein the pulse wave modulation signal is toggled on for a first period of time and off for a second period of time, the second period of time being longer than the first period of time, wherein the second period of time is approximately 190 milliseconds;
- establishing the state of charge of the associated hearing aid prior to radiating power from the charger to the hearing aid; and
- ending the association when the hearing aid is removed from the charger.

17. A method of charging a rechargeable battery according to claim 16 wherein the predetermined frequency is approximately 744 kHz.

18. A method of charging a rechargeable battery according to claim 16 wherein the first period of time is approximately 10 milliseconds.

19. A method of charging a rechargeable battery according to claim 16, further comprising the step of transmitting the unique random ID to the hearing aid using an extremely low power protocol.

20. A method of charging a rechargeable battery according to claim 19, further comprising the step of using the demodulated unique random ID in a low power protocol to advertise itself on a network which includes the charger.

21. A method of charging a rechargeable battery according to claim 20, further comprising the step of associating the hearing aid with the charger when the charger which broadcast the unique random ID receives that unique random ID from the hearing aid.

22. A method of charging a rechargeable battery according to claim 21, wherein the charger and the hearing aid are associated using a Bluetooth protocol.

23. A method of charging a rechargeable battery according to claim 22, wherein the wireless protocol is used to communicate between the associated charging station and the hearing aid.

24. A method of charging a rechargeable battery according to claim 16, wherein the wireless protocol is a bluetooth protocol.

* * * * *